US 6,636,868 B1

(12) United States Patent
Bauer et al.

(10) Patent No.: US 6,636,868 B1
(45) Date of Patent: Oct. 21, 2003

(54) SYSTEM AND METHOD FOR AUDITING AND RECONCILIATION OF TELEPHONE SERVICE PROVIDER'S DATABASES WITH A REGIONAL OR CENTRAL DATA REPOSITORY

(75) Inventors: Deborah L. Bauer, Suwanee, GA (US); Samuel S. Howlette, Great Falls, VA (US); Kevin Germann, Gatineau (CA); Susan Jane McQuigge Ernst, Gloucester (CA); Francis S. Sommers, Ottawa (CA); Mike Cavanagh, Woodlawn (CA); William Kayln, Kanata (CA); Ross Edward Button, Ontario (CA); Steve Sauve, Orleans (CA); Ralph Holmes, Glendale, MD (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/170,635

(22) Filed: Oct. 13, 1998

Related U.S. Application Data

(63) Continuation of application No. 08/897,906, filed on Jul. 21, 1997, now Pat. No. 6,366,603.

(51) Int. Cl.[7] .............................. G06F 7/00; H04M 7/00
(52) U.S. Cl. .................... 707/104.1; 707/1; 379/221.13
(58) Field of Search ................... 379/221.13; 707/1–10, 707/104.1

(56) References Cited

U.S. PATENT DOCUMENTS

| | | |
|---|---|---|
| 5,218,632 A | 6/1993 | Cool |
| 5,325,290 A | 6/1994 | Cauffman et al. |
| 5,333,183 A | 7/1994 | Herbert |

(List continued on next page.)

FOREIGN PATENT DOCUMENTS

EP 0710042 A2 5/1996

OTHER PUBLICATIONS

Newton, "Newton's Telecom Dictionary," Flatiron Publishing, Inc., 1994, p. 714.

Lane, M., Data Communication Software Design,, Boyd & Fraser Publishing Company, 1985, pp. 116–117.

Primary Examiner—Ahmad F. Matar
Assistant Examiner—Hector Agdeppa

(57) ABSTRACT

The present invention provides a system and method for auditing and reconciliation of a telephone service provider's database and a central or regional repository. Both the database and repository contain data records. The data records include telephone number porting information that facilitates tracking and porting of telephone numbers. The system comprises interface means between a service provider's database and the repository. The method includes user interface which facilitates selection of auditing and reconciliation choices, including amount of date to be analyzed and downloaded, the type of data and data processing application and time of operation.

21 Claims, 41 Drawing Sheets

U.S. PATENT DOCUMENTS

| | | |
|---|---|---|
| 5,384,822 A | 1/1995 | Brown et al. |
| 5,546,574 A | 8/1996 | Grosskopf et al. |
| 5,566,235 A | 10/1996 | Hetz |
| 5,606,600 A | 2/1997 | Elliott et al. |
| 5,625,681 A | 4/1997 | Butler, II |
| 5,625,816 A | 4/1997 | Burdick et al. |
| 5,703,939 A | 12/1997 | Bushnell |
| 5,715,303 A | 2/1998 | Marks et al. |
| 5,717,745 A | 2/1998 | Vijay et al. |
| 5,717,749 A | 2/1998 | Sneed, Jr. et al. |
| 5,734,705 A | 3/1998 | Schlossman et al. |
| 5,757,895 A | 5/1998 | Aridas et al. |
| 5,761,272 A | 6/1998 | Williams et al. |
| 5,764,745 A | 6/1998 | Chan et al. |
| 5,765,172 A | 6/1998 | Fox |
| 5,774,532 A | 6/1998 | Gottlieb et al. |
| 5,784,443 A | 7/1998 | Chapman et al. |
| 5,787,147 A | 7/1998 | Gundersen |
| 5,793,861 A | 8/1998 | Haigh |
| 5,809,108 A | 9/1998 | Thompson et al. |
| 5,832,068 A | 11/1998 | Smith |
| 5,835,497 A | 11/1998 | Litzenberger et al. |
| 5,835,757 A | 11/1998 | Oulid-Aissa et al. |
| 5,854,834 A | 12/1998 | Gottlieb et al. |
| 5,883,948 A | 3/1999 | Dunn |
| 5,896,440 A | 4/1999 | Reed et al. |
| 5,901,215 A | 5/1999 | Dezonno |
| 5,903,632 A | 5/1999 | Brandon |
| 5,910,983 A | 6/1999 | Dezonno et al. |
| 5,912,962 A | 6/1999 | Bosco |
| 5,933,489 A | 8/1999 | Sensabaugh et al. |
| 5,940,492 A | 8/1999 | Galloway et al. |
| 5,949,867 A | 9/1999 | Sonnenberg |
| 5,951,654 A | 9/1999 | Avsan et al. |
| 5,978,464 A | 11/1999 | Sonnenberg |
| 5,987,114 A | 11/1999 | Sonnenberg |
| 6,047,045 A | 4/2000 | Sommers et al. |
| 6,058,175 A | 5/2000 | Schultz |
| 6,064,887 A | 5/2000 | Kallioniemi et al. |
| 6,067,354 A | 5/2000 | Bauer et al. |
| 6,122,362 A | 9/2000 | Smith et al. |
| 6,169,793 B1 | 1/2001 | Godwin et al. |
| 6,445,785 B1 * | 9/2002 | Chan et al. ............ 379/221.13 |

\* cited by examiner

SYSTEM AND METHOD FOR AUDITING AND RECONCILIATION OF TELEPHONE SERVICE PROVIDER'S DATABASES WITH A REGIONAL OR CENTRAL DATA REPOSITORY

CROSS REFERENCE TO RELATED APPLICATIONS

This application is a continuation of U.S. patent application Ser. No. 09/897,906, filed Jul. 21, 1997, now U.S. Pat. No. 6,366,663, which has a common assignee and inventorship to the present invention.

FIELD OF THE INVENTION

The present invention relates in general to the field of telecommunications and more specifically to a system and method for facilitating the auditing and reconciliation of a telephone service providers' database with a data repository. Both the database and repository contain data records. The data records contain telephone portability information relating to the routing and porting of telephone numbers. The system and method provide a user with several auditing and reconciliation options including effecting selected amounts of data, at selected times, and using selected data processing applications which relate to the data in question.

BACKGROUND OF THE INVENTION

This is a continuation of application Ser. No. 08/897,906 filed Jul. 21, 1997 entitled "System and Method for Achieving Local Number Portability."

Without limiting the invention, its background is described in connection with local telephone services and providers of such services. In general, the telecommunications industry has evolved into a highly competitive and sophisticated network of equipment manufacturers and service providers. Since the early 1980s, the industry has seen a shift from pure analog techniques over copper wire to digital techniques over optical fiber. Today, customers can choose from a large array of consumer telecommunications services including local and long distance calling, 800 and 900 calling accounts, TCP/IP (i.e. the "Internet") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may consume a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network ("PSTN") comprises the telecommunications backbone for most voice/data traffic in the world. For most local and long distance telephone calls a local telephone company acts as a local entry point to the PSTN. Typically, a Local Routing Number ("LRN") is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until the present invention, there was no way to port a customer's number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Until the present invention, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Apr. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Thus, a need exists for a system and method of achieving local number portability on a nationwide basis. A system and method of sharing a single telephone number over different local exchange carriers would fill a void not presently addressed by the prior art.

SUMMARY OF THE INVENTION

The present invention provides a system and method for auditing and reconciliation of a telephone service provider's database and a central or regional repository. Both the database and repository contain data records. The data records include telephone number porting information that facilitates tracking and porting of telephone numbers. The system comprises interface means between a service provider's database and the repository. The method includes user interface which facilitates selection of auditing and reconciliation choices, including amount of date to be analyzed and downloaded, the type of data and data processing application and time of operation.

The present invention also provides a hardware and software platform to effect the porting of local telephone numbers from one service provider to another. The systems and subsystems of the invention are designed to communicate with a Number Portability Administration Center and Service Management System ("NPAC/SMS") which receives and stores updated customer routing information and makes it available to participating service providers. The NPAC/SMS contains a record of all ported numbers and a history file of all transactions relating to the porting of a number.

The present invention further provides a system for Local Number Portability ("LNP") that submits service orders changes to a NPAC/SMS. In this regard, a Service Order Administration ("SOA") Subsystem is provided as means of entering and submitting services order changes to the NPAC/SMS via an interface that supports the retrieval and update of subscription, service provider and network information. A graphical user interface or a message-based interface to a service provider's upstream systems is used for this purpose.

For a more complete understanding of the present invention, including its features and advantages, reference is now made to the following detailed description, taken in conjunction with the accompanying drawings.

BRIEF DESCRIPTION OF THE DRAWINGS

Corresponding numerals in the drawings refer to corresponding parts unless otherwise indicated.

DETAILED DESCRIPTION OF THE INVENTION

Throughout the following description, the terms "interface", "line", "lines", "link", "communications link", "inbound link" and/or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the Unix operating system structure and associated protocols. Such conventions are well known to those skilled in the art.

Figure 1:
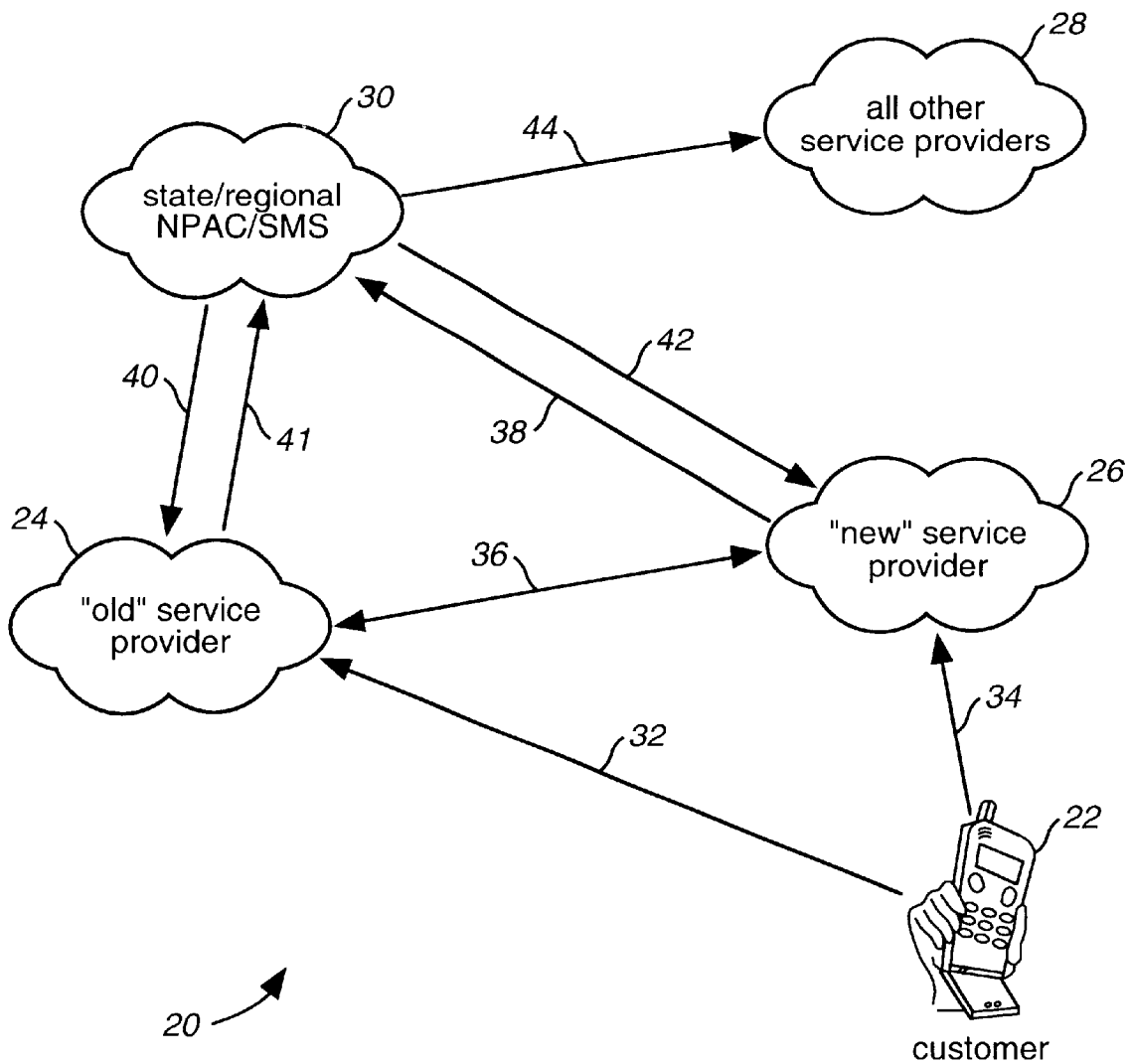
FIG. 1 is an overall process flow diagram for the method used to transfer a customer's port data from an old service provider to a new service provider according to one embodiment of the invention.

Turning now to FIG. 1, a flow diagram of a telephone number porting process, denoted generally as 20, is shown. In general, the telephone number porting process 20, which achieves Local Number Portability ("LNP"), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. Thereafter, the old service provider 24 and new service provider 26 arrange the port details for the customer's telephone number as denoted by line 36.

Once the new service provider 26 obtains the customer's port request, the new service provider 26 notifies a Number Portability Administration Center and Service Management System ("NPAC/SMS") 30, which maintains a centralized regional number database for all customers in a given region, of the pending port as denoted by line 38. Alternatively, the old service provider 24 can notify the NPAC/SMS 30 of the pending port as denoted by line 41.

When the NPAC/SMS 30 receives the notification it performs certain validation checks. If the NPAC/SMS 30 only received a notification from one of the involved service providers, either the old service provider 24 or the new service provider 26, will notify the service provider that failed to sent a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or the new service 26 provider sends and activation notice to the NPAC/SMS 30. The NPAC/SMS 30 activates the port of the customer's telephone number by sending the new port data to the old service provider 24 as denoted by line 40, the new service provider 26 as denoted by line 42, and all other service providers 28 as denoted by line 44. This ensures proper call routing to the customer because all the service providers in the region 24, 26, and 28 can update their networking equipment accordingly.

If during the validation process described above the old service provider 24 failed to respond, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMS 30 will place the notification in a "conflict" state and notify the conflicting service providers 24, 26 or 28 of the conflict status. The conflicting service providers 24, 26 or 28 will determine who will serve the customer 22 using appropriate internal conflict resolution procedures. If the conflict is resolved, the NPAC/SMS 30 will remove the notification from the "conflict" once it is notified of the resolution and the process proceeds normally as described above. Alternatively, the new service provider 26 can cancel the port requests.

The present invention incorporates significant advantages over the prior art in that it allows for the sending and receiving of porting data from regional databases, which are maintained at the NPAC/SMS 30, and provides a smooth transition from the old service provider 24 to the new service provider 26.

Figure 2:
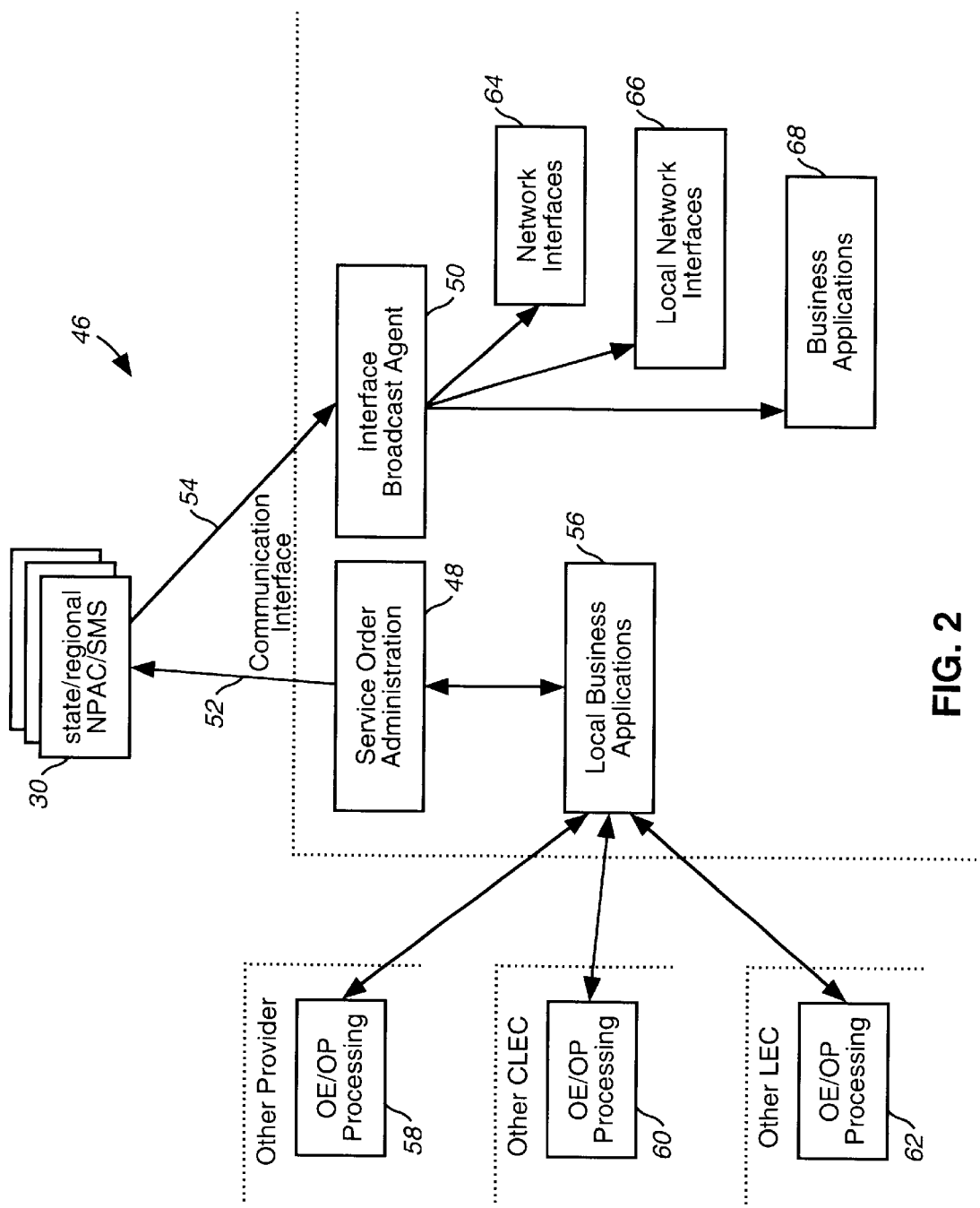
FIG. 2 is a high level block diagram for the interface between a Service Order Administration ("SOA"), an Interface Broadcast Agent ("IBA") and a regional number portability administration center according to one embodiment of the invention.

Turning now to FIG. 2, a block diagram of a system for achieving local number portability is shown and denoted generally as 46. The NPAC/SMS 30 is communicably linked to two functional subsystems, a Service Order Administration ("SOA") Subsystem 48 and an Interface Broadcast Agent ("IBA") Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing ("OE/OP") systems of other service providers 58, other Complex Local Exchange Carriers ("CLEC") 60, and other Local Exchange Carriers ("LEC") 62, depending on the existing network of service providers. The SOA Subsystem 48 acts as an intermediary between the local applications 56 and the NPAC/SMS 30, thus providing a smooth non-intrusive solution for local number portability.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distances networks and 800 services.

For example, business applications 68 can comprise a database of records for all provider systems needing access to the customer porting data, such as the Automatic Number Identifier ("ANI") reference information system. The local network interfaces 66 can be an intelligent network architecture that supports routing queries during call processing. The network interface 64 can include the Metro Intelligent Network Architecture that forms a tie-in into available communications services. Such services may include an 800 or 900 service or other similar offerings that may require access to the port data through a regional toll switch network from the NPAC/SMS 30 for correct call servicing and routing.

Figure 3:
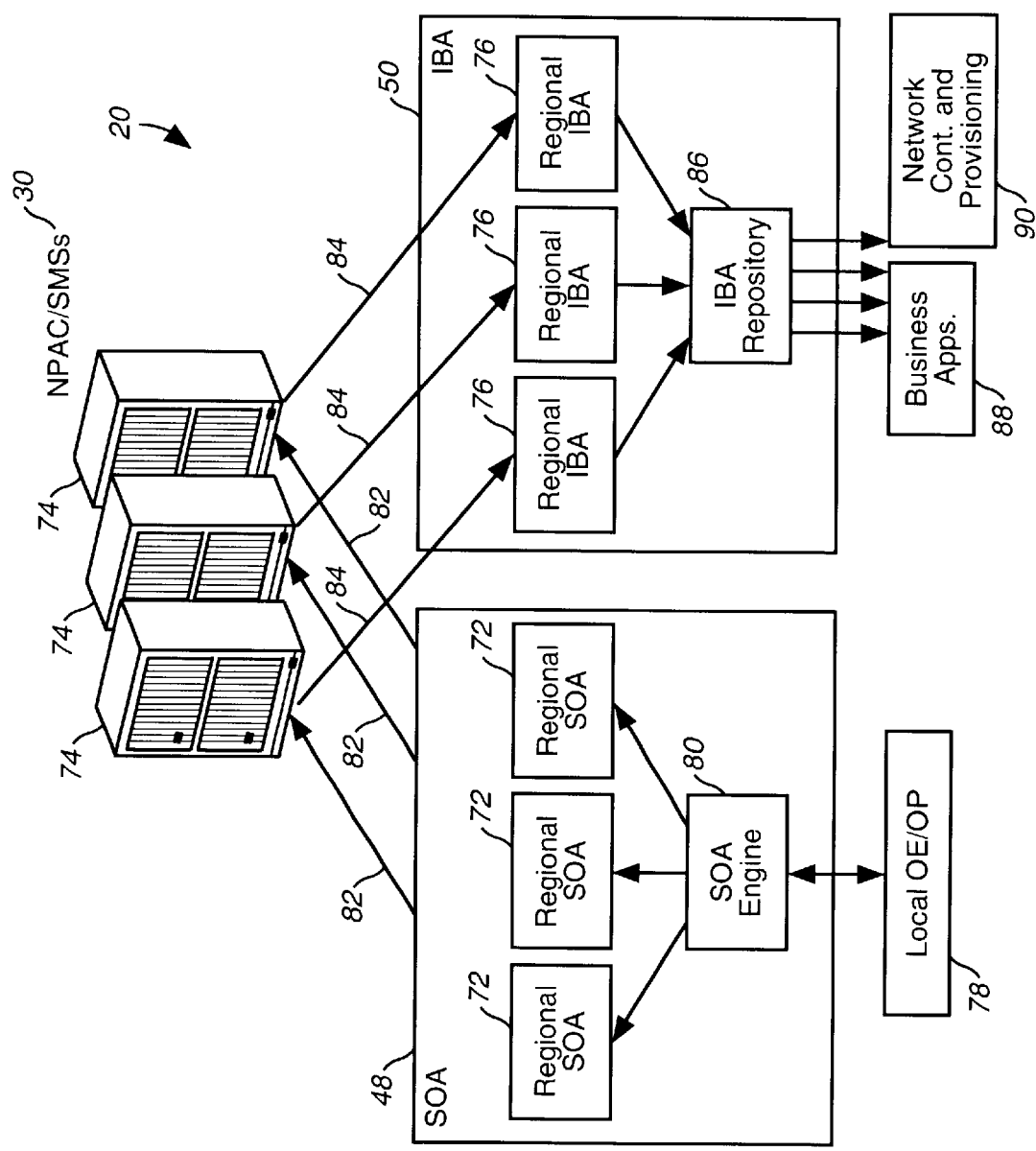
FIG. 3 is a block diagram of the SOA and IBA Subsystems and their interface to various business applications.
Figure 4:
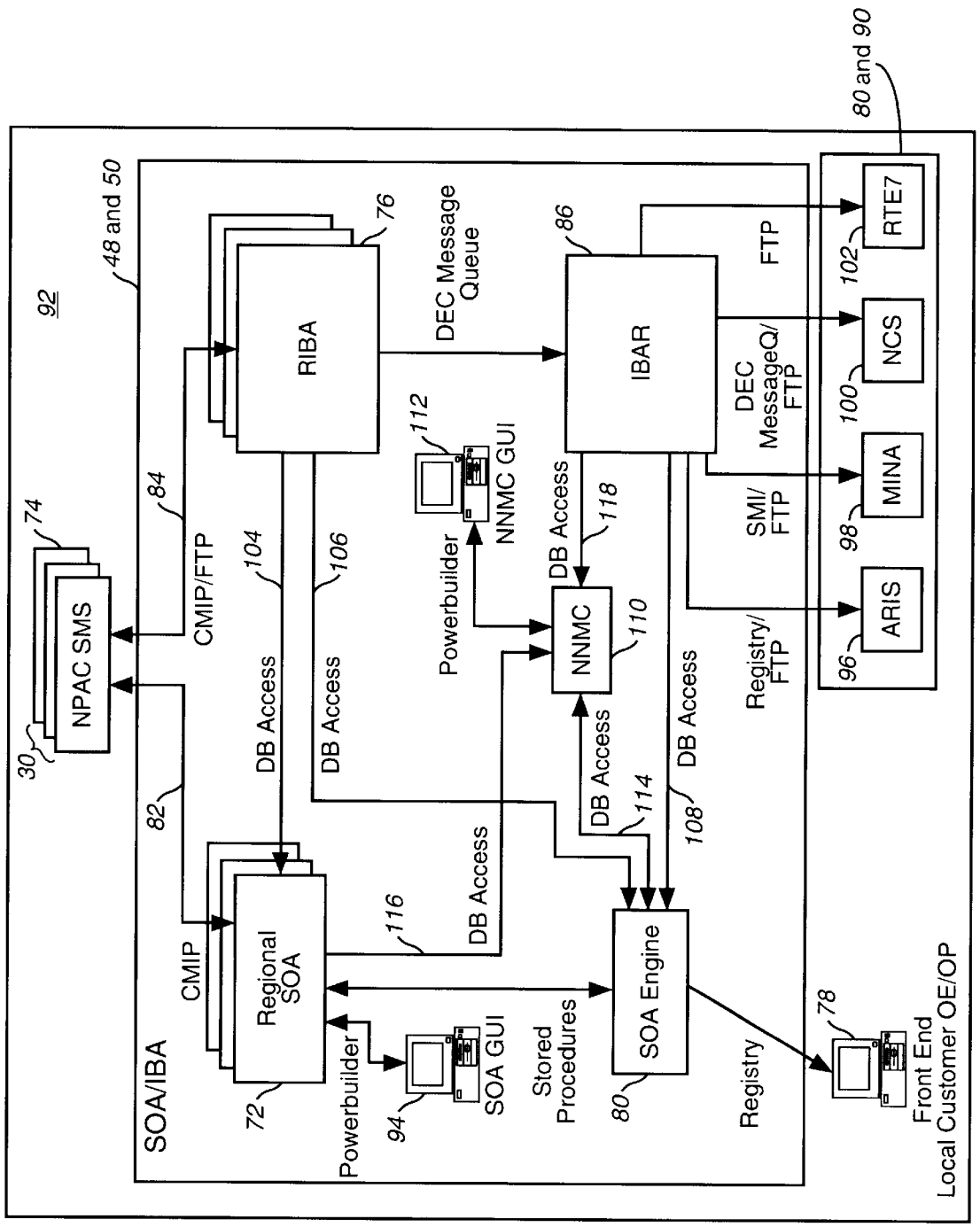
FIG. 4 is a block diagram of an alternative embodiment of the present invention with a National Network Management Center.

Turning now to FIGS. 3 and 4, the interaction between the NPAC/SMS 30, the SOA Subsystem 48 and the IBA Subsystem 50 will be described. The Local Number Portability System of FIG. 3 is denoted generally as 70, whereas the Local Number Portability System of FIG. 4 is denoted generally as 92. Local Customer Order Entry and Order Processing ("OE/OP") Systems (collectively referred to as the "Front End") 78 send and receive LNP transactions or messages to and from a local SOA Engine 80, which is an interface that routes the LNP transactions or messages to their appropriate destinations, such as the Regional SOA Subsystems 72 located in various parts of the country. In the case of FIG. 4, the SOA Engine 80 also receives and sends LNP transactions or messages from and to a SOA Graphical User Interface ("GUI") 94, and routes database queries to the RIBA 76 and IBAR 86 Subsystems. The Regional SOA 72 and SOA Engine 80 Subsystems form the SOA Subsystem 48, which provides the means for submitting customer service order changes to the Regional NPAC/SMSs 74.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the current version of the "NPAC/SMS Interoperable Interface Specification" by Lockheed Martin IMS Corporation. Communication interface 82 utilizes a Common Management Interface Protocol ("CMIP") and communication interface 84 utilizes both CMIP and File Transfer Protocols ("FTP").

Preferably some method of access control is provided to manage security issues that arise from communications between the SOA 32 and RIBA 34 Subsystems and the NPAC/SMS 74. In one embodiment, an access control field is included in messages flowing between the SOA 32 and RIBA 34 Subsystems and the NPAC/SMS 74 and carries a digital signature. As is known by those skilled in the art, a digital signature is used for authentication purposes to guarantee the identity of the message sender. For example, the access control field can include the following information:

- System ID: An identifier for the system that is using the interface. This is a key element in the authentication process. While it is passed in each Protocol Data Unit, it is only really important in the association establishment.
- System Type: Identifies the kind of system that is connecting: SOA, IBA, SOA and IBA or NPAC.
- User Id: An optional field that passes a user Id used mostly for logging.
- List Id: This is an integer that identifies the list from which a key was chosen to create the signature.
- Key Id: This is an integer that identifies which key from the 1000 keys in a list was used to generate a signature.
- CMIP Departure Time: This is the time at which a message was sent.
- Sequence Number: This is 32 bit unsigned integer that starts at 0 and is incremented until wrapping at the maximum value.
- Signature: The signature field contains the MD5 hashed and encrypted System Id, the System Type, the User Id, the CMIP Departure Time, and Sequence Number without separators between those fields or other additional characters. Encryption is done using RSA encryption using the key from the key list specified. Validation of this field ensures data integrity and non-repudiation of data.

Association Functions: These are set of flags that are set when an association is established.

Recovery Mode: The recovery mode flag is used to recover after downtime.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single IBAR Subsystem 86. As shown in FIG. 3, the IBAR Subsystem 86 is accessible by a plurality of downstream applications, such as business applications 88, and network provisioning and configuration systems 90. It should be understood, however, that any type of downstream system can be connected to the IBAR Subsystem 86 at the option of the service provider. In this way the porting data is distributed to existing network applications, such as long distance and local business, for proper call routing and processing. Similarly, FIG. 4 depicts the IBAR Subsystem 86 sending LNP data to four specific Request Processing Applications (88 and 90 of FIG. 3): an ANI Reference Information System ("ARIS") 96, Metro Intelligent Network Administration Service Management System ("MINA/SMS") 98, Network Control System ("NCS") 100 and Provisions Voice Network ("RTE7") 102.

Moreover, FIG. 4 depicts, several additional communication interfaces between the major subsystems of the LNP System 92: database access interface 104 between the Regional SOA 72 and RIBA 76 Subsystems; database access interface 106 between the RIBA 76 and SOA Engine 80 Subsystems; and database access interface 108 between the SOA Engine 80 and IBAR 86 Subsystem. A National Network Management Center ("NNMC") 110 is also shown.

The NNMC 110 is a stand-alone subsystem designed for basic querying of database information on the SOA 72 and IBAR 86 Subsystems. Accordingly, the NNMC 110 is connected through communication interfaces to the various databases in the LNP System 92: the SOA Engine Subsystem 80 through database access interface 114; the SOA Subsystem 72 through database access interface 116; and the IBAR Subsystem 86 through database access interface 118. An end-user can initiate a query using a NNMC GUI 112, which is connected to the NNMC 110. By entering a single telephone number and the database to query, either the SOA 126 (FIG. 5) or IBAR 172 (FIG. 7) Databases, an end-user can obtain such information as the LRN, effective date, service provider, action, status and telephone number range.

While FIGS. 3 and 4 depict the use of three (3) Regional SOA Subsystems 72, three (3) Regional NPAC/SMSs 74, and three (3) Regional IBA Subsystems 76, it is envisioned that each region providing local number portability, regardless of number, will have a corresponding SOA Subsystem 72, NPAC/SMS 74 and Regional IBA Subsystem 76. Moreover, while FIGS. 2, 3 and 4 illustrate various embodiments for achieving local number portability, it should be understood that other architectures may be similarly conceived and reduced to practice upon reference to this disclosure. It is anticipated therefore, that such other embodiments are well within the scope and spirit of the present invention. For example, FIGS. 5 through 8 disclose a detailed architectural design, in the form of block diagrams, for various subsystems that may be used to achieve local number portability in a preferred embodiment of the present invention.

Figure 5:
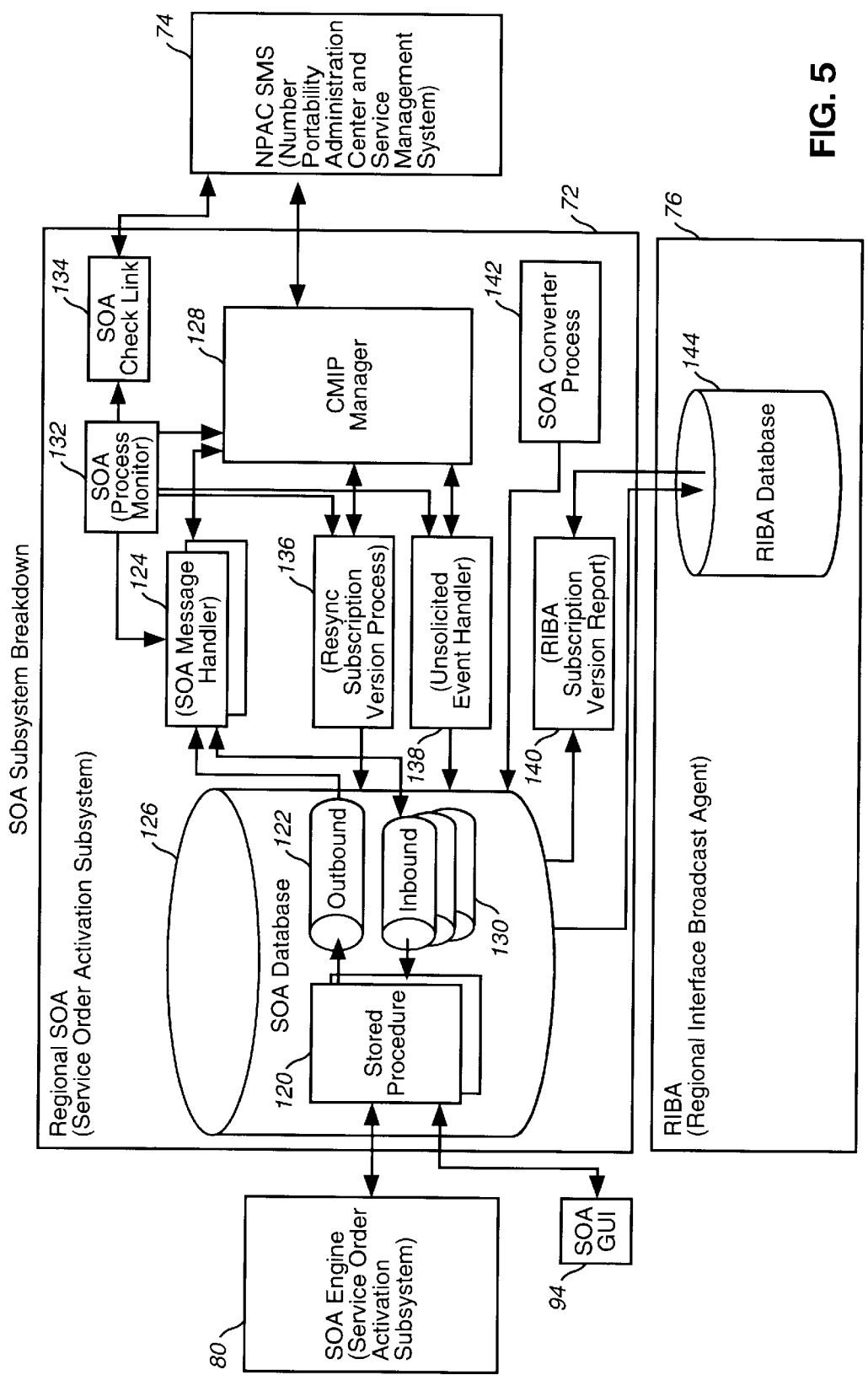
FIG. 5 is a block diagram of an SOA broken down into its component subsystems according to one embodiment.

Turning now to FIG. 5, the SOA Subsystem 72 is shown broken down into its functional components. LNP transactions, also referred to as messages or requests, originating either from the SOA Engine Subsystem 80 or an SOA GUI 94 are received through stored procedures 120, such as those used in an Oracle database structure. The stored procedures 120 send the message through a single outbound link 122 to a SOA Message Handler 124. Note that throughput can be increased by running multiple instances of the SOA Message Handler 124, each instance receiving messages from the single outbound link 122.

The SOA Message Handler 124 organizes and processes the messages by tasks that are preferably broken down at an object level, e.g., Subscription Version, Audit, Service Provider and Network. Based on a message identifier, the SOA Message Handler 124 queries the SOA Database 126 to collect and assemble any additional information required by the NPAC/SMS 74. The SOA Message Handler 124 then sends the message to the CMIP Manager 128, which is a distributed systems generator that implements the interface between the SOA Subsystem 72 and the NPAC/SMS 74, and waits for a response from the CMIP Manager 128, such as success, failure or timeout,. The CMIP Manager 128 then logs and sends the message to the NPAC/SMS 74.

When the CMIP Manager 128 receives a response from the NPAC/SMS 74, the response is routed to the SOA Message Handler 124, which processes any information received with the response and updates the SOA Database 81 when required. The SOA Message Handler 124 then sends the response through an inbound link 130 to the stored procedures 120 and out to the originating SOA Engine Subsystem 80 or SOA GUI 94. All output to the stored procedures 120 is done through separate inbound links 130, one for each SOA GUI 96.

The SOA Database 126 is used to store and maintain the current telephone number information for a customer. Table 1 below is domain field listing for an SOA Database 126 according to one embodiment:

TABLE 1

Domain List for one Embodiment of the SOA Database 126.

| Name | Code | Label | Type |
| --- | --- | --- | --- |
| Billing identifier | BILLING_ID | Billing Identifier | VARCHAR2(4) |
| BooleanIndicator | BOOL_IND | Boolean Indicator | NUMBER(1) |
| City | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |
| CNAM SSN | CNAM_SSN | | NUMBER(3) |
| ContactType | CONTACT_TYP | Contact Type | VARCHAR2(2) |

TABLE 1-continued

Domain List for one Embodiment of the SOA Database 126.

| Name | Code | Label | Type |
|---|---|---|---|
| Country | COUNTRY | | VARCHAR2(20) |
| EndUserLocationType | END_USER_LOC_TYPE | | VARCHAR2(2) |
| EndUserLocationValue | END_USER_LOC_VALUE | | VARCHAR2(12) |
| Identifier | ID | | NUMBER(10) |
| Identifier | ID2 | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| NPA NXX | NPA_NXX2 | NPA-NXX | VARCHAR2(6) |
| OperationAction | OPER_ACT | Operation Action | NUMBER(3) |
| Postal Code | PC | Postal Code | VARCHAR2(40) |
| ServProvID | SP_ID | | VARCHAR2(4) |
| ServProvID | SP_ID2 | | VARCHAR2(4) |
| StateProvince | STATE_PROV | State/Province | VARCHAR2(2) |
| Status | STATUS | Status Flag | NUMBER(10) |
| SystemType | SYSTEM_TYPE | | NUMBER(1) |
| TelephoneNumber | TN | Telephone Number | VARCHAR2(10) |
| Timestamp | T2 | | DATE |
| Timestamp | T | | DATE |
| TunableName | TUNABLE_NAME | Tunable Name | VARCHAR2(40) |
| TunableValue | TUNABLE_VALUE | Tunable Value | VARCHAR2(40) |
| UserIdentifier | USER_ID | | VARCHAR2(30) |
| Zip | ZIP | | VARCHAR2(9) |

The Process Monitor creates separate instances, SOA Process Monitor 132 and RIBA Process Monitor 167, which are the parent processes for the SOA 72 and RIBA 76 Subsystems and watch over all of the standard applications or processes required to run the Subsystems 72, 76. The SOA Process Monitor 132 and RIBA Process Monitor 167 keep a table of all applications or processes spawned and operational information about each application, such as the exit status of each application. The SOA Process Monitor 132 does not, however, monitor the IBA Subscription Version Report 140 or the SOA Converter Process 142. The SOA Process Monitor 132 starts applications when they are required and is notified if an application terminates. If an application, which is intended to always be running terminates, such as the CMIP Manager 128 and Check Link 134, the SOA Process Monitor 132 will automatically restart the terminated application.

A Resynch Subscription Version Process 136 is coupled to the SOA Database 126 and it is used to synchronize the SOA Subsystem 72 after a period of downtime. The Resynch Subscription Version Process 136 is started after the CMIP Manager 128 binds to the NPAC/SMS 74. In operation, the Resynch Subscription Version Process 136 requests from the NPAC/SMS 74, by way of the CMIP Manager 128, all subscription versions that have a modification time-stamp more recent than the last time the CMIP Manager 128 had an association with the NPAC/SMS 74. The Resynch Subscription Version Process 136 also sets a downtime flag in an audit database table to indicate that an audit was ongoing during a period of downtime.

The CMIP Manager 128 also receives notifications from the NPAC/SMS 74. These notification transactions are sent to an Unsolicited Event Handler 138 which, in turn, processes the transactions and updates the SOA Database 126 when necessary. The Unsolicited Events Message Handler 138 waits for a message to be sent from the CMIP Manager 128. When the Unsolicited Events Message Handler 138 receives a message from the CMIP Manager 128, the Unsolicited Events Message Handler 138 determines the type of message and performs the required actions for that message type. When the action is complete, the Unsolicited Events Message Handler 138 formats and sends a reply to the CMIP Manager 128, which translates the message into a CMIP event and sends the event to NPAC/SMS 74.

The IBA Subscription Version Report 140, which is monitored and controlled by the operator, is used to report discrepancies between the SOA Database 126 and the RIBA Database 144, which is located in the Regional Interface Broadcast Agent ("RIBA") Subsystem 76. The Check Link 134 monitors the physical connection between the SOA Subsystem 72 and NPAC/SMS 74 so that if the physical connection is broken, the Check Link 134 will reset the SOA Subsystem 72.

The SOA Converter Process 142 is a stand-alone process for NPA-NXX Split processing that performs a conversion of the telephone number value in the SOA Subscription Version table. Using tunable database links, the SOA Converter Process 142 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the SOA Converter Process 142 performs a telephone; number conversion. Each Subscription Version is retrieved from the SOA Database 126 to determine if the telephone number contains the old NPA-NXX. If so, the telephone number is modified to the new NPA-NXX. Other processes within the SOA Subsystem 72 continue processing during the conversion.

Figure 6:
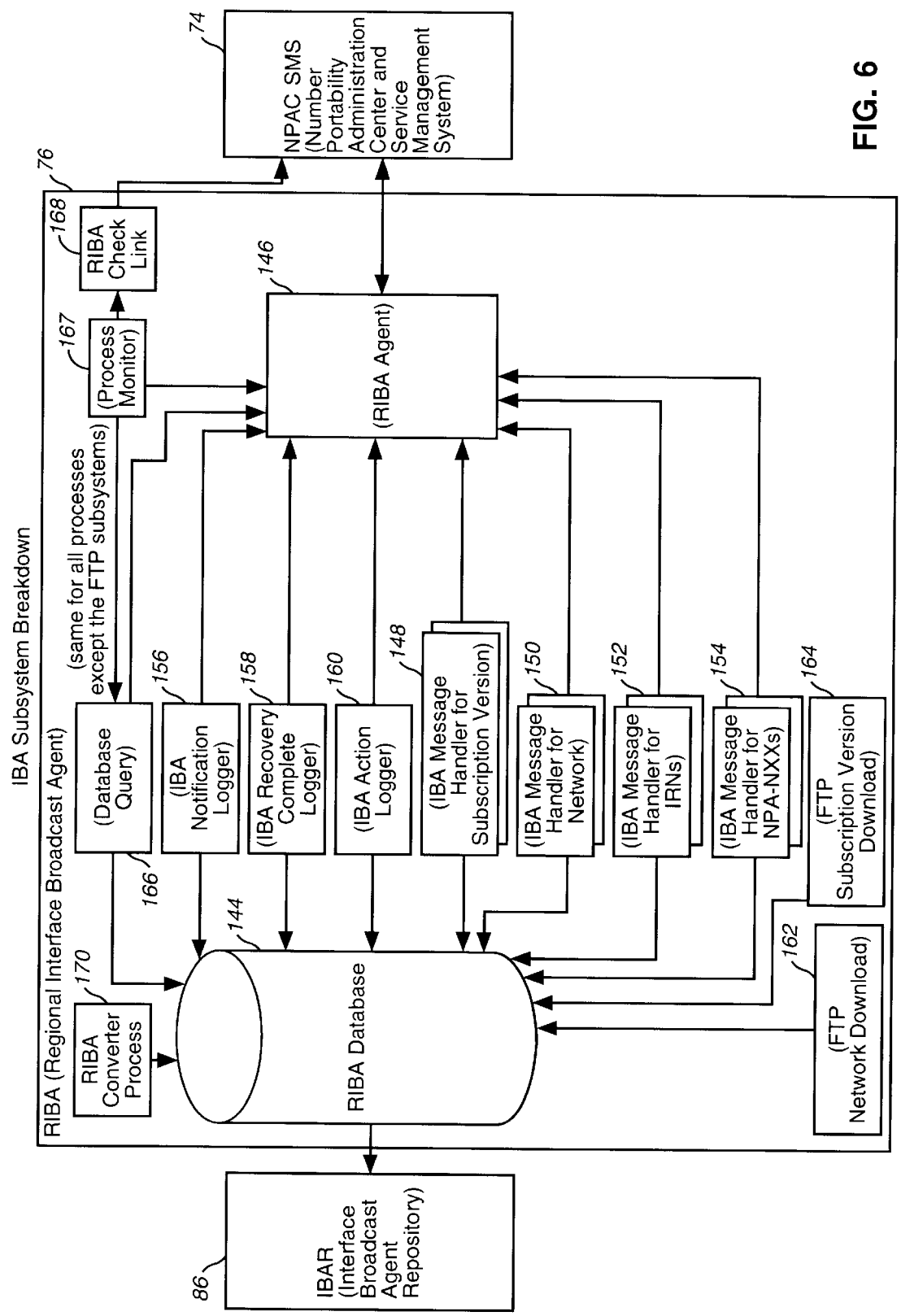
FIG. 6 is a block diagram of the IBA broken down into its component subsystems according to one embodiment.

Turning to FIG. 6, the Regional Interface Broadcast Agent ("RIBA") Subsystem 76 is broken down into its functional components. In general, the RIBA Subsystem 76 provides the interface between the NPAC/SMS 74 and the Interface Broadcast Agent Repository ("IBAR") Subsystem 86. When the NPAC/SMS 74 sends a message to the RIBA Subsystem 76, it is received by the RIBA Agent 146, which validates and strips the message of protocol related information. The RIBA Agent 146 then determines where the message is addressed to and sends the data to the appropriate application.

Messages from the NPAC/SMS 74 that request operations to be performed on tables within the RIBA Database 144, such as SET, CREATE and DELETE, are sent to RIBA Message Handlers. FIG. 6 illustrates the use of four (4) RIBA Message Handlers, each handling CMIP messages for a specific object type and performing updating operations on tables within the RIBA Database 144: a Subscription Version Message Handler 148; a Network Message Handler 150; a LRN Message Handler 152; and a NPA-NXX Message Handler 154. When the appropriate RIBA Message Handler, either 148, 150, 152 or 154, accepts the message, the data is then extracted from the message and the operation is determined. An SQL statement is built for the action using the data values extracted from the message. The SQL statement is then performed, which updates the RIBA Database 144.

The FTP Network Download 162 and FTP Subscription Version Download 164 applications can update or restore the RIBA Database 144 and IBAR Database 172 from the NPAC/SMS 74 via FTP/TCPIP. These FTP applications 162 and 164, which are controlled by an operator, read the subscription version and service provider network information from the NPAC/SMS 74 via FTP/TCPIP to form a flat file and update the appropriate database tables with the new information. These activities should be appropriately logged.

Upon startup, the IBA Agent 146 uses the Database Query process 166 to read each data item (subscription version, service provider network, LRN, and NPA-NXX information) from the RIBA Database 144 and loads them into memory. These data items form the Managed Instance Tree ("MIT"), which is used by the RIBA Subsystem 76 as reference points to the stored data during its operation. Once the load has been completed, the RIBA Agent 146 binds to the NPAC/SMS 74 and sends a download and recovery complete transaction to desynchronize the RIBA Subsystem 76. When the bind has been successfully established, the RIBA Agent 146 requests that the NPAC/SMS 74 download all of the subscription, NPA-NXX and LRN data which was accumulated during the time that the IBA Agent 146 was not bound to the NPAC/SMS 74. Upon successful completion of the download, the RIBA Agent 146 informs the NPAC/SMS 74 that the download has been completed and normal processing resumes.

The RIBA Agent 146 also receives notification, recovery complete and action transactions, which are forwarded to the appropriate logging utilities: a Notification Logger 156; a Recovery Complete Logger 158; and an Action Logger 160. These logging utilities, 156, 158 and 160, perform actions that are common to the RIBA log and notification programs. These procedures are contained in a separate program file and linked with the log and notification programs. When changes are required in the utility functions, these changes only need to be made in one place and the programs recompiled. These utilities process and handle the transactions and update the RIBA Database 144.

In use, the NPAC/SMS 74 sends variable length create requests to the RIBA Agent 146 consisting of subscription data and a list of one or more telephone numbers for each subscription data element. The RIBA Agent 146 extracts the create request from the CMIP message and formats it into a structure suitable for use by the Action Logger 146 which, in turn, extracts the subscription version data from the structure. The Action Logger 146, which communicates directly with the RIBA Agent 146, is started by the Process Monitor 132 at the request of the RIBA Agent 146.

The Notification Logger 156 is used to log notifications received by the RIBA Agent 146. In this way, the NPAC-SMS Operational Information and Version New NPA-NXX notifications are logged. The RIBA Agent 146 receives these notifications from the NPAC/SMS 74, formats the information into a usable structure and forwards the structure to the Notification Logger 156 over a UNIX socket. The Notification Logger 156 is started by the Process Monitor 132 at the request of the RIBA Agent 146.

The Recovery Complete Logger 158 is used to log Recovery Complete Replies and Download Replies sent by the NPAC/SMS 74 to the RIBA Agent 146. The RIBA Agent 146 receives these actions from the NPAC/SMS 74, formats the information into a usable structure and forwards the structure to the Recovery Complete Logger 156 over a UNIX socket. The Recovery Complete Logger 156 is started by the Process Monitor 132 at the request of the RIBA Agent 146.

Table 2 is a domain field listing for an the IBA Database 144 according to one embodiment:

TABLE 2

Domain field list for IBA Database.

| Name | Code | Label | Type |
| --- | --- | --- | --- |
| Billing identifier | BILLING_ID | Billing Identifier | VARCHAR2(4) |
| booleanIndicator | BOOL_IND | Boolean Indicator | NUMBER(1) |
| city | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |
| CNAM SSN | CNAM_SSN | | NUMBER(3) |
| contactType | CONTACT_TYPE | Contact Type | VARCHAR2(2) |
| country | COUNTRY | | VARCHAR2(20) |
| endUserLocationType | END_USER_LOC_TYPE | | VARCHAR2(2) |
| endUserLocationValue | END_USER_LOC_VALUE | | VARCHAR2(12) |
| identifier | ID | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |

TABLE 2-continued

Domain field list for IBA Database.

| Name | Code | Label | Type |
|---|---|---|---|
| operationAction | OPER_ACT | | NUMBER(3) |
| organizationId | ORGNZ_ID | ID number of an organization, client, NPAC, regional IBA. | VARCHAR(3) |
| Postal Code | PC | Postal Code | VARCHAR2(40) |
| servProvID | SP_ID | | VARCHAR2(4) |
| stateProvince | STATE_PROV | State/Province | VARCHAR2(2) |
| status | STATUS | Status Flag | NUMBER(10) |
| systemType | SYSTEM_TYPE | | N1 |
| telephoneNumber | TN | Telephone Number | VARCHAR2(10) |
| timestamp | T | | DATE |
| tunableName | TUNABLE_NAME | Tunable Name | VARCHAR2(40) |
| tunableValue | TUNABLE_VALUE | Tunable Value | VARCHAR2(40) |
| userIdentifier | USER_ID | | VARCHAR2(30) |
| zip | ZIP | | VARCHAR2(40) |

The RIBA Process Monitor 167, which was previously described in reference to the SOA Subsystem 72 (FIG. 5), watches over all of the standard applications or processes required to run the RIBA Subsystem 76. The RIBA Process Monitor 167 does not, however, monitor the FTP processes 162 and 164, or the RIBA Converter Process 170. The RIBA Process Monitor 167 starts applications when they are required and is notified if an application terminates. If an application, which is intended to always be running terminates, such as the RIBA Agent 146 and RIBA Check Link 168, the RIBA Process Monitor 167 will automatically restart the terminated application. The RIBA Check Link application 168 monitors the physical connection between the RIBA Subsystem 76 and NPAC/SMS 74. If the physical connection is broken, the RIBA Check Link 168 will reset the RIBA Subsystem 76.

The RIBA Converter Process 170 is a stand-alone process for NPA-NXX Split processing that performs a conversion of the telephone number value in the RIBA Subscription Version table. Using tunable database links, the RIBA Converter Process 170 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the RIBA Converter Process 170 performs a telephone number conversion. Each telephone number record is retrieved from the RIBA Database 144 to determine if the telephone number contains the old NPA-NXX. If so, the telephone number is modified to the new NPA-NXX. Other processes within the RIBA Subsystem 76 are suspended for the duration of the conversion process.

Figure 7:
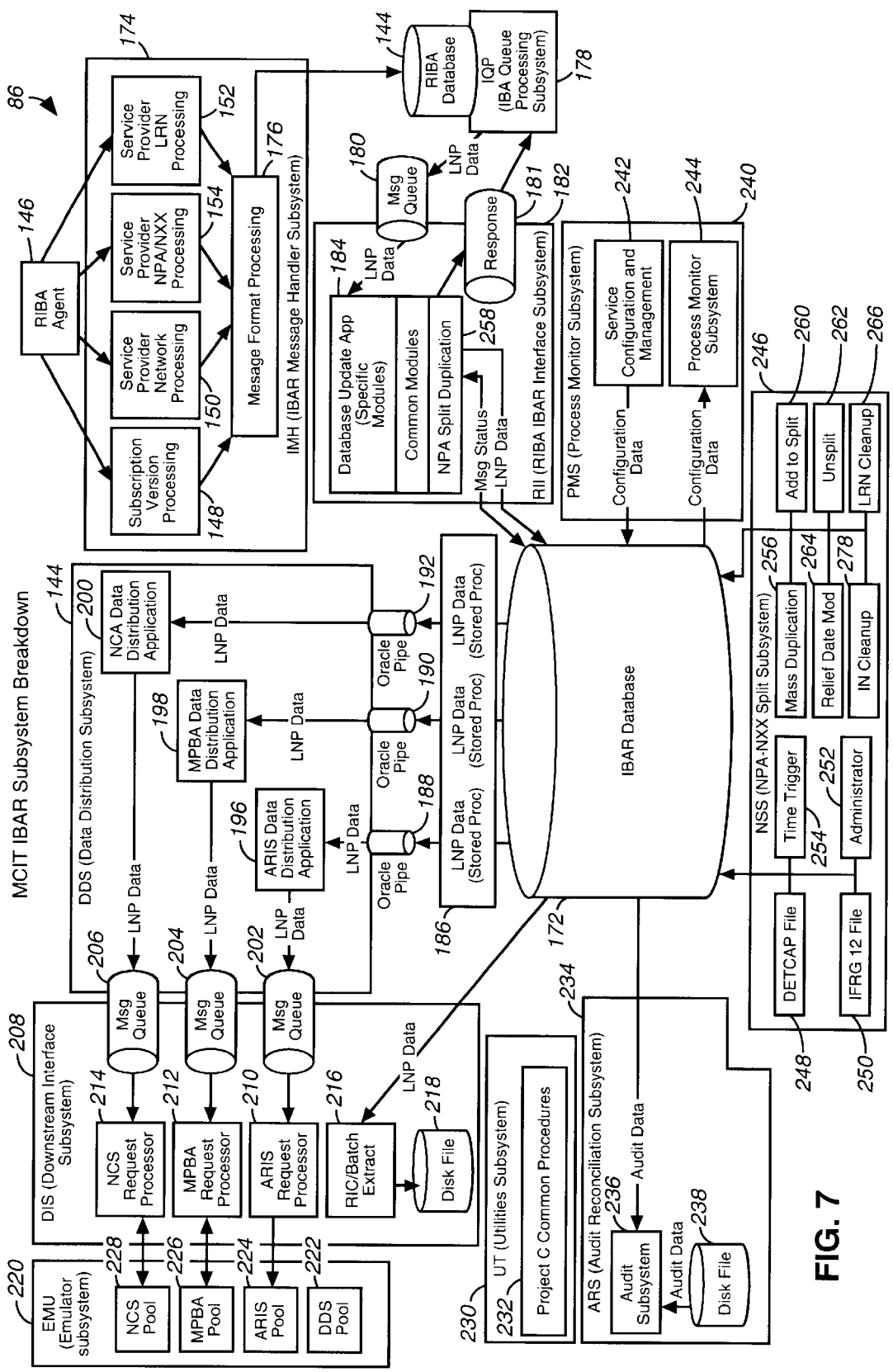
FIG. 7 is a block diagram of the IBAR broken down into its component subsystems according to one embodiment.

Turning to FIG. 7, the Interface Broadcast Agent Repository ("IBAR") Subsystem is shown and denoted generally as 86. A particularly advantageous aspect of the present invention is that it provides interfaces from the IBAR Subsystem 86 to internal systems operated by the individual service providers. FIG. 7 illustrates four (4) proprietary downstream systems have been coupled to the IBAR Subsystem 86 for receiving data. The NCS 100 and RTE7 102 systems manage local number portability information in the long distance environment while the MINA/SMS 98 is configured to manage local number portability information on the local service network level. Also, the ARIS 96 collects local number portability ("LNP") information for distribution to service provider business systems 68 (FIG. 2) and 88 (FIG. 3).

As such, and according to one embodiment of the invention, the IBAR Subsystem 86 supports the following features:

A facility to consolidate LNP data from the RIBA Database 144 into the IBAR Database 172.

A data distribution application that manages distribution of data to the ARIS 96, MINA/SMS 98, and NCS 100 systems. This application will track the status of transactions to each of these systems.

An on-line interface to the NCS long distance support system 100 preferably using the DECmessageQ product from Digital Equipment Corp.

An on-line interface to the MINA/SMS system 98 preferably using Service Builder System Management Interface product from Northern Telecom.

An on-line interface to the ARIS system 96 preferably using the Registry Messaging product from MCI.

A batch interface to the RTE7 long distance support system 102 using FTP.

NPA-NXX Split Processing.

The IBAR Message Handler Subsystem 174 comprises the message handlers in the RIBA Subsystem 76 (FIG. 6). As previously described, the RIBA Agent 146 receives messages containing data from the NPAC/SMS 74 (FIG. 6). These messages are then directed to the proper message handlers: Subscription Version Message Handler 148, Network Message Handler 150, LRN Message Handler 152, and NPA-NXX Message Handler 154. These message handlers process the messages and data in block 176 (not explicitly shown in FIG. 6) and stores the data in the RIBA Database 144. The IBAR Message Handler Subsystem 174 also inserts the data into a feeder table which will be read by the IBA Queue Processing Subsystem 178.

The IBA Queue Processing Subsystem 178, which is responsible for sending all changes received by the RIBA Database 144 to the RIBA/IBAR Interface Subsystem 182, reads the data from the feeder table and tags each message with a tracking number before it is put into the Message Queue 180. As will be described below, the tracking number ensures that the messages are delivered in sequential order.

The RIBA/IBAR Interface Subsystem 182 is responsible for keeping the IBAR Database 172 up to date with the changes that are made in the RIBA Database 144. The RIBA/IBAR Interface Subsystem 182 includes a database update application 184 that reads and processes the messages from the Message Queue 180. During processing, the underlying message data is acquired and organized by tasks, which are broken down at the "object" level (i.e. Telephone Number, Audit, Service Provider, and Network). The database update application 184 then updates the appropriate database fields in the IBAR Database 172 with the "object" data and calls stored procedures 186 to populate dedicated links 188, 190 and 192 with the information stored in the IBAR Database 172.

To ensure that duplicate messages are not processed, the RIBA/IBAR Interface Subsystem 182 verifies that each message read from the Message Queue 180 is the next consecutively numbered message. The RIBA/IBAR Interface Subsystem 182 also provides the ability to track messages from any RIBA Subsystem 76 by recording all tracking numbers associated with each RIBA Subsystem 76 and its associated record in the IBAR Database 172.

At the end of a successful transaction, the RIBA/IBAR Interface Subsystem 182 sends a response to the Response Queue 181 for each message received from Message Queue 180 as to whether it was successfully applied, rejected due to validation errors, or needs to be resent to the Message Queue 180. The IBA Queue Processing Subsystem 178 reads the responses from the Response Queue 181, processes them, and makes the appropriate updates to the table. For example, if the tracking number is out of sequence, the RIBA/IBAR Interface Subsystem 182 issues a "resend" of the specific message and any messages that have been put into the Message Queue 180 after the specific message. If, however, the specific message cannot be found in the table, the IBA Queue Processing Subsystem 178 sends a "lost" message notification and the resend process continues.

Multiple instances of the RIBA/IBAR Interface Subsystem 182 can be run to accommodate various types of NPAC/SMS 74. This allows each NPAC/SMS 74 to have different information that is to be sent to the RIBA Subsystem 76 and then to the IBAR Subsystem 86. As a result, a version ID is used to identify the type of NPAC/SMS 74 reviewing a given region so that all information can be sent to one Message Queue 180.

As mentioned above, stored procedures 186 extract data from the IBAR Database 172 and write the data to the appropriate dedicated links 188, 190 and 192. Each downstream on-line Data Distribution Application has its own dedicated link (e.g., link 188 for ARIS 96 messages, link 190 for MINA/SMS 98 messages and link 192 for NCS 100 messages). Data from each dedicated link is then read by the appropriate dedicated Data Distribution Application (e.g., application 196 for ARIS 96 messages, application 198 for MINA/SMS 98 messages, and application 200 for NCS 100 messages).

These dedicated Data Distribution Applications, which are part of the Data Distribution Subsystem 194, then send the transactions to a second set of Message Queues, each dedicated Data Distribution Application having its own dedicated Message Queue (e.g., Message Queue 202 for ARIS 96 messages, Message Queue 204 for MINA/SMS 98 messages, and Message Queue 206 for NCS 100 messages). The Message Queues 202, 204 and 208 then send the transactions to the Downstream Interface Subsystem 208, which contains an interface for each application format (e.g., ARIS Request Processing Interface 210 for ARIS 96 messages, MINA/SMS Request Processing Interface 212 for MINA/SMS 98 messages, and NCS Request Processing Interface 214 for NCS 100 messages).

Once the message has been sent to the appropriate interface in the Downstream Interface Subsystem 208, the status of the record in the IBAR Database 172 will be changed to "Sending." In addition, the Message Queues 202, 204 and 206 are continuously monitored as transactions are added to them so that any errors can be found and an alarmed can be triggered. In the event of a message failure, or a process or system failure, or during system startup, a recovery process is started and the status of the records in the IBAR Database 172 are checked. During this recovery process, all records in the IBAR Database 172 having a status of "Sending" will be resent to the Downstream Interface Subsystem 208 in the same manner as previously described. Regular processing of messages from the IBAR Database 172 to the Downstream Interface Subsystem 208 will be held up until the recovery process is complete.

In the Downstream Interface Subsystem 208, a custom request processing application for each on-line interface to a network provider's external system will read the requests from a message and facilitate the transfer over the specific interface. They will format the data as required by the interface (e.g., Northern Telecom's Service Management Interface protocol requirements) and ensure that the data is delivered across the interface. Typically, the data is sent in a synchronous manner to the network provider's external system via an ASCII based TCP/IP socket interface. The network provider's external system is responsible for queuing the data to a serial communication port. The responses received from the network provider's external system can be sent in an asynchronous manner. Although the Downstream Interface Subsystem 208 as illustrated in FIG. 7 supports four proprietary interfaces, it should be understood that any interface can be supported depending on the external system used by the service provider.

The Downstream Interface Subsystem 208 uses various mechanisms that allow the IBAR Subsystem 86 to communicate with external systems. For example, the MINA/SMS Request Processing Interface 212 is implemented as a stream of data sent via a TCP/IP socket interface using SMI protocol. The NCS Request Processing Interface 214 is implemented using the ported telephone number and request Service Provider NPA-NXX data and is set up as a two-way dialog, i.e. data is sent to the NCS 100 and the NCS 100 replies after processing the data. The ARIS Request Processing Interface 210 is implemented using the ported telephone number data and uses MCI Registry or a similar communications protocol, which is a one-way dialog, i.e. data is sent to ARIS 96, but ARIS 96 does not return confirmation after processing the data. Unlike the other Request Processing Interfaces 210, 212 and 214, the RTE7 Batch Extract 216 consists of a regularly scheduled batch job that extracts the required transactions directly from the IBAR Database 172 and writes them to a disk file 218. The resulting disk file 218 is transmitted to RTE7 102 via TCP/IP using FTP.

Using the above described Request Processing Interfaces 210, 212 and 214, a user is able to access a menu from which the user can: connect or disconnect from the NCS Message Queue; logon or logoff the MINA/SMS session; or register or deregister from the ARIS registry. In response to the user's selection, the Service Configuration and Management Application 242 sends a signal to one of three Request Processing Interfaces 210, 212 or 214. For example, in the UNIX operating environment, two signals are used: SIGUSRI and SIGUSR2. The SIGUSRI signal is used for "connect", "logon" and "register" commands; whereas the SIGUSR2 signal is used for "disconnect", "logoff" and "deregister" commands.

An Emulator Subsystem 220 is communicably linked to the Downstream Interface Subsystem 208 and is used for testing and validating the Downstream Interface Subsystem 208. Communication between the Downstream Interface Subsystem 208 and Emulator Subsystem 220 is accomplished using different protocols for each individual program, such as: a DEC Message Queue for the DDS Emulator 222 and the NCS Emulator 228; a UNIX TCP/IP socket library for the MINA/SMS Emulator 226; and Registry for the ARIS Emulator 224.

The Utilities Subsystem 230 contains a set of utility functions and common procedures 232 that are used to speed up the development of UNIX and SQL programs. These functions have been developed specifically for use in the IBAR Subsystem 86 application environment and provide solutions to common problem requirements such as Oracle stored procedures 184, Message Queue access, FTP access, error handling, process signal control and any other software functions that may be best implemented as a utility.

An Audit Reconciliation Subsystem 234 provides service providers interfacing with the IBAR Subsystem 86 the ability to audit their databases against the IBAR Database 172. Some service providers may consider the IBAR Database 172 to be the database of record for LNP data. The Audit Reconciliation Subsystem 234 supports both regularly scheduled and on demand audit requests. The Audit Reconciliation Subsystem 234 will support requests for subsets of the data in the IBAR database 162 as well as complete database dumps. A system administrator can schedule these requests and will manually clean out any audit files that are no longer required. Specifically, the Audit Subsystem 236 extracts the audit data from the IBAR Database 172 and writes it to a disk file 238 that can be distributed using FTP.

The Process Monitor Subsystem 240 provides the means to start and stop the IBAR applications and includes the Service Configuration and Management Application 242, which was previously described, and a Process Manager 244. The Service Configuration and Management Application 242 provides the means to stop and restart communications between each of the real time on-line interfaces found in the Distribution Interface Subsystem 208 and its downstream server counterpart operated by the service provider. The Process Manager 244 provides the means to stop and restart the RIBA/IBAR Interface Subsystem 182, the Data Distribution Subsystem 194 and the Downstream Interface Subsystem 208. Accordingly, the Process Monitor Subsystem 244 is started at system start-up and spawns the initial IBAR applications. The Process Monitor 244 also monitors each application process and will re-start any process that terminates abnormally. In other embodiments, the Process Monitor 244 can spawn more copies of the same systems upon request. The initial information is stored in a file and loaded by the Process Monitor 244 when it is started.

The NPA-NXX Split Subsystem 246 is responsible for processing NPA splits and includes several processes: NETCAP File Access Process 248; LERG 12 File Access Process 250; Administrator Process 252; Time Trigger Process 254; Mass Duplication Process 256; Add-to-Split Process 260; Unsplit Process 262; Relief Date Modification Process 264; LRN Cleanup Process 266; and Telephone Number Cleanup Process 268. These processes are described below.

The NETCAP File Access Process 248 determines when an NPA is going to split, what the new NPA-NXX is going to be, and at what date the split will occur. The NETCAP File Access Process 248 reads the NETCAP file and updates the NPA Split table in the IBAR Database 172 as appropriate. The NPA Split table in the IBAR Database 172 is where the status of each split is tracked and is used to provide the key input for driving NPA Split processing. The NETCAP file is the primary external data source of NPA Split information and is in a mainframe dataset format that must first be retrieved via FTP or some other mainframe-to-Unix utility.

Although the NETCAP File Access Process 248 is preferably a regularly scheduled daily batch job, it can also be started manually by the system operator.

More specifically, the NETCAP File Access Process 248 first determines whether the NPA-NXX in the NETCAP file is portable by looking for the NPA-NXX in the IBAR Database 172. If the NPA-NXX does not exist in the IBAR Database 172, the NPA-NXX is bypassed. If on the other hand, the NPA-NXX does exist, the NPA-NXX is deemed to be portable and the RIBA Subsystem 76 associated the NPA-NXX is determined using the Action ID in the IBAR Database 172.

The NETCAP File Access Process 248 then determines the type of record to insert, modify or delete in the NPA Split table for the portable NPA-NXX. Existing NPA Split records having a status of "Completed" are deleted. A NPA Split record having an action of "Unsplit" may also be deleted prior to the Duplication Trigger Point. If the Relief Date for a NPA split record changes before the Mass Duplication Process 256 has been run, then only the NPA Split record's Relief Date is modified and the Relief Date Modification Process is not required.

The LERG12 File Access Process 250 reads the LERG 12 file and updates the LERG 12 table in the IBAR Database 172 as appropriate. The LERG 12 file is a mainframe dataset that is downloaded as a flat file for processing and is used as a secondary external data source of NPA Split information as it pertains to LRNs. The NPA-NXXs defined in the NETCAP data serve to identify both telephone numbers and LRNs affected by a split, as it is understood that LRNs contain valid NPA-NXXs. The LERG 12 data is used for confirmation that the LRNs identified as split-affected by the NETCAP data are valid split-affected LRNs according to the LERG. The LERG 12 File Access Process 250 is preferably a regularly scheduled monthly batch job.

The LERG12 File Access Process 250 checks for the existence of a LERG 12 flat-file. If one exists, the LERG 12 table, which is used for exception reporting, is purged so that the LERG 12 flat-file data can be re-inserted in the IBAR Database 172. This effectively replaces the old data in the LERG 12 table with the new data from the LERG 12 flat-file. The LERG 12 File Access Process 250 also has the ability to designate the LERG 12 flat-file via a command-line specified filename (optional), instead of using the default provided within the program.

The Administrator Process 252 produces exception reports based on information retrieved from the IBAR Database 172, the NETCAP file and the LERG 12 file. This process is executed on demand by a systems administrator or operator.

The Time Trigger Process 254 reads the NPA Split table in the IBAR Database 172 and processes each active record according to the Action and Status attributes and other tunable parameters, such as the Duplication Trigger Point. The Duplication Trigger Point is a tunable period of time prior to the start of Permissive Dialing Period. The Time Trigger Process 254 updates the NPA Split table as appropriate and starts the following processes: the Mass Duplication Process 256, the Add-to-Split Process 260, the Unsplit Process 262, the Relief Date Modification Process 264, the LRN Cleanup Process 266, and the Telephone Number Cleanup Process 268.

The Time Trigger Process 254 is also responsible for setting a suspend flag in the IBAR Database 172 that, as will be described below, suspends the RIBA/IBAR transaction flow prior to the running of the Mass Duplication Process 256, the Add-to-Split Process 260 and the Unsplit Process 262. This ensures that all existing IBAR transactions will be processed without interruption of the incoming flow and that none of the new incoming transactions will be inadvertently bypassed during split processing. Once the Mass Duplication Process 256, Add-to-Split Process 260 and Unsplit Process 262 are complete, the Time Trigger Process 254 resets the suspend flag.

The Time Trigger Process 254 runs continuously under the control of the Process Monitor 244. At a tunable period of time and after each pass through the NPA Split table, the Time Trigger Process 254 sleeps for a short time. There will be one instance of the Time Trigger Process 254 for each RIBA Subsystem 76 to facilitate processing of the NPA Split table. Each RIBA Subsystem 76 will process only the NPA-NXXs particular to the region serviced by the RIBA Subsystem 76 and the Regional NPAC/SMS 74. Each NPA Split record is processed in a synchronous mode such that, for each NPA Split record read, a process may or may not be executed depending on its conditions, and the process will be completed before the next NPA Split record is retrieved.

The Mass Duplication Process 256 reads the IBAR Database 172 and determines which records need to be duplicated for NPA Splits. Each current record that contains the affected NPA-NXX and an action of "Activate" or "Modify" is duplicated. The duplicated records are written to the IBAR Database 172 and then sent to MINA/SMS 98 by batch file and to the NCS 100 via Oracle pipes. The duplicated records are not sent to ARIS 96. The Mass Duplication Process 256 is started by the Time Trigger Process 254 when the Duplication Trigger Point is reached for a given NPA-NXX.

The NPA Split Duplication Process 258 within the RIBA/IBAR Interface Subsystem 182 is responsible for notifying the IBA Queue Processing Subsystem 178 to suspend the RIBA to IBAR transaction flow and for duplicating incoming transactions at the appropriate time. For NPA Split processing, the NPA Split Duplication Process 258 regularly examines the suspend flag in the IBAR Database 172 that is set by the Time Trigger Process 254. When the suspend flag is set, the NPA Split Duplication Process 258 notifies the IBA Queue Processing Subsystem 178 via the Response Queue 181, which then stops sending messages from the RIBA Database 144 to the Message Queue 180. The IBA Queue Processing Subsystem 178 periodically sends a message to the RIBA/IBAR Interface Subsystem 182 prompting the NPA Split Duplication Process 258 to check on the status of the suspend flag. Once the suspend flag has been reset by the Time Trigger Process 254, the NPA Split Duplication Process 258 notifies the IBA Queue Processing Subsystem 178 via the Response Queue 181 to resume sending messages.

For duplicating incoming transactions, the NPA Split Duplication Process 258 first completes regular processing of each transaction, including committing the record to the IBAR Database 172. The NPA Split Duplication Process 258 then compares each transaction against the NPA Split table in the IBAR Database 172 to determine whether the transaction is to be duplicated or not. A transaction is duplicated if the telephone number contains an affected NPA-NXX, the action is "Activate," "Modify" or "Disconnect" and the current processing time is between the Duplication Trigger Point and the Mandatory Dialing Date. Duplicated transactions are assigned an Action ID indicating that it is a duplicate and not an original transaction.

Transactions that are duplicated during the period from the Duplication Trigger Point to the Relief Date are sent only to MINA/SMS 98 and NCS 100 via existing mechanisms. Transactions that are duplicated during the period from the Relief Date to the Mandatory Dialing Date are sent to ARIS 96, MINA/SMS 98 and NCS 100 via existing mechanisms.

The Add-to-Split Process 260 performs the same role as the Mass Duplication Process 256 in reading the IBAR Database 172 and determining which records need to be duplicated for NPA Splits. This process, however, can be triggered by the Time Trigger Process 254 at any time that the Time Trigger Process 254 retrieves an NPA Split record indicating that an NPA-NXX requires Add-to-Split processing. An Add-to-Split can occur before and during the Permissive Dialing Period, with the same, or with different, start and end Permissive Dialing Period dates.

The records duplicated by the Add-to-Split Process 260 are written to the IBAR Database 172 and then sent to MINA/SMS 98 via the regular mechanism and not by batch file, as in the case of the Mass Duplication Process 256. These duplicated records are also sent to NCS 100, but are not sent to ARIS 96.

The Unsplit Process 262 reads the IBAR Database 172 and determines which telephone numbers require a "Duplicated Disconnect" transaction, due to a NPA-NXX Unsplit. A "Duplicate Disconnect" transaction is created for each telephone number that contains an NPA-NXX that has been unsplit, and any action other than "Disconnect" or "Duplicate-Disconnect." The "Duplicate Disconnect" transactions are sent to NCS 100 via the regular method, but are not sent to the ARIS 96 or the MINA/SMS 98. ARIS 96 performs Unsplit processing of its own and MINA/SMS 98 is informed of "Disconnect" telephone numbers via E-mail.

The Unsplit Process 262 can be triggered by the Time Trigger Process 254 at any time between the Duplication Trigger Point and the Mandatory Dialing Date, if the Mass Duplication Process 256 has been run. The Time Trigger Process 254 ensures that the RIBA/IBAR incoming transaction feed is suspended prior to the running of the Unsplit Process 262.

The Relief Date Modification Process 264 reads the IBAR Database 172 and determines which records need to be updated with a new Relief Date. Each record that contains an affected NPA-NXX is updated with the new Relief Date. These modifications are not sent to ARIS 96, MINA/SMS 98 or NCS 100. The Relief Date Modification Process 264 is triggered by the Time Trigger Process 254 at any time prior to Permissive Dialing Period if the Mass Duplication Process 256 has been run.

The LRN Cleanup Process 266 reads the IBAR Database 172 and determines which records require a modification to the LRN attribute. A "Modify" transaction is created for each record that contains an LRN with an old NPA-NXX, a telephone number not containing an old NPA-NXX, and any action other than "Disconnect" or "Duplicate Disconnect." The "Modify" transactions are sent to ARIS 96, MINA/SMS 98 and NCS 100 using the regular methods. The LRN Cleanup Process 266 is triggered by the Time Trigger Process 254 to run at the LRN Clean-up Trigger Point, which is a tunable number of hours prior to the Mandatory Dialing Date.

The Telephone Number Cleanup Process 268 reads the IBAR Database 172 and determines which records require a "Disconnect" transaction. A "Disconnect" transaction is created for each record that contains an old NPA-NXX and any action other than "Disconnect" or "Duplicate-Disconnect." The "Disconnect" transactions are sent to NCS 100 using the regular methods, but are not sent to ARIS 96 or MINA/SMS 98. The MINA/SMS 98 is informed of "Disconnect" telephone numbers via E-mail. The Telephone Number Cleanup Process 268 is triggered by the Time Trigger Process 254 at the telephone number Clean-up Trigger Point which is a tunable number of hours after the Mandatory Dialing Date.

Briefly referring back to FIGS. 3 and 4, the SOA Engine Subsystem 80 uses a message-based protocol to provide an interface between the Local Customer Order Entry/Order Processing ("OE/OP") Systems (collectively referred to as the "Front End") 78 and the SOA 32 and RIBA 34 Subsystems. Thus, the SOA Engine Subsystem 80 allows the Front End 78 to upload data, audit, query and otherwise communicate with the NPAC/SMS 74.

Figure 8:
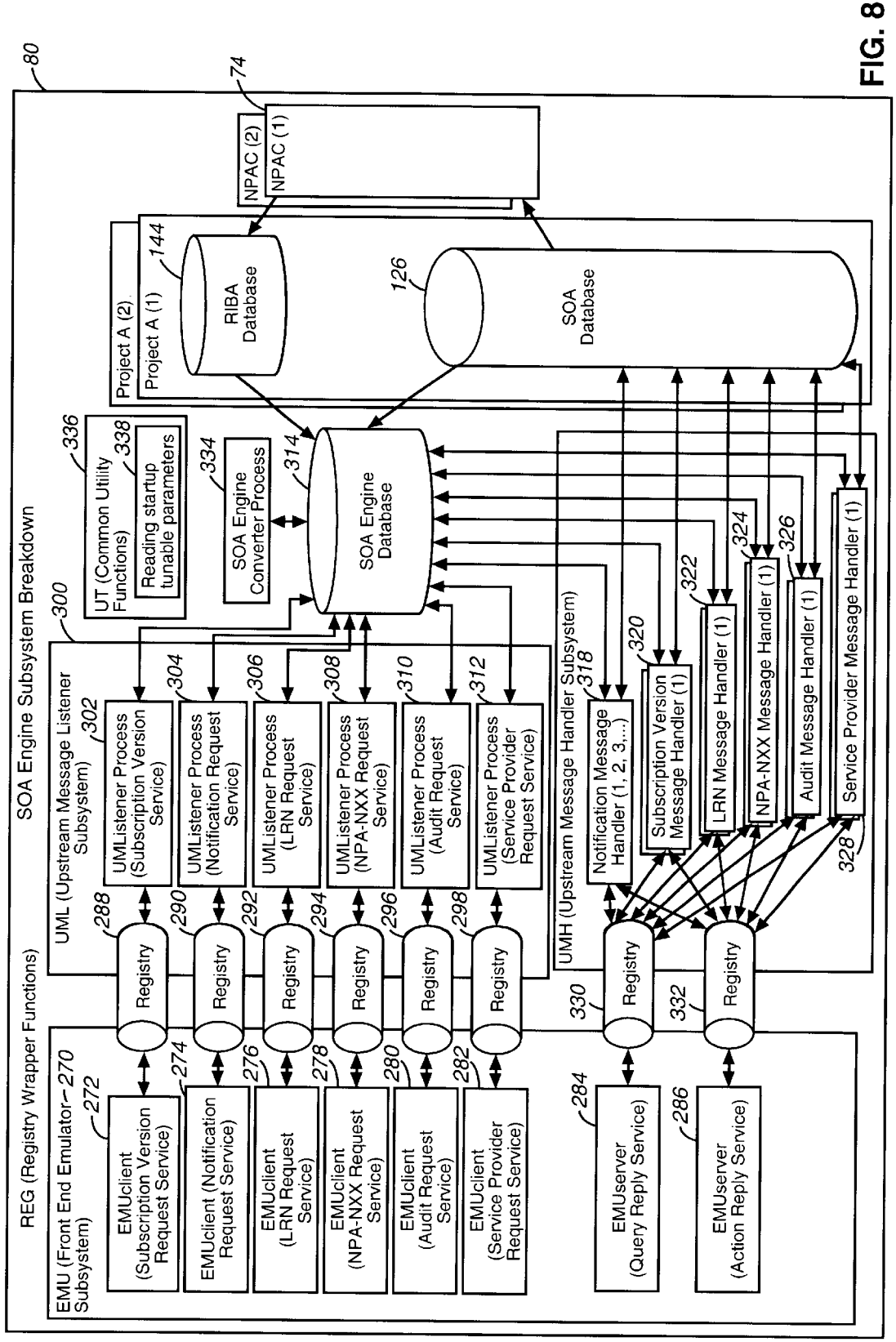
FIG. 8 is a block diagram of the SOA Engine broken down into its component subsystems according to one embodiment.

Now referring to FIG. 8, the SOA Engine Subsystem 80 will be described in detail. The Front End Emulator Subsystem 270 includes both client and server applications, which provide the interface between the SOA Engine Subsystem 80 and the Front End 78. The client applications handle requests from the Front End 78, whereas the server applications handle reply or responses to the Front End 78. More specifically and as illustrated in FIG. 8, the client applications may include a Subscription Version Request Service 272, a Notification Request Service 274, a LRN Request Service 276, a NPA-NXX Request Service 278, an Audit Request Service 280 and a Service Provider Request Service 282. The server applications may include a Query Reply Service 284 and an Action Reply Service 286.

Each client application 272, 274, 276, 278, 280 and 282 sends request messages from the Front End 78 to an Upstream Message Listener Subsystem 300 using the appropriate Registry protocols 288, 290, 292, 294, 296 and 298. Once a client application 272, 274, 276, 278, 280 or 282 sends a request message, that client application will wait for a reply message before sending another request message.

For each request message, the Upstream Message Listener Subsystem 300 determines the particular NPAC/SMS 74 to which the request message is to be delivered to and writes the request message to the SOA Engine Database 314 using a Subscription Version Request Listener 302, a Notification Request Listener 304, a LRN Request Listener 306, a NPA-NXX Request Listener 308, an Audit Request Listener 310 and a Service Provider Request Listener 312. The appropriate Listener 302, 304, 306, 308, 310 or 312 also sends a reply message back to Front End 78 through the appropriate client application 272, 274, 276, 278, 280 or 282. The reply message indicates only that the request message has been received and queued for transmission to the appropriate NPAC/SMS 74, and does not indicate that the request message has been sent to or processed by the NPAC/SMS 74.

The SOA Engine Database 314 contains a queuing table for each type of request message. The Upstream Message Handler Subsystem 316 polls these queuing tables using a Notification Message Handler 318, a Subscription Version Message Handler 320, a LRN Message Handler 322, a NPA-NXX Message Handler 324, an Audit Message Handler 326 and a Service Provider Message Handler 328 to retrieve the appropriate records and processes them accordingly. These Message Handlers will now be described in more detail.

The Notification Message Handler 318 polls the Notification table in the SOA Engine Database 314 to retrieve all records and determines the action to be performed on each retrieved record based on the record message type and status. If the record is a new request, the information needed to create the response message will be fetched from the SOA Database 126 or the corresponding database table will be updated. As was previously described in regard to FIG. 5, the new request message is processed by the SOA Subsystem 72, sent to and processed by the NPAC/SMS 74 and a response message is created and returned containing the result of the new request message. If the record is not a new request, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Notification table in the SOA Engine Database 314. Otherwise, the result status of Notification table will be updated for the request. The Notification Message Handler 318 keeps running until all the records in the Notification table are processed. If there are no more records in the Notification table, the Notification Message Handler 318 sleeps for a certain time before it wakes up and begins to poll the Notification table again.

The Subscription Version Message Handler 320 polls the Subscription Version queuing table in the SOA Engine Database 314 to retrieve all records based on a telephone number range. The Subscription Version Message Handler 320 analyzes each retrieved record and determines the action to be performed based on the record message type and status. If the record is a new message the Subscription Version Message Handler 320 calls the appropriate stored procedure 120 (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the Subscription Version queuing table and a response message is created containing the message data and header. If the record is not a new message, a "resend" message will be reissued containing only the error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Subscription Version queuing table in the SOA Engine Database 314.

The LRN Message Handler 322 polls the LRN queuing table in the SOA Engine Database 314 to retrieve all LRN Message records. The LRN Message Handler 322 analyzes each retrieved record and determines the action to be performed based on the record message type, status and received date. If the record is a new message, the LRN Message Handler 322 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120

(FIG. 5), it is evaluated and a response message will be created. If the record is not a new message, the date of the record is examined. If it is expired, it will be deleted from LRN queuing table. Otherwise, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the LRN Message Handler 322. If the LRN Message Handler 322 receives the confirmation message, the LRN Message Handler 322 deletes the record from the LRN Message queuing table in the SOA Engine Database 314. Otherwise, the result status of the LRN Message queuing table will be updated for the request.

The NPA-NXX Message Handler 324 polls the NPA-NXX queuing table in the SOA Engine Database 314 to retrieve all NPA-NXX Message records. The NPA-NXX Message Handler 324 analyzes each record retrieved and determines the action to be performed based on the message type, status, and received date. If the record is a new message, the NPA-NXX Message Handler 324 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message created. If the record is not a new message, the date of the record is examined and if it is expired, it will be deleted from NPA-NXX queuing table. Otherwise, an error response message is created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the NPA-NXX Message Handler 324. If the NPA-NXX Message Handler 324 receives the confirmation message, the NPA-NXX Message Handler 324 deletes the record from the NPA-NXX queuing table in the SOA Engine Database 314. Otherwise, the result status of the NPA-NXX queuing table will be updated for the request.

The Audit Message Handler 326 polls the Audit queuing table in the SOA Engine Database 314 to retrieve all request records for processing. The Audit Message Handler 326 analyzes each record retrieved and determines the action to be performed based on the message type and status. If the record is a new message, the Audit Message Handler 326 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Audit Message Handler 326. The Audit Message Handler 326 waits until the confirmation message is received in order to delete the record from the message queuing table in the SOA Engine Database 314.

The Service Provider Message Handler 328 polls the Service Provider queuing table in the SOA Engine Database 314 to retrieve all request records. The Service Provider Message Handler 328 analyzes each record retrieved and determines the action to be performed based on the message type and status. If the record is a new message, the Service Provider Message Handler 328 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Service Provider Message Handler 328. The Service Provider Message Handler 328 waits until the confirmation message is received in order to delete the record from the message queuing table in the SOA Engine Database 314.

The SOA Engine Converter Process 334 is a stand-alone process that is started up as is needed. It accesses the NPA Split table in the IBAR Database 172, using tunable Oracle database links to determine the NPA-NXXs that are splitting and their Permissive Dialing Periods. At the start of a Permissive Dialing Period for a given NPA-NXX, the SOA Engine Converter Process 334 performs a telephone number conversion. Each telephone number record is retrieved from the SOA Engine Database 314 to determine if the telephone number contains the old NPA-NXX. If so, the telephone number is modified to the new NPA-NXX. Other processes within the SOA Engine Subsystem 80 continue processing during the conversion.

A Common Utility Function Subsystem 336 provides a set of utility functions that are available to speed development of UNIX and SQL programs. These utility functions, which include reading startup tunable parameters 338, are developed specifically for use in the SOA Engine Subsystem 80 application environment to provide solutions to common programming requirements, such as Oracle stored procedures.

Figure 9:
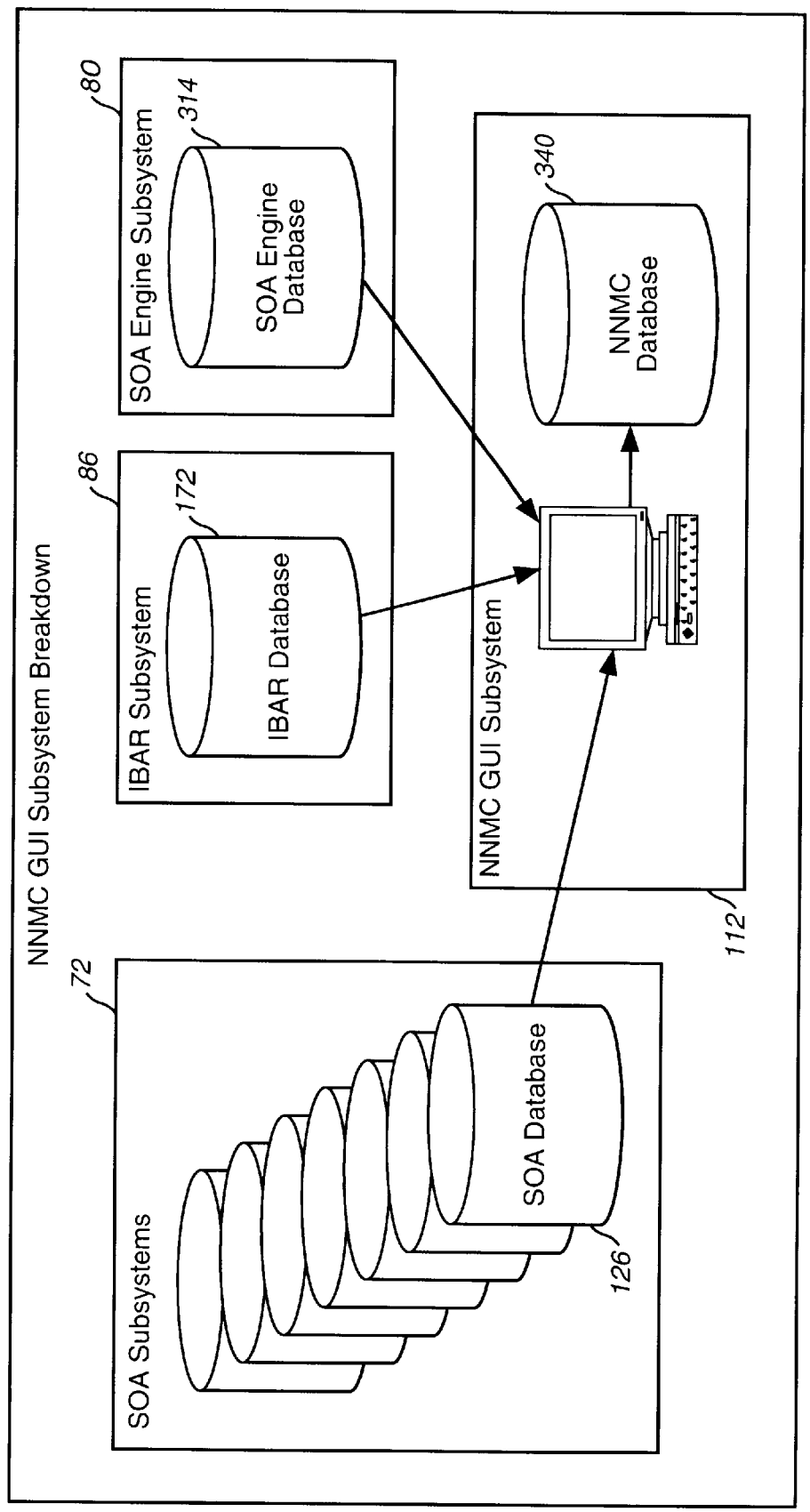
FIG. 9 is a block diagram of the NNMC GUI Subsystem according to one embodiment.

Now referring to FIG. 9, the NNMC GUI Subsystem 112 will be described. The GUI Subsystem 112 connects to the SOA Databases 126 in the SOA Subsystems 72, the IBAR Database 172 in the IBAR Subsystem 86, the SOA Engine Database 314 in the SOA Engine Subsystem 80. Access to the SOA 126, IBAR 172 and SOA Engine 314 Databases is performed via database links, which are stored in the NNMC Database 340. A table within the NNMC Database 340 tracks the number of queries performed per day, per SOA Subsystem 72 and IBAR Subsystem 86. The number of queries is limited to a tunable daily maximum before the end-user is denied access. Based on the telephone number queried, the NNMC GUI 112 uses a telephone number to NPAC cross-reference table within the SOA Engine Database 314 to determine the correct SOA Database 126 to access.

Figure 10:
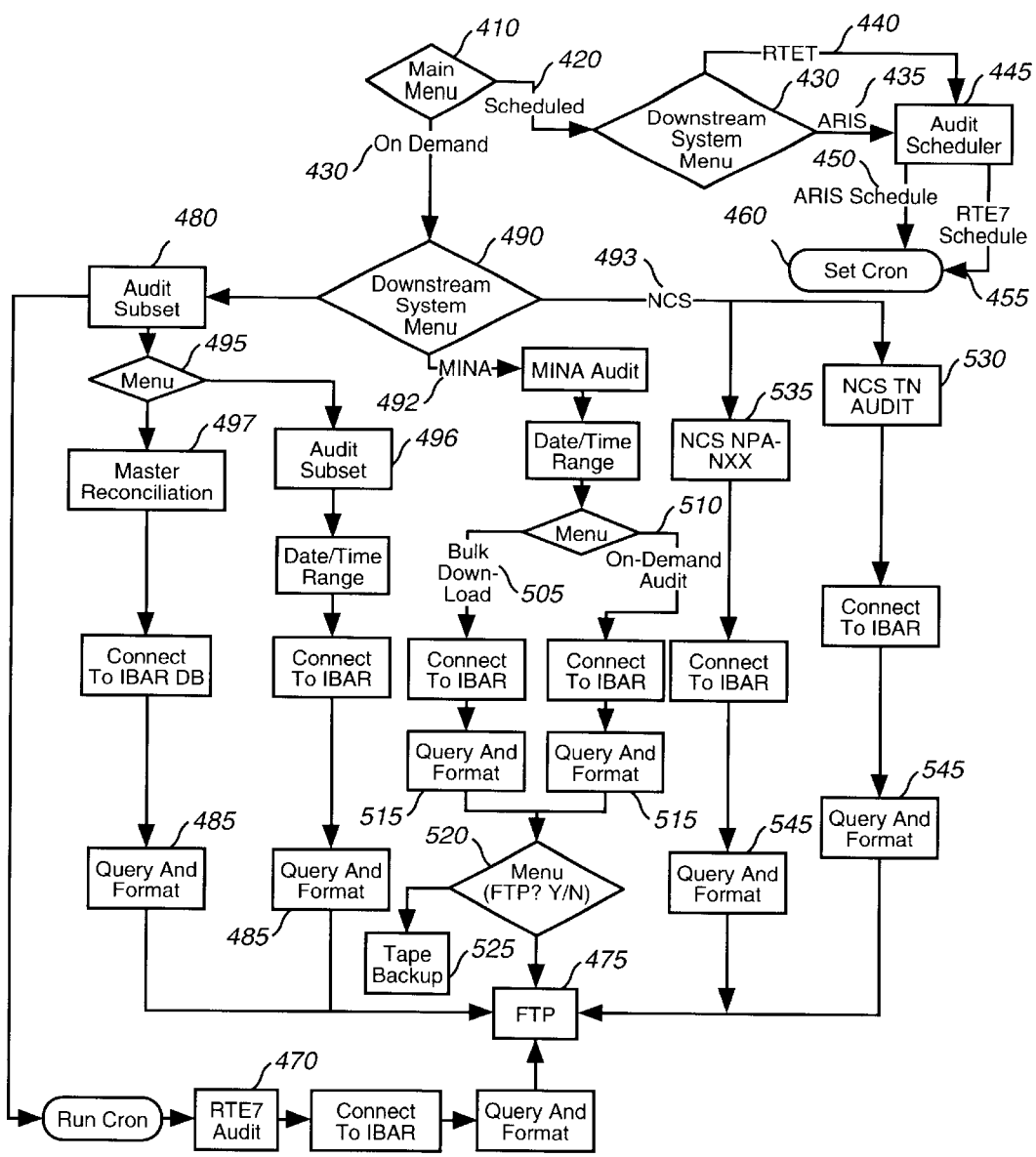
FIGS. 10–35 are flow charts for various processes in the auditing and reconciliation process as is drawn to one embodiment.

Looking first at FIG. 10, a figure of the Audit Reconciliation Subsystem ("ARS") is shown 410. This system gives a service provider the capability to audit their database and compare it with that of the IBAR.

As can be seen, the first step is a selection from the main menu 415. The main menu has selections for a scheduled audit 420 or for an on-demand audit 425. A scheduled audit will perform the selected audits daily but the on-demand audit will provide information concerning the selected data as it is selected. If the selection from this menu is for a scheduled audit 420, then the system will then present another menu, the Downstream System menu 430, with selections for the type of audits that may be scheduled. The choices from this menu are for and ARIS 435 or an RTE7 440 audit. When ARIS 435 or RTE7 440 is chosen, the system then goes to the Audit Scheduler 445. The audit scheduler will keep a record of when each audit is to take place. When the ARIS or the RTE7 is scheduled to take place 450, 455, will send a message to Set Cron block 460. The Cron is a variable that will hold onto the scheduled time 450, 455 and will activate when the system is to be activated. Looking at the bottom left side of FIG. 10, the Run Cron block 465 may be seen. When block 465 is activated and is to run an RTE7 audit 470, it will then proceed to run the audit process. All information attained during the RTE7 process will then be transferred to the FTP 475 to be saved to a storage device. Had scheduler 445 been scheduled to run an ARIS audit, it would proceed to the ARIS audit process 480. The scheduled ARIS audit information attained by this process is then taken to be formatted at 485. This is where specific information from the previous process is extracted and then sent to the FTP 475 to be stored.

As mentioned before, the main menu, 415 has choices for scheduled 420 and on-demand 425 audits. If the user, in this case the Service Administrator ("SA"), chooses to run an on-demand audit, the system will then proceed to display another menu, 490 the Downstream System tem menu. At this menu, the SA is prompted for the type of on-demand audit in which the user wishes to run. The choices are for an ARIS 491, a MINA 492, and a NCS 493 audits. If the user chooses an on-demand ARIS audit 491, then the system will proceed to the ARIS audit. Here the ARIS audit will carry on its function then proceed to display the next menu 495. This next menu will display two selections to the user. The menu choices are for an on-demand ARIS audit master reconciliation 497 or an on-demand ARIS audit subset 496. After this has been justified, the system then sends the data to be formatted 485. This process will also extract the useful information from the data and then organize it in such a way that the FTP 475 will recognize it. The FTP, will then store the information.

Looking back at the Downstream System tem menu 490, one or more choices for an on-demand MINA audit is displayed NCS-492. When this is chosen, another menu 500 will appear. This menu will prompt the user for either a bulk download 505 or regular 510 audit. Both will execute their processes accordingly, then both will end at the next block 515. This step is where the system extracts all the useful information and places them into a format in which the FTP 475 may be able to interpret. After the audit or the bulk download have been converted to the proper format, they will both proceed to the next block, or menu 520. This system will then prompt the user if they want to store this information onto a tape backup 525 or onto the default storage device of the FTP 475.

Had the user chosen the NCS option at menu 490, the user would be able to perform two separate types of audit simultaneously. The two types of audits that will be performed are the NCS TN 530, and the NCS NPA-NXX 535 audits. Both of these audits will process some data and then send their information through a format 540, 545 and extract block. As before, this process will take the information attained by the audits and extract the proper information and then place them into the proper format so that it may be interpreted by the FTP 475. Then, as with all of the subsystems of this system, there will be a storage procedure once it reaches the FTP.

Figure 11:
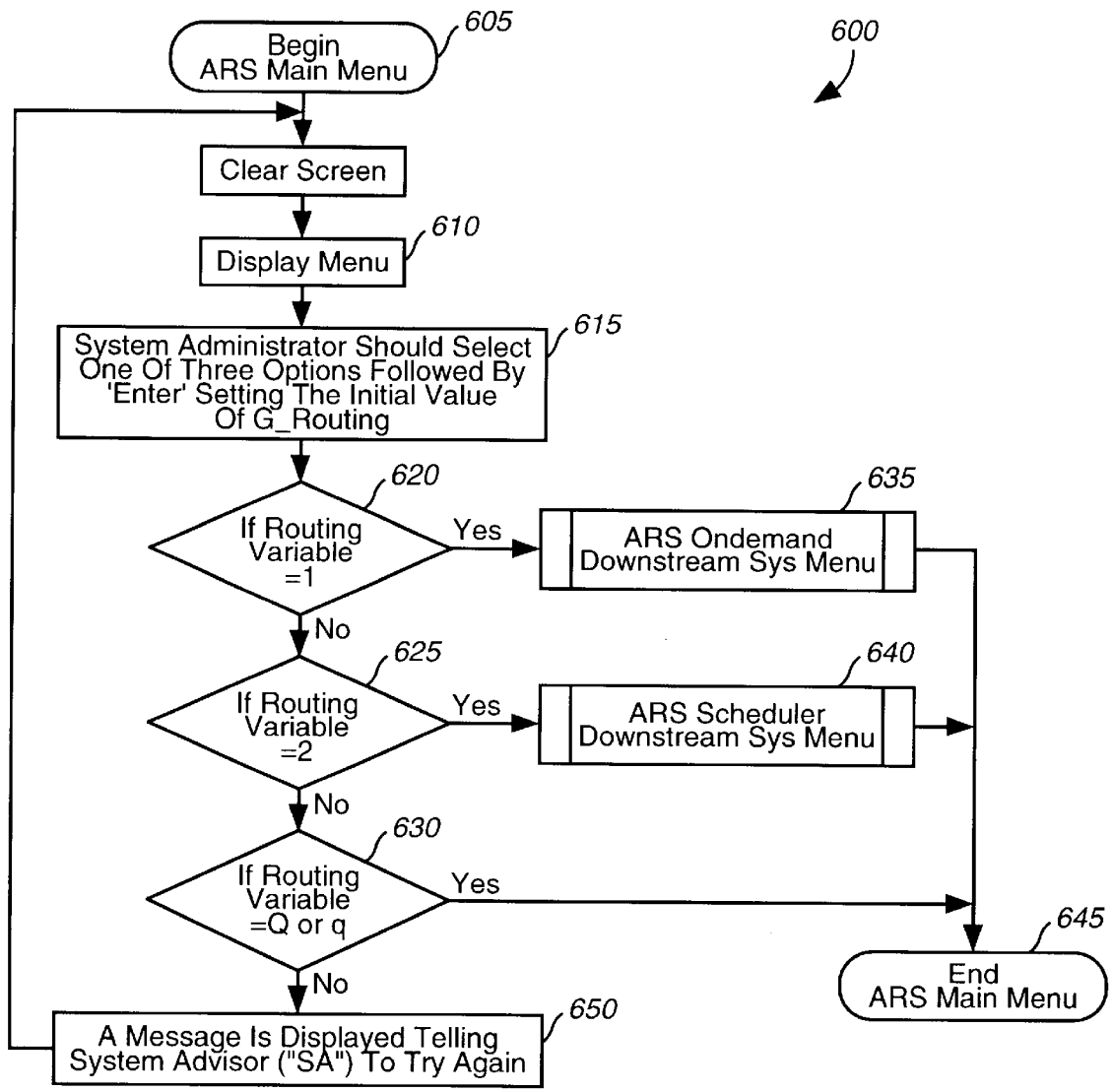

Looking first at FIG. 11, a flow chart of the Audit Reconciliation Subsystem 600 may be seen. As shown in the figure, this first flowchart represents the first menu 415 presented to the user. The user, in this description, will be referenced to as a systems administrator ("SA"). The first block 605, represents the beginning of the menu program. As the program initiates itself it will go through a process of displaying a specific set of menu choices 610 in which the user must enter only one selection, 615, 620, 625 and 630, respectively. As the SA chooses a menu choice, this program will actually be assigning a specific value to the selections chosen. The values are as shown in FIG. 11; one will be assigned to a routing variable when 'On-Demand Audit' is selected from the menu. Such a selection will direct the program to the ARS On demand Downstream System process, block 635 and FIG. 12. If the user chooses 'Edit Scheduler File' the routing variable will be assigned a value of two as shown in block 625. Such a selection will take the program to block 640 and FIG. 13. If neither of the two menu selections is the preferred action, then the SA may select 'q' for quit 630; thus quitting and exiting the program 645. A message 650 will be displayed to the SA to inform him/her if an incorrect selection is made.

As mentioned before, FIG. 12 is the start of the on demand audit process. When executing, this procedure will initialize 705, 710 and then display a specific menu 715. In this case the SA will have four choices to choose from. An 'on demand' variable will be assigned the specific values shown in FIG. 12, in blocks 720, 725, 730 and 735. As these selections are made, the present program will transfer to the corresponding procedures, blocks 740, 745 and 750 respectively. If the selection is 'q' for quit, the program will terminate this procedure and return to the ARS Main Menu block 605. If an incorrect selection is made, an error message, 755 will be displayed to the SA informing them to try again.

In FIG. 11, there is the choice in the main menu to edit the scheduler file, block 640. If ARS schedule Downstream System tem menu is selected then the program will execute the procedure shown in FIG. 13, ARS Scheduler Downstream System process. Once this procedure has established itself, it displays two selections for the SA to choose 805. Choosing 810 allows the SA to edit the ARIS scheduler file setting the scheduler variable to one 815 and choosing 820 allows the SA to edit the RTE 7 scheduler file setting the scheduler variable to two 825. Depending on which selection was made the SA may now change the time in which their audit will take place. Once these changes have been established, this procedure exits and returns to block 640 in FIG. 11.

Figure 14:
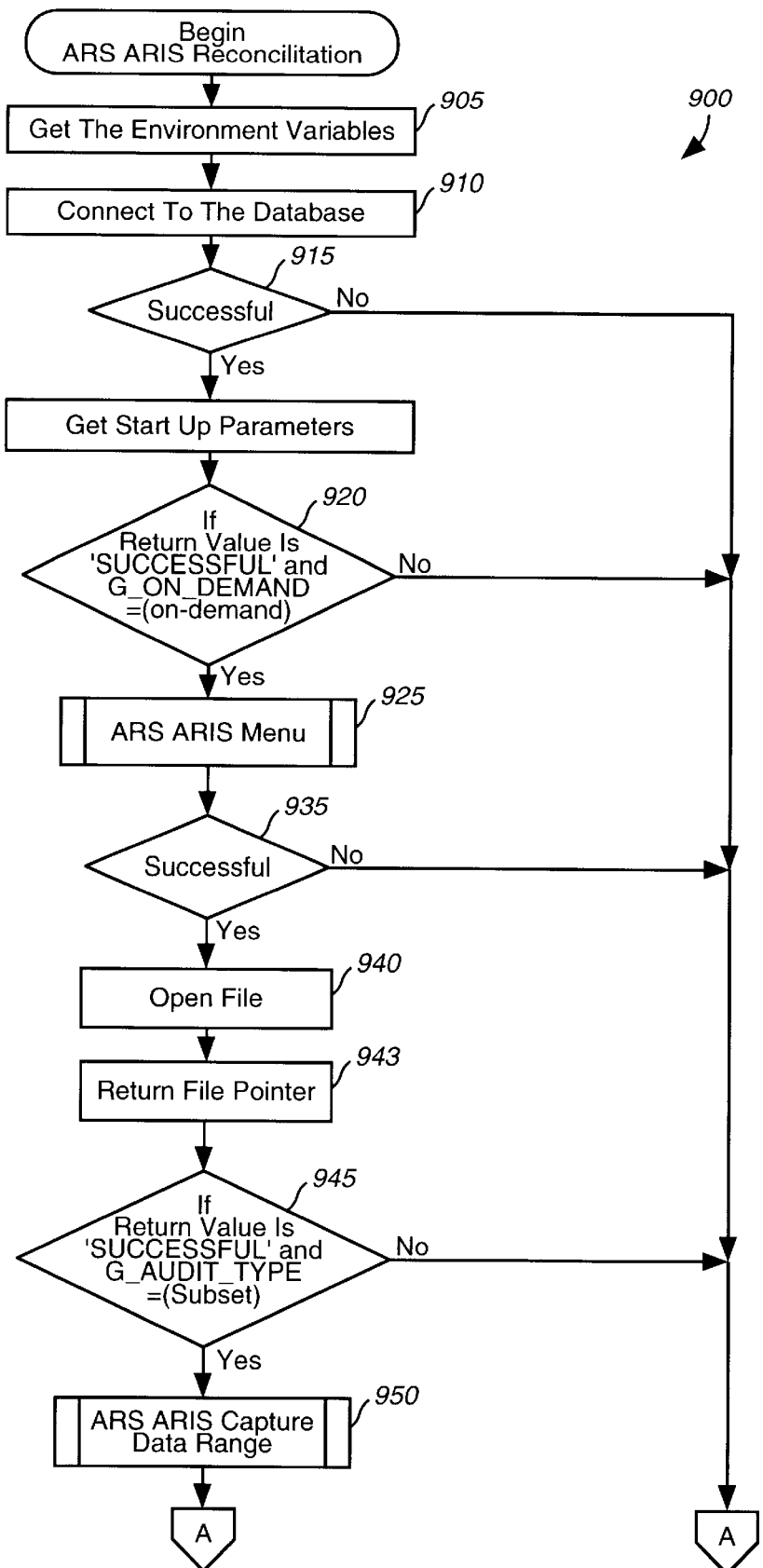
Figure 14:
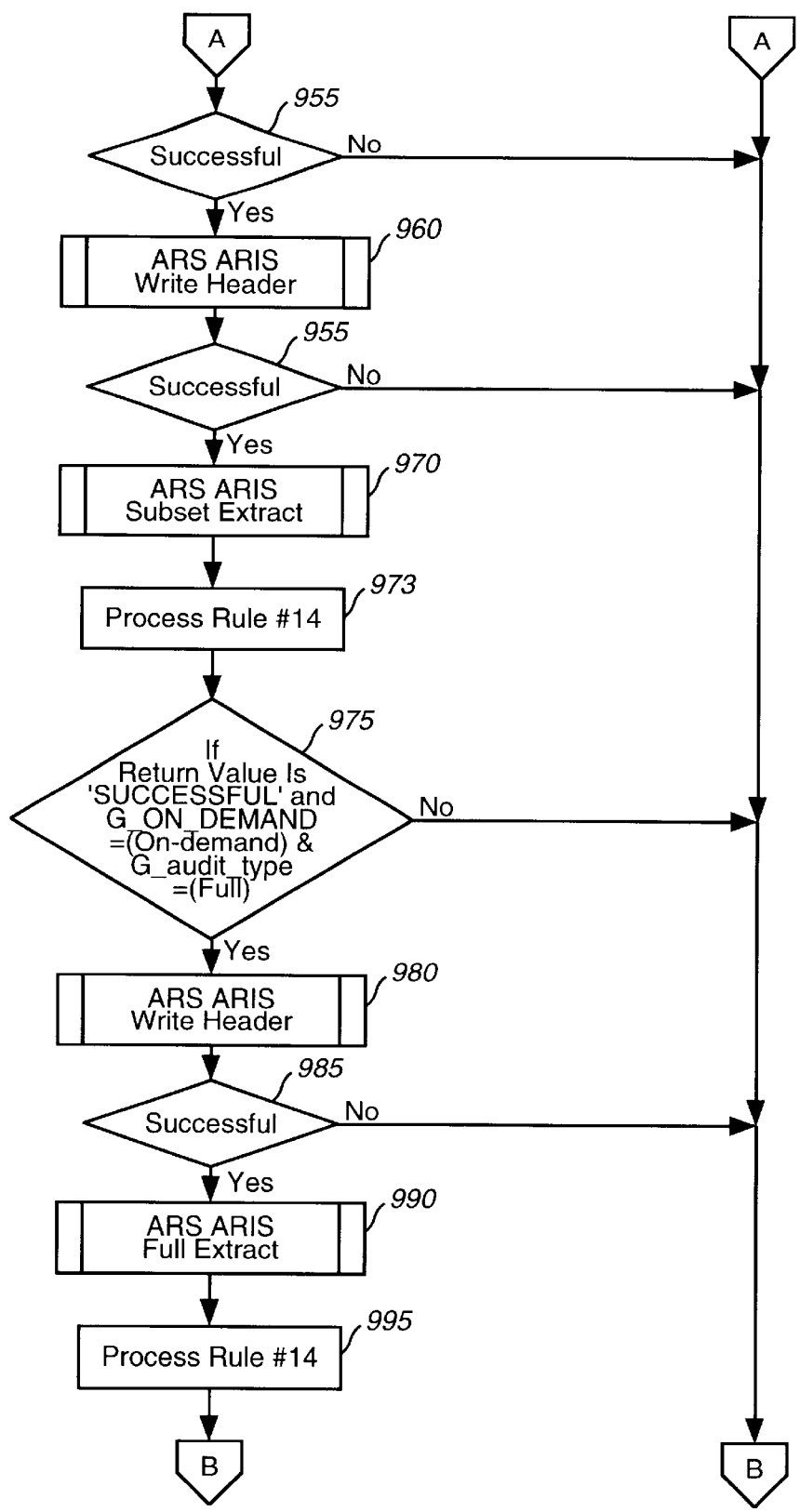
Figure 14:
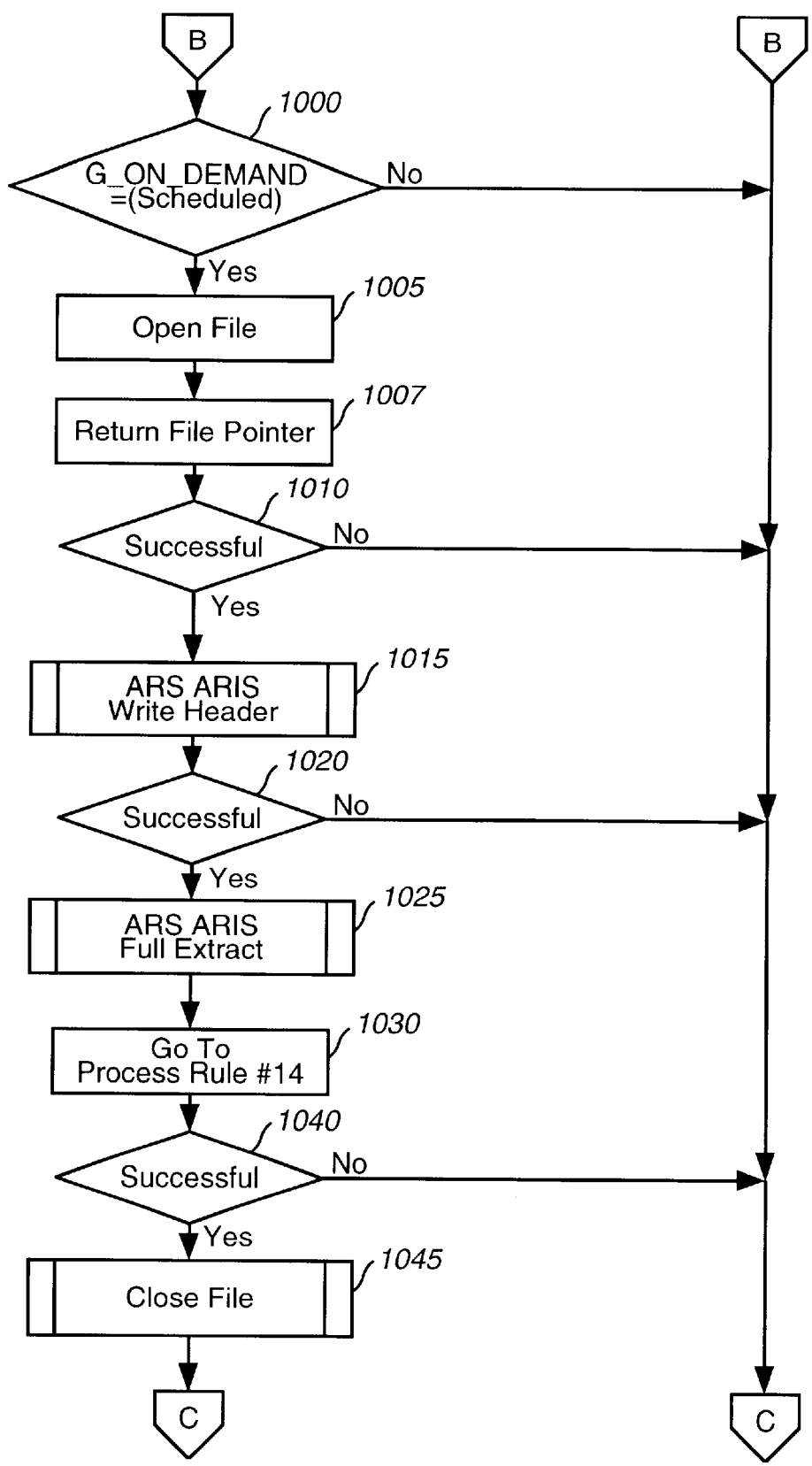
Figure 14:
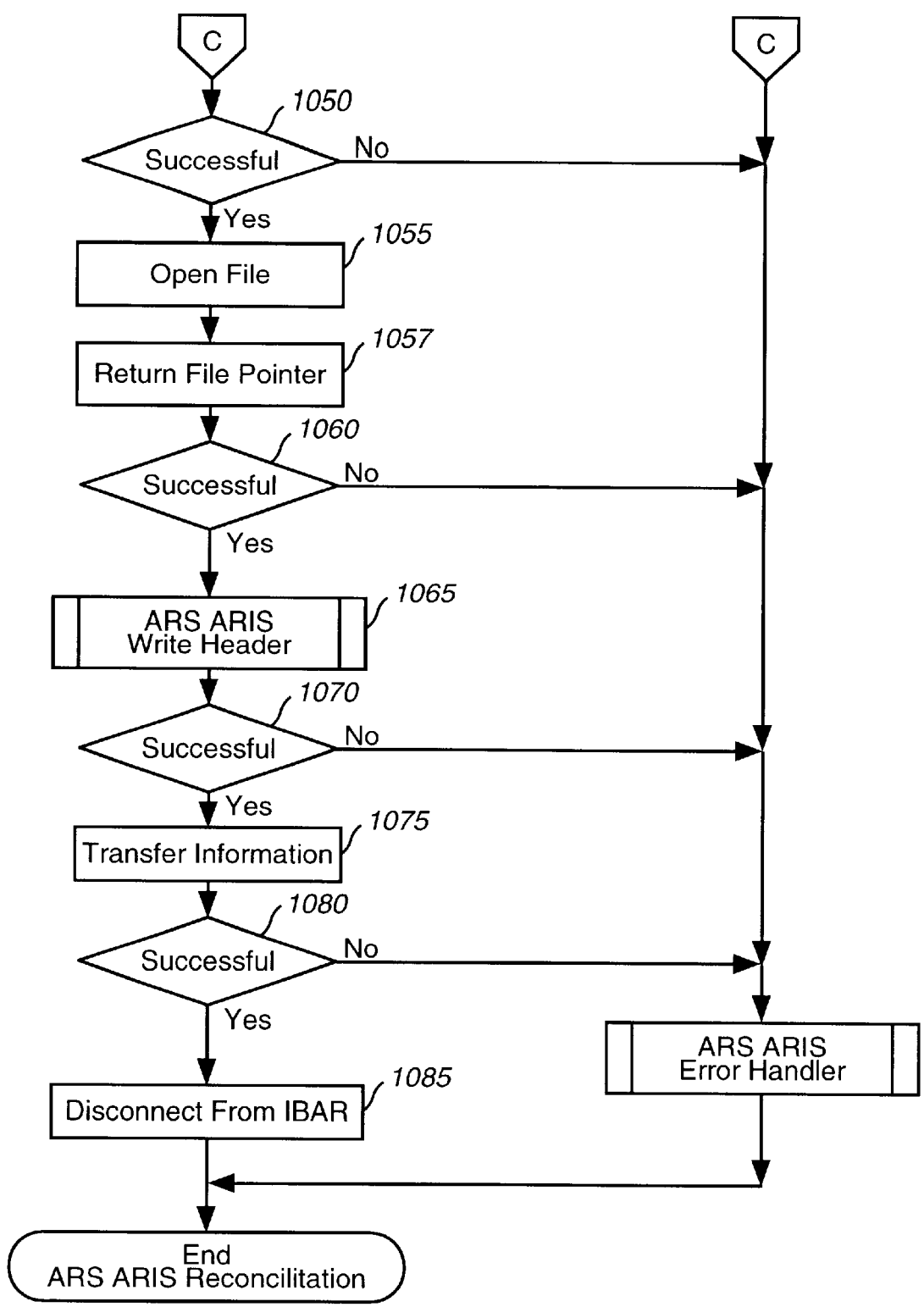

Looking now at FIG. 14, the ARS ARIS Reconciliation process is shown. After this procedure has established its connection to the database 905 and 910, it will begin comparing the values of some of the global variables from previous procedures. Block 915 shows that if there is a successful connection to the database and the global variable having a value equivalent to 'on-demand' 920 then the procedure will proceed to the next procedure 925, ARS ARIS Menu, FIG. 15. After block 925 has returned to this procedure it will check to see if that procedure was successful 935. If it was successful, then a new file will be opened with a new assigned file pointer. If blocks 940 and 943 are unsuccessful, then it will pass straight to block 945. Here it will verify that everything to this point was successful and if there is a subset audit type chosen. If this is the case then this procedure will continue to the next procedure 950. Procedure ARS ARIS capture data range will check for the status of all the previous procedures as well as the variable containing the SA's selection for the type of audit. If this has been successful 955 then the header information will be written to file. When successful and the 965 audit chosen is a subset, then block 965 will proceed to 970. Block 970 will extract the appropriate data from the IBAR and proceed to block 973, process rule #14. Then, if successful and variables agree 975 On-Demand a full, then call 980 ARS ARIS write header after writing the header is completed successfully 985 call ARS ARIS full extract 990, retrieve all TN's from IBAR, then process rule #14 995 to apply them.

Next, if the variable equals scheduled 1000, then open file is executed. Procedure open file, essentially, opens a new file to write to and then records the file pointer. If steps 1005, 1007 are successful 1010 then process will go to block 1015, ARS ARIS write header. When successfully completed, 1020, 1010 procedure ARS ARIS full extract 1025 will execute then use process rule #14 1030. If steps 1025 and 1030 are successful at 1040 a call will be made to close file 1045. If there are no errors 1050 during the file close 1045, the file will be re-opened 1055, the header will be updated with the appropriate file size and number of records using block 1065. After the updating is completed successfully 1070 completion of transfer information 1075 is performed, then the IBAR will be disconnected 1085. After disconnection, the process will end 1090. If any errors occur during the process, a call will be made to ARS ARIS error handler 1095.

Figure 15:
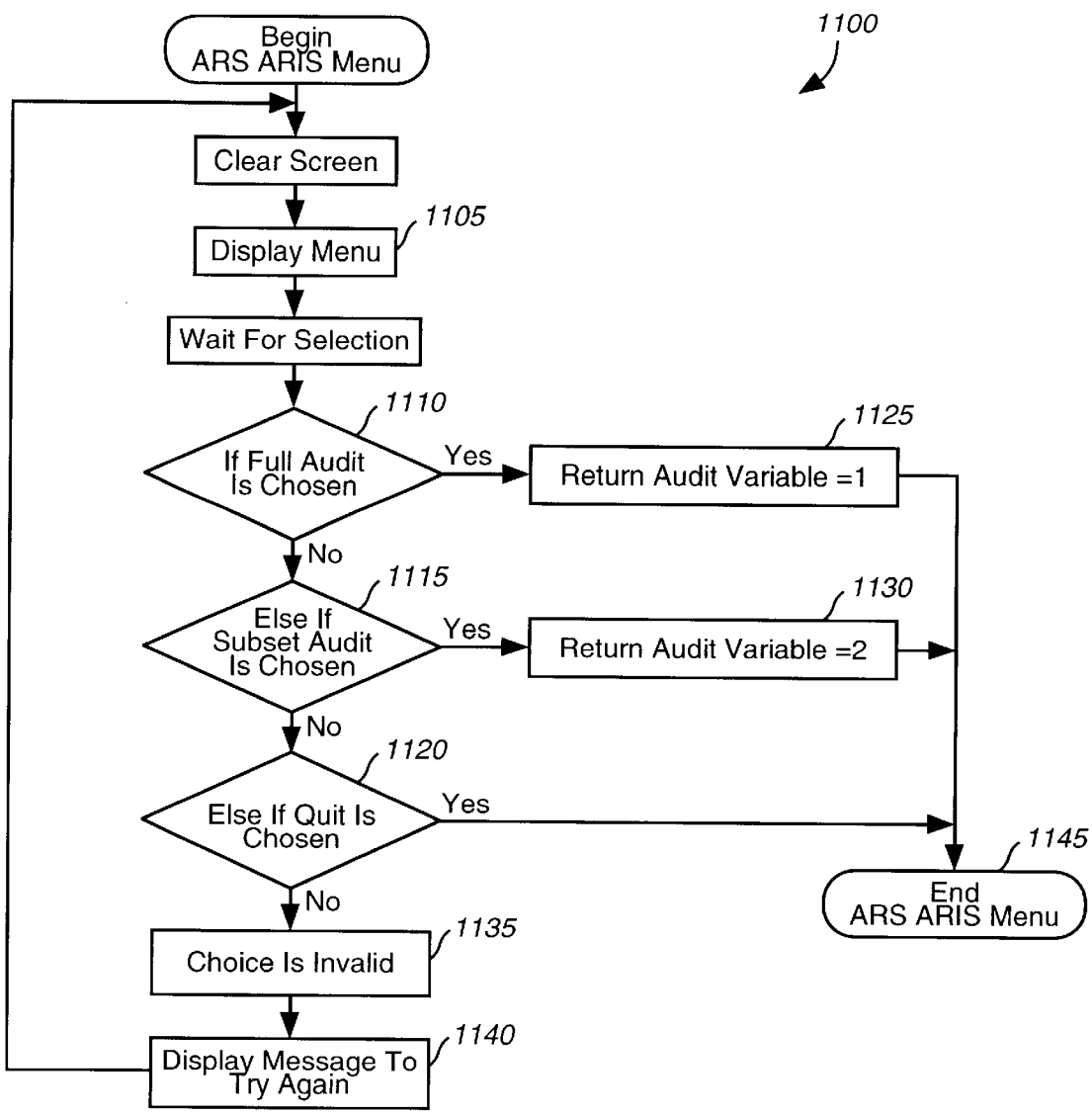

Referencing FIG. 15, the ARS ARIS Menu may be seen. This procedure 1100 is accessed and executed whenever called by 925 shown in FIG. 13. In this procedure a menu 1105 will be displayed to the SA informing him/her of the type of audit that may be produced. The choices presented here are for a full audit 1110 or a subset audit 1115 or to quit 1120. A full audit 1110, choice one will assign a value of one to the audit-type variable 1125. A subset audit, 1115 choice two will assign a value of two 1130 to the audit-type variable. Block 1120 represents a selection for the SA to quit the present procedure. As shown, this will result in an ending of this procedure 1130. If the SA chooses to select some other option that is not presented here, the procedure will display an error message 1135 and instruct the SA to try again 1140.

Figure 16:
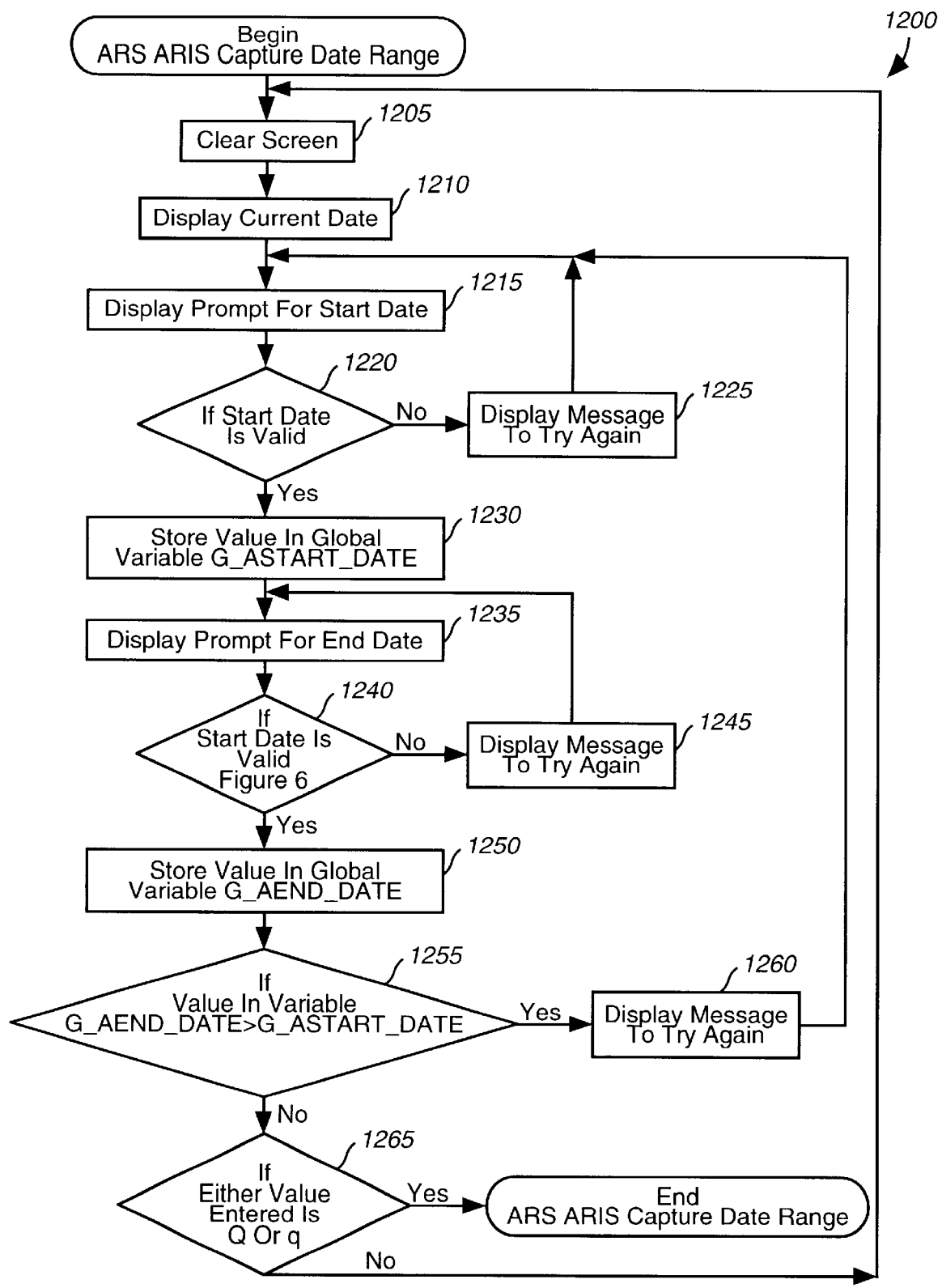

FIG. 16 shows another procedure, the ARS ARIS Capture Date Range process 1200. Process 1200 is used to capture a date range from the SA for use in the database query to limit the size of the audit file. After the initiation process of clearing the screen and displaying the current date 1205, 1210 the present procedure will prompt the SA for the start date of the audit 1215. Block 1220 will test the entered start date for validity. If the entered date is not valid, block 1225 will inform SA of an error and require another attempt. When the start date is valid, block 1220 allows the procedure to proceed to block 1230 where the start date entered is actually stored into a global variable. The SA is then prompted for the end date of the audit 1235. Another test for validity is made 1240 as well as a message for errors 1245. Once the end date has past the validity test, it too will store the entered date to a global variable. However, in this case the last valid value entered is stored in a different global variable 1250 representing the end date. After a valid date has been entered for a start and an end date, a test is made to see that the end date is later than the beginning date in block 1255. If the end date is earlier than the start date, a message would be displayed to 1260 SA to try again and process will return to block 1215. Once these two values have passed the said tests, this procedure will end and return to the calling function. If at anytime the SA wishes to quit the procedure, a 'q' may be entered 1260.

Figure 17:
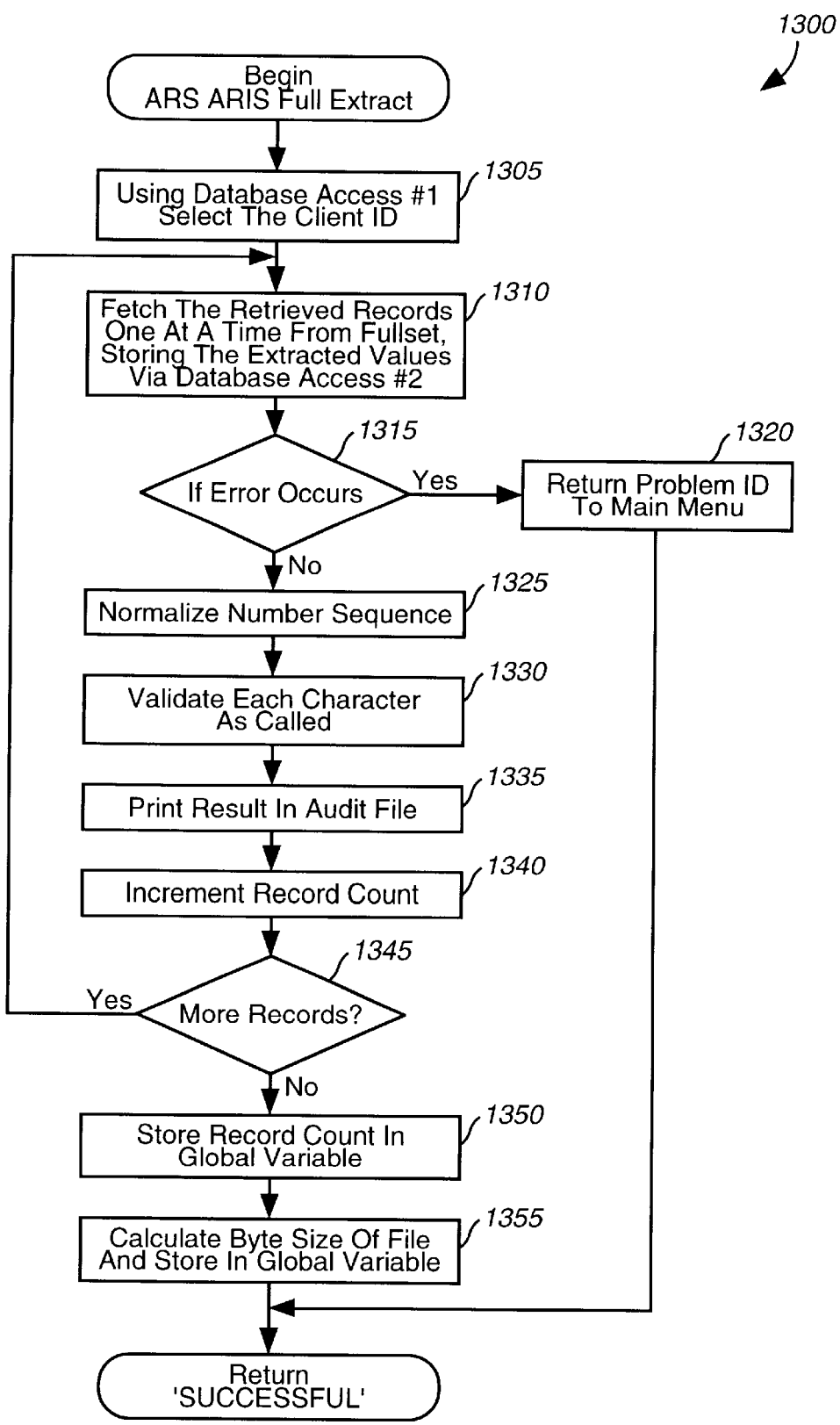

FIG. 17 shows another procedure called in FIG. 14 ARS ARIS Full Extract. This procedure is responsible for extracting all telephone numbers ("TN") in the IBAR for the ARIS. Procedure starts off by selecting a client identification using a set of rules within its coding known as 'database access #1, 1305. Records are then fetched and received one at a time using database access rules #2, 1310. When and if an error occurs, a problem identification is returned to the main program 1320. Next the data is normalized in a numbered sequence 1325, validating each character 1330, and printing each result to the audit file 1335 as it executes. Each time a print has been completed, a record count increase will be incremented 1340 of a data string 1345 and the extracting process will cycle back to block 1310 when there are more records to be retrieved. If there are no more records than the number incremented during each record recording (then the record value) will be stored into a global variable 1350. Block 1355 will then calculate the byte size of the file then storing that value into another global variable for later use. After all of the said steps have been completed successfully, a successful message is returned to the main program.

Figure 18:
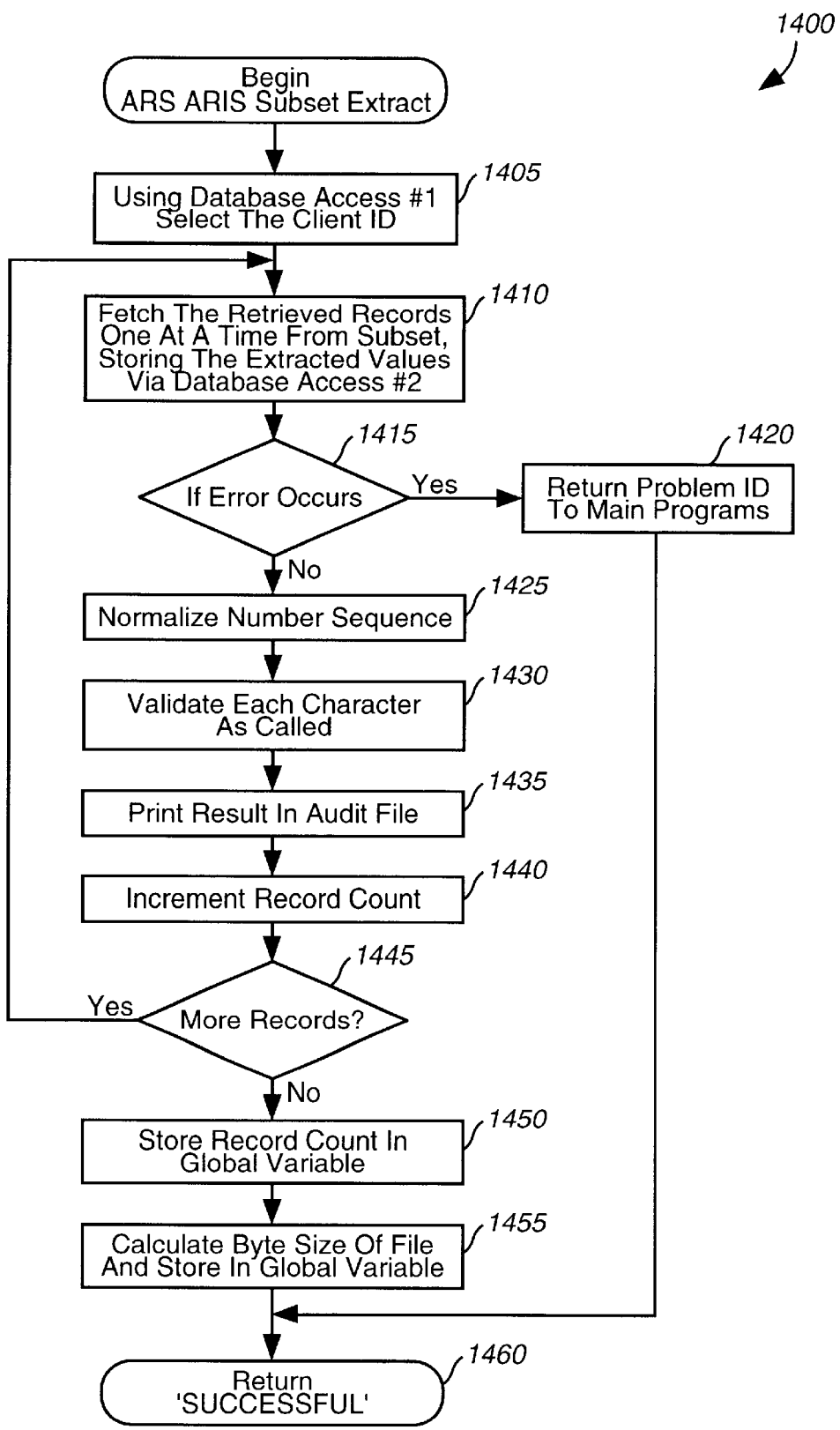

The next procedure, FIG. 18, to be discussed is ARS ARIS Subset Extract 1400. This procedure is responsible for extracting a subset of all TN transactions in the IBAR for ARIS. This procedure uses the start and ending dates variables that were stored in 1300. Using database access rules #1, a client identification number is selected 1405. The records will be fetched one at a time from a subset using database access rule #2 storing the extracted values 1410. If an error occurs 1415, a message will be displayed 1420, informing the SA, and the main program is returned to. Next, if no error occurred, the sequence number is normalized as the characters being called are validated and printed 1430 and 1435. For each record stored, the variable representing the number of records recorded is incremented 1440. If there are more record, this process will start over 1445. When there are no more subsets to be recorded 1445, the record count is then stored 1450 and then the byte size of the recorded file is calculated then stored into a global variable for later use 1455. When successfully completed, the present program will return a successful identification number to the main program 1460.

Figure 19:
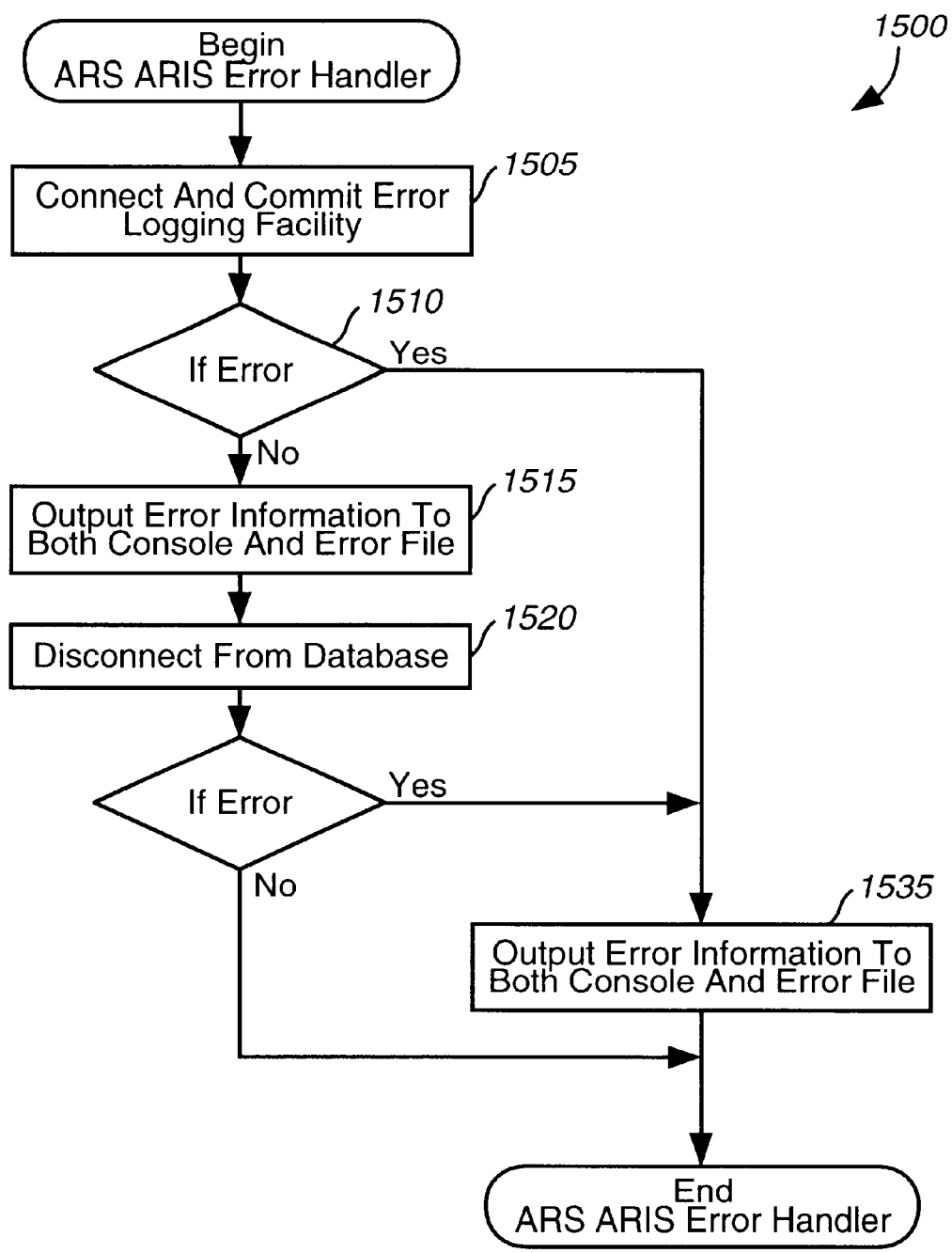

As an error is reached in some of the ARIS procedures, there are calls to a procedure responsible for handling all of the errors shown in FIG. 19. When the ARS ARIS Error Handler is called 1500, it will first commit and connect to its error logging facility 1505. If there is an error connecting to its logging facility 1510, there will be an error logged to both the console as well as an error file 1515. If there are no errors in connecting to the logging facility 1525 then, the type of error experienced in the calling procedure will be written to the console and the error file 1535. This procedure will then disconnect from the database.

Figure 20:
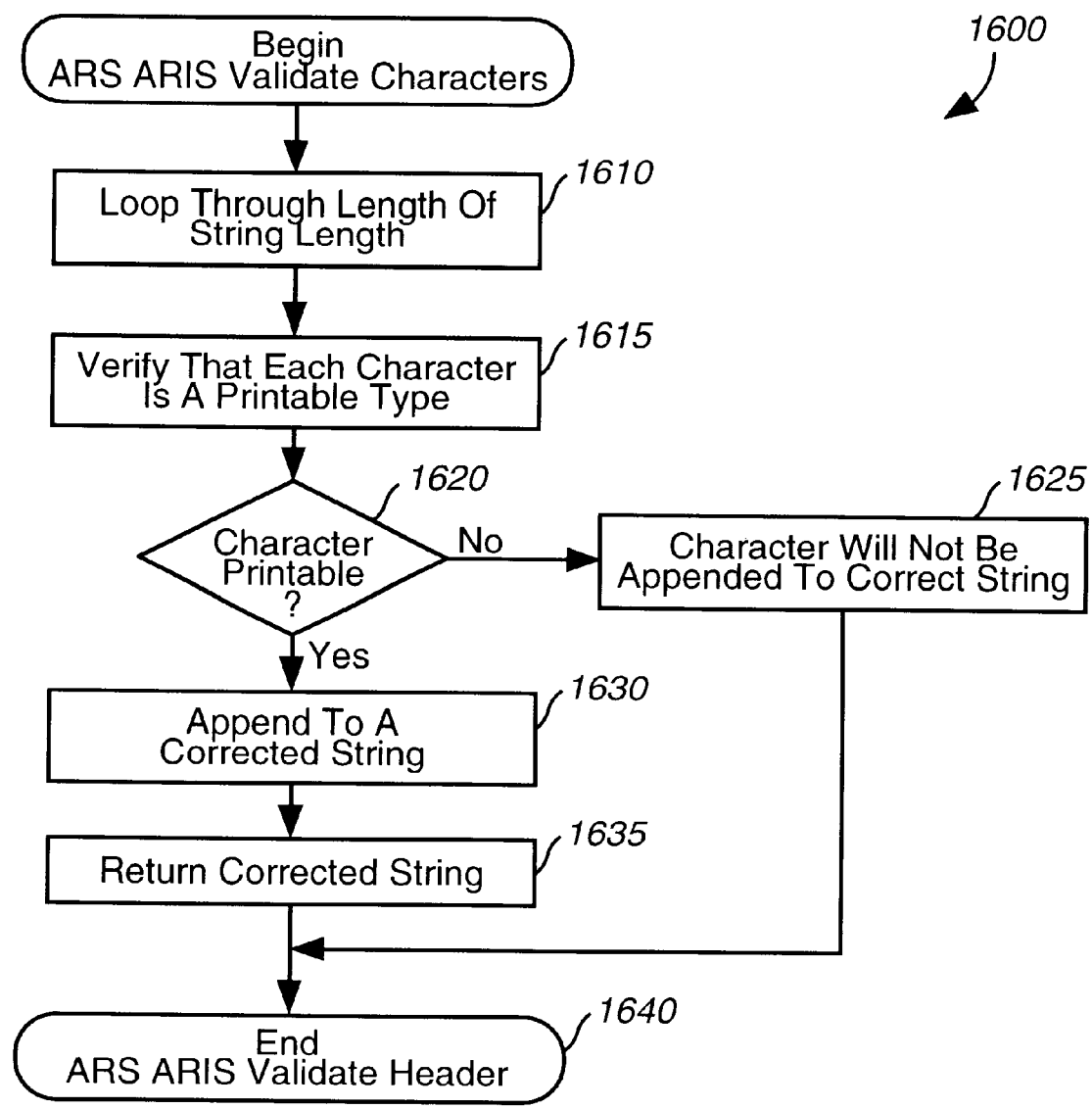

In FIG. 20, the ARS ARIS Validate characters is shown. This procedure 1600 is responsible for making sure that only the printable characters are included in the audit file. Looping through the length of the string length 1610, the present procedure will validate that each character is a printable type 1615. If the character is not of the printable type 1620, then it will not be appended to the corrected string 1625. If there are no problems with the string being analyzed, then it will be appended to the corrected string and then returned to the proper file 1635. Once this is complete the procedure will return to its calling function 1640.

Figure 12:
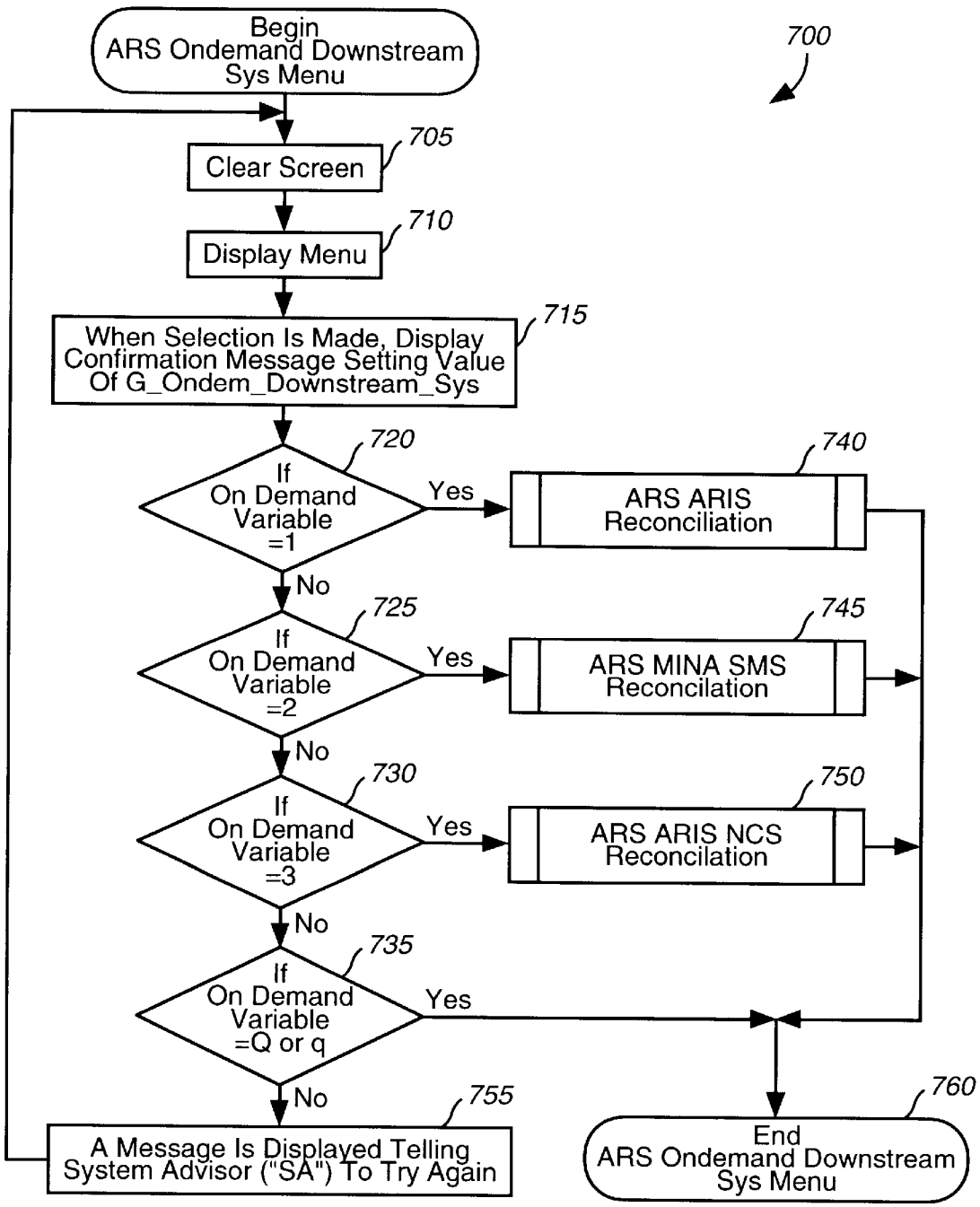
Figure 13:
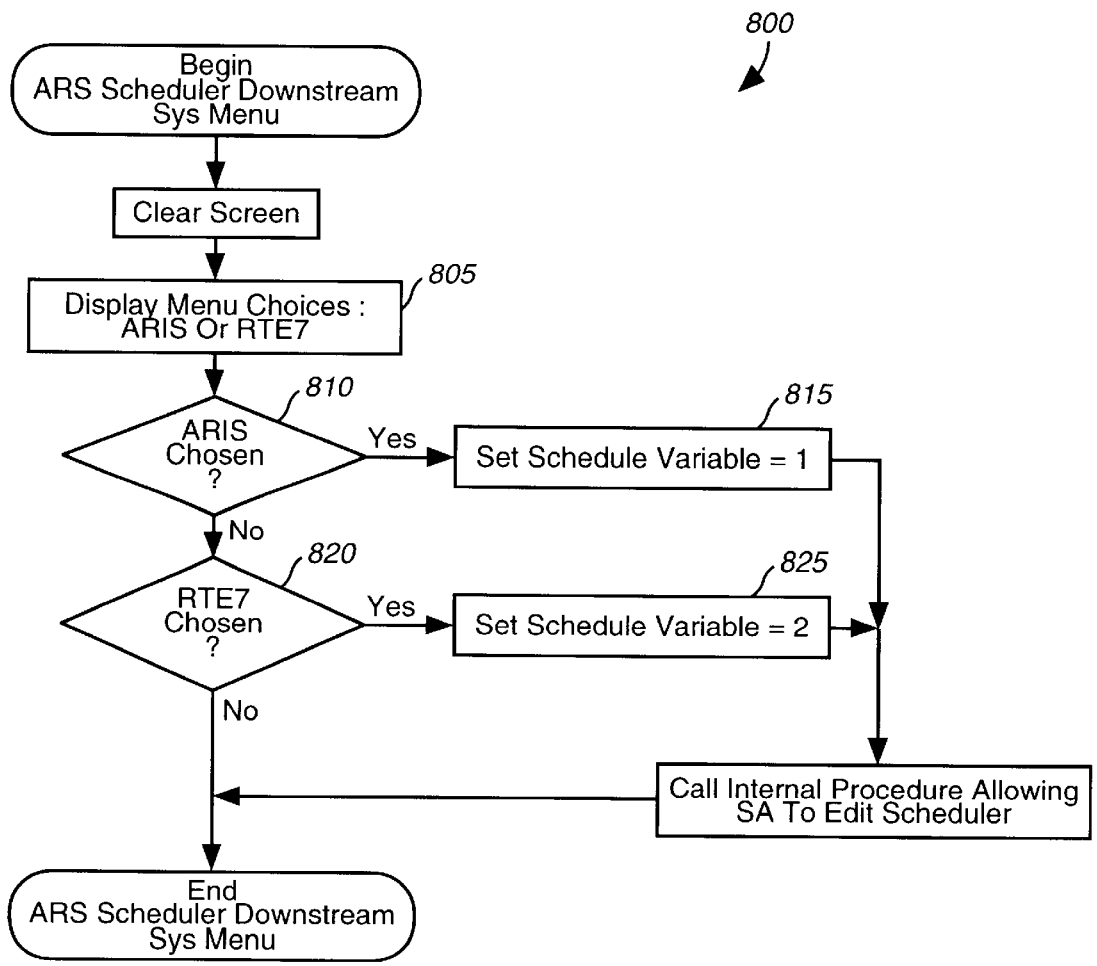

Looking back to FIG. 12, it may be seen that another classification of audit reports that may be chosen is the MINA SMS audit report. A selection of this type of audit 745, calls the MINA SMS Reconciliation process, FIG. 21. This procedure 1700 is operated on an on-demand basis and is responsible for downloading the most recent of either a bulk or a regular audit. When executing, the variables are retrieved as soon as connection 1705 with the IBAR has been made 1710. If this connection and reception of variables is successful, then the procedure will proceed to block 1720 where it will get each startup parameter. Whenever there is any kind of failure or error during this procedure, the procedure Error Handler will execute alerting the console 1725. Once reception of these parameters has been successfully completed 1730, there will be a call to the procedure ARS MINA Enter Date 1735. This will define the date range in which the SA which have a MINA-type audit. After completion of that procedure has been made, a call to the next procedure 1740 is made. Procedure ARS MINA Menu will get the type of download the SA wants. If successfully completed 1745, the procedure ARS MINA Extract is executed 1750. This will extract specific data for the audit process. When all of the data has been extracted 1755, the length has to be calculated using the procedure ARS MINA Length File 1760. Next the value of the flag variable must be tested. If the value of the flag variable is equal to 'false' 1770, then process rule #10, 1775 will be executed. If the value of the flag variable is equal to 'true' 1780, then the data is transferred to the MINA SMS 1785. Once both of these tests have been completed successfully 1790, then the procedure will disconnect from the database 1795 and end.

Figure 21:
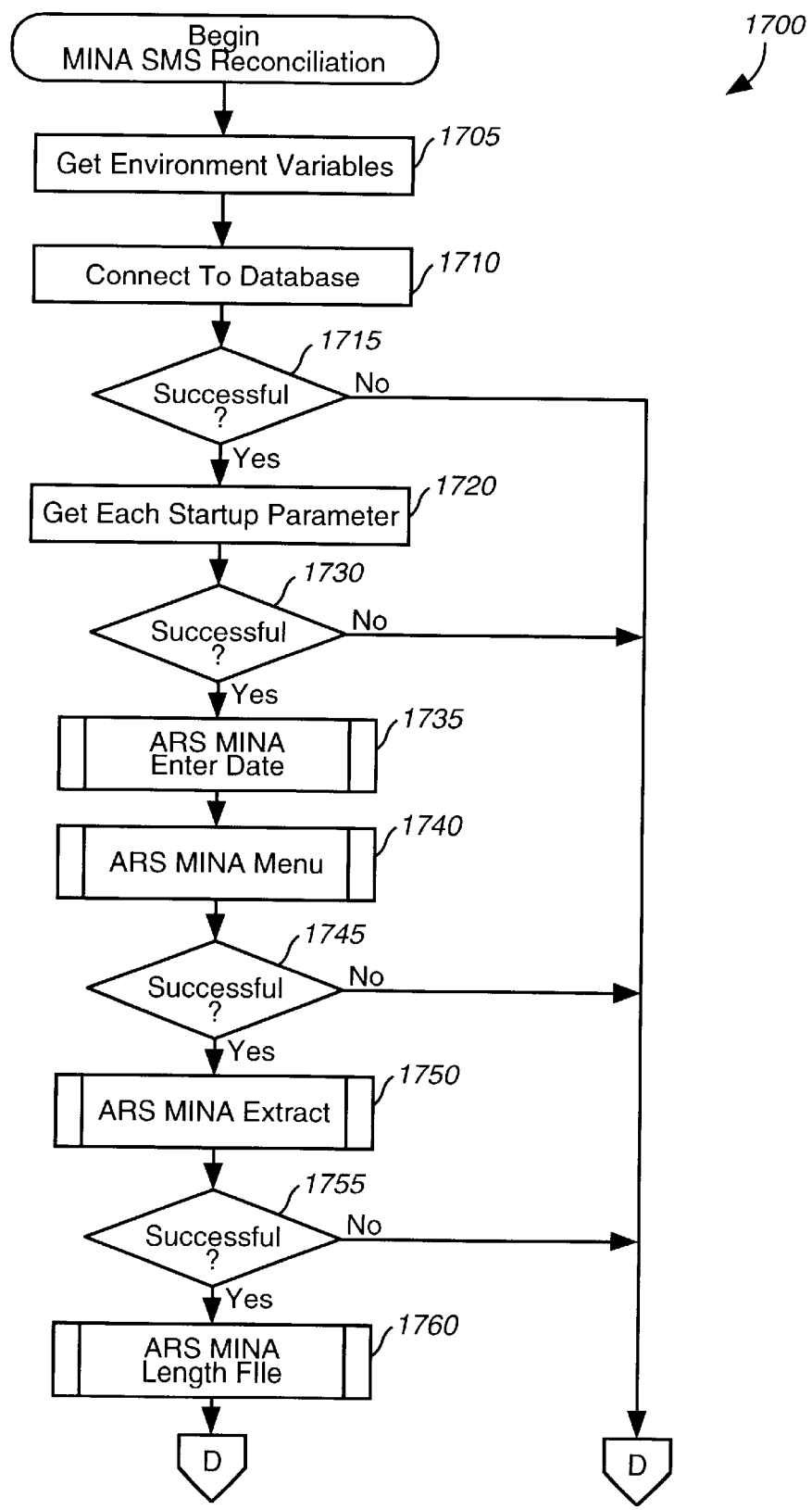
Figure 21:
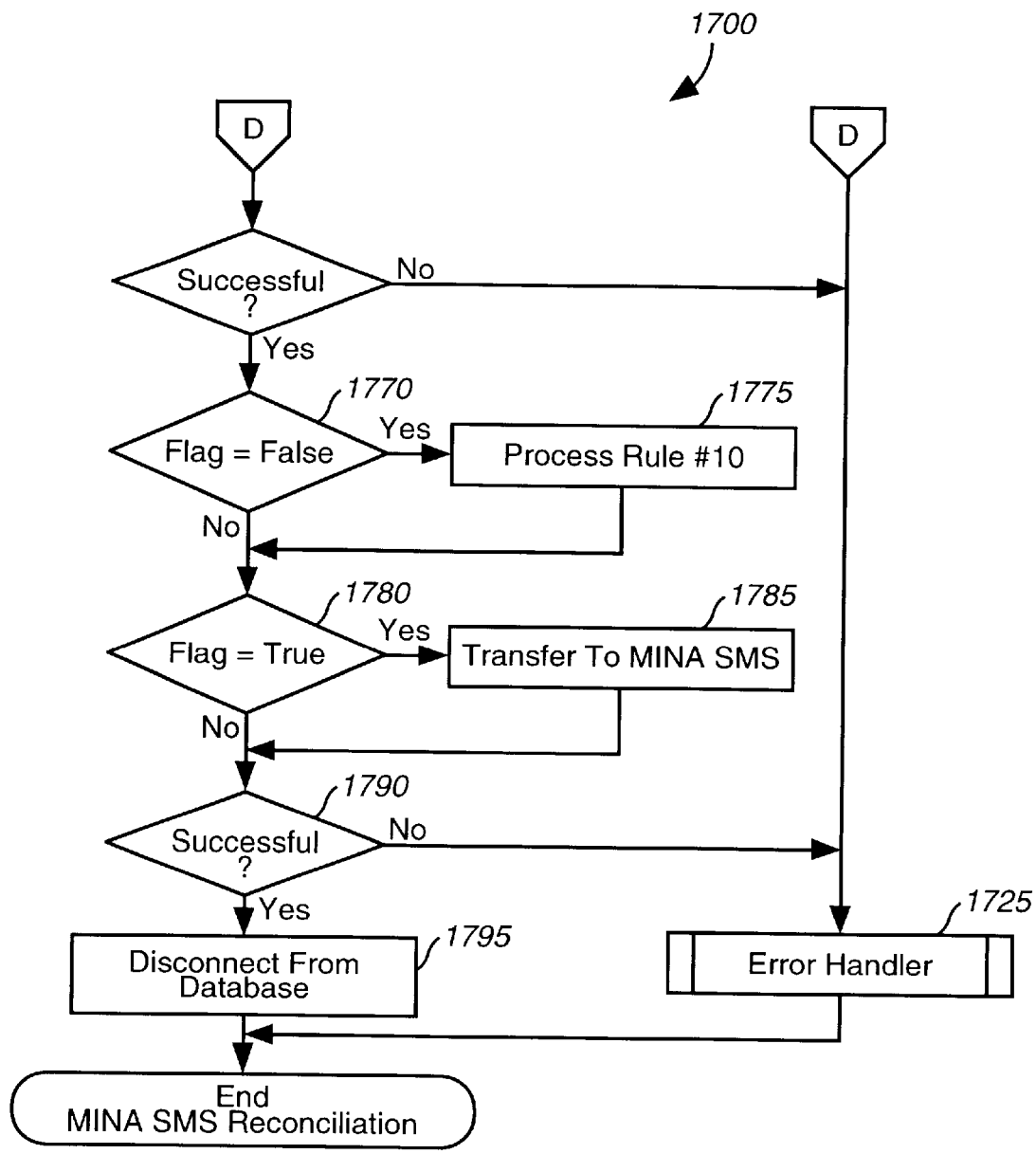
Figure 22:
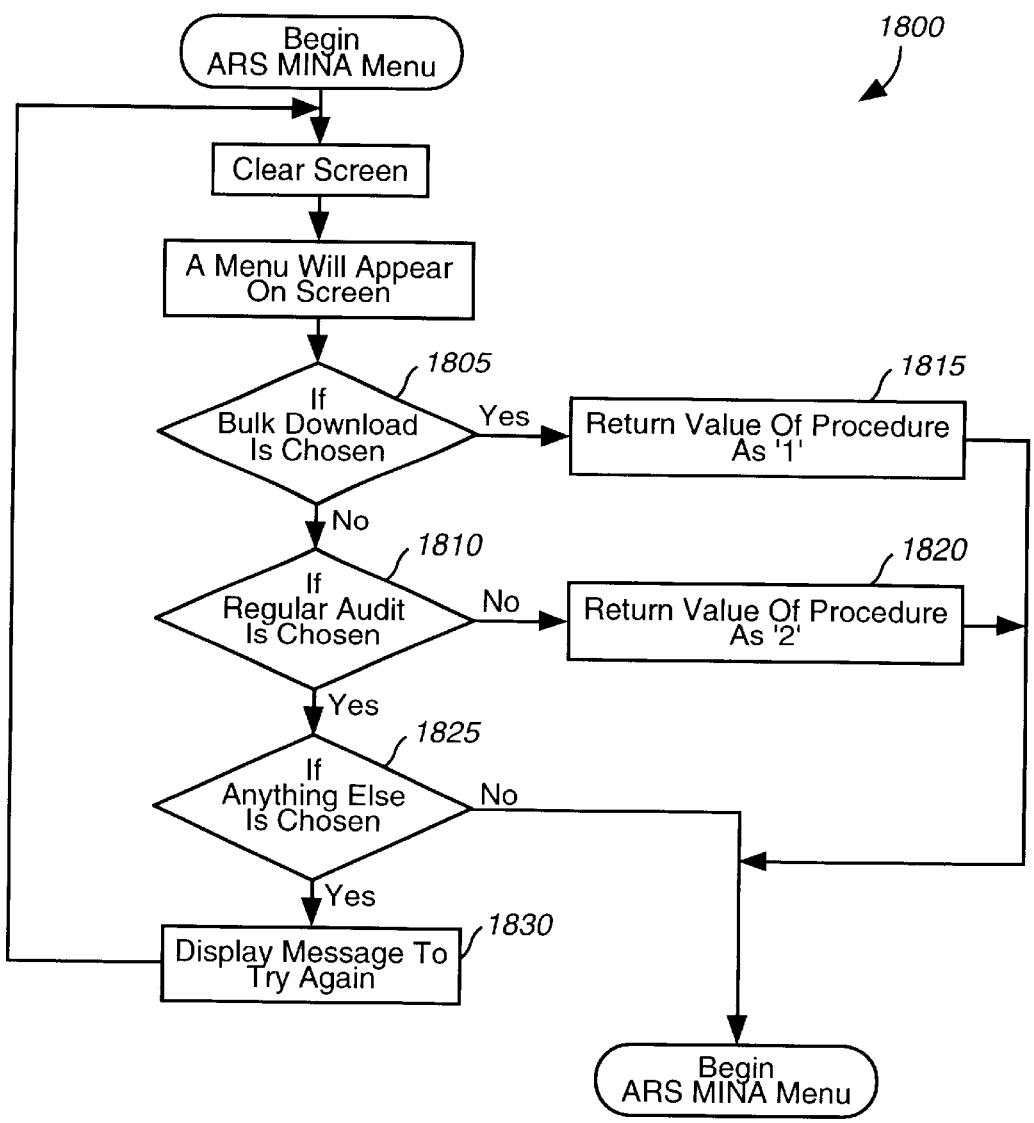

The next figure of discussion is that of FIG. 22 called by block 1740 in FIG. 21. This procedure, ARS MINA Menu 1800, will direct the program on the type of MINA Audit that will take place. The user will have a choice for a 'Bulk Download' 1805 or a 'Regular Audit' 1810. If the first choice is taken, then a value of one will be returned to the main program 1815. If the user chooses the 'Regular Audit' choice, then a value of two will be returned to the main program 1820. When neither of the previous choices are made 1825, then the procedure will lead to a repeat of the menu 1830. This procedure will stay at this menu until one of the appropriate choices have been made.

Figure 23:
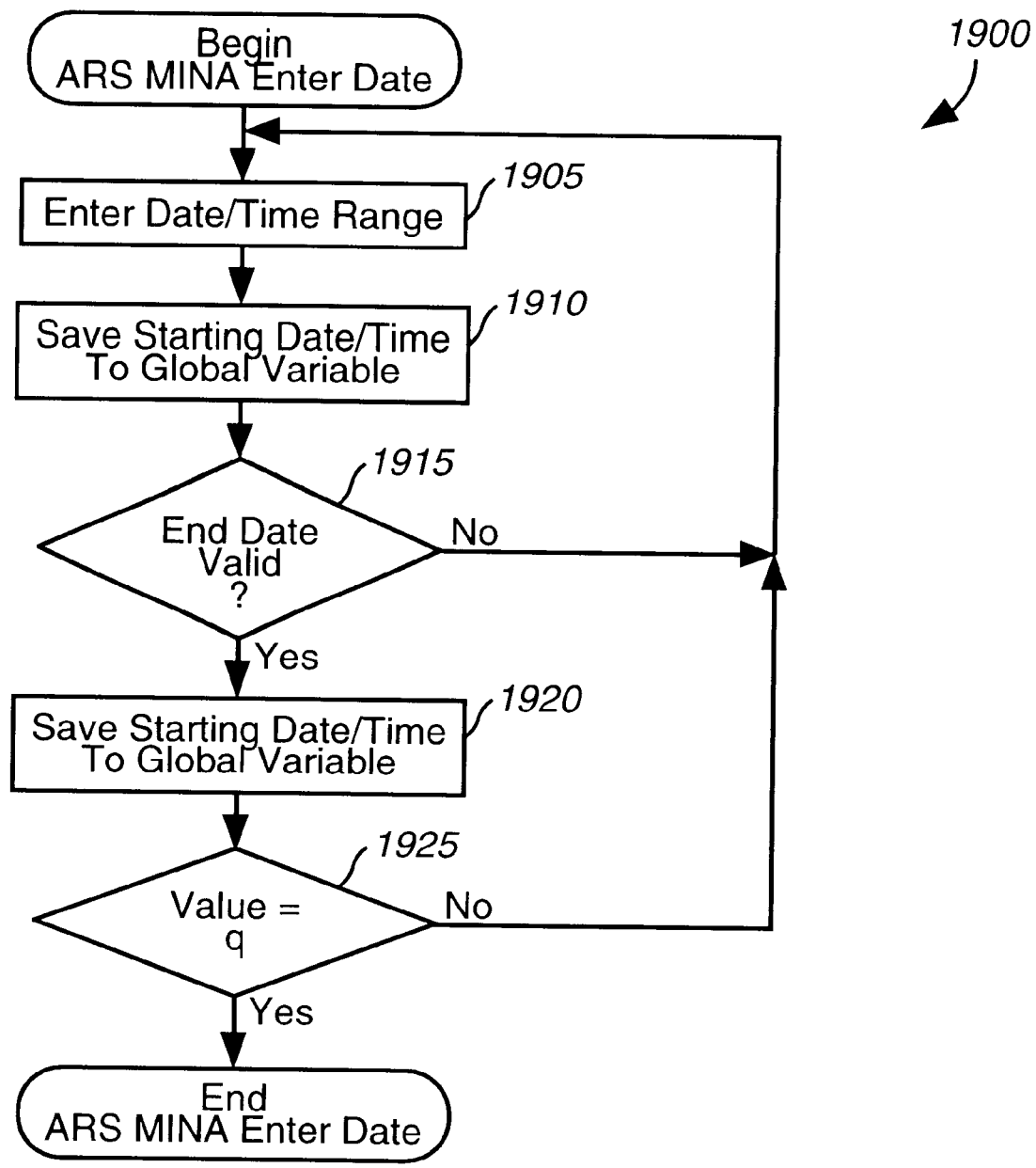

FIG. 23 shows a flow diagram of the procedure called by the reconciliation procedure 1700. This procedure, ARS MINA Enter Date will allow the SA to enter the exact date range of information to be sent to the MINA SMS database for reconciliation. The date range entered 1905 will be stored in a global variable 1910. If the end date from the date range is valid 1915, then the end date will be stored in yet another global variable 1920. If at anytime, the dates entered are not valid, then the SA will be prompted to re-enter those values until validated. If at anytime the SA wishes to exit this procedure, a 'q' may be entered in order to terminate 1925.

Figure 24:
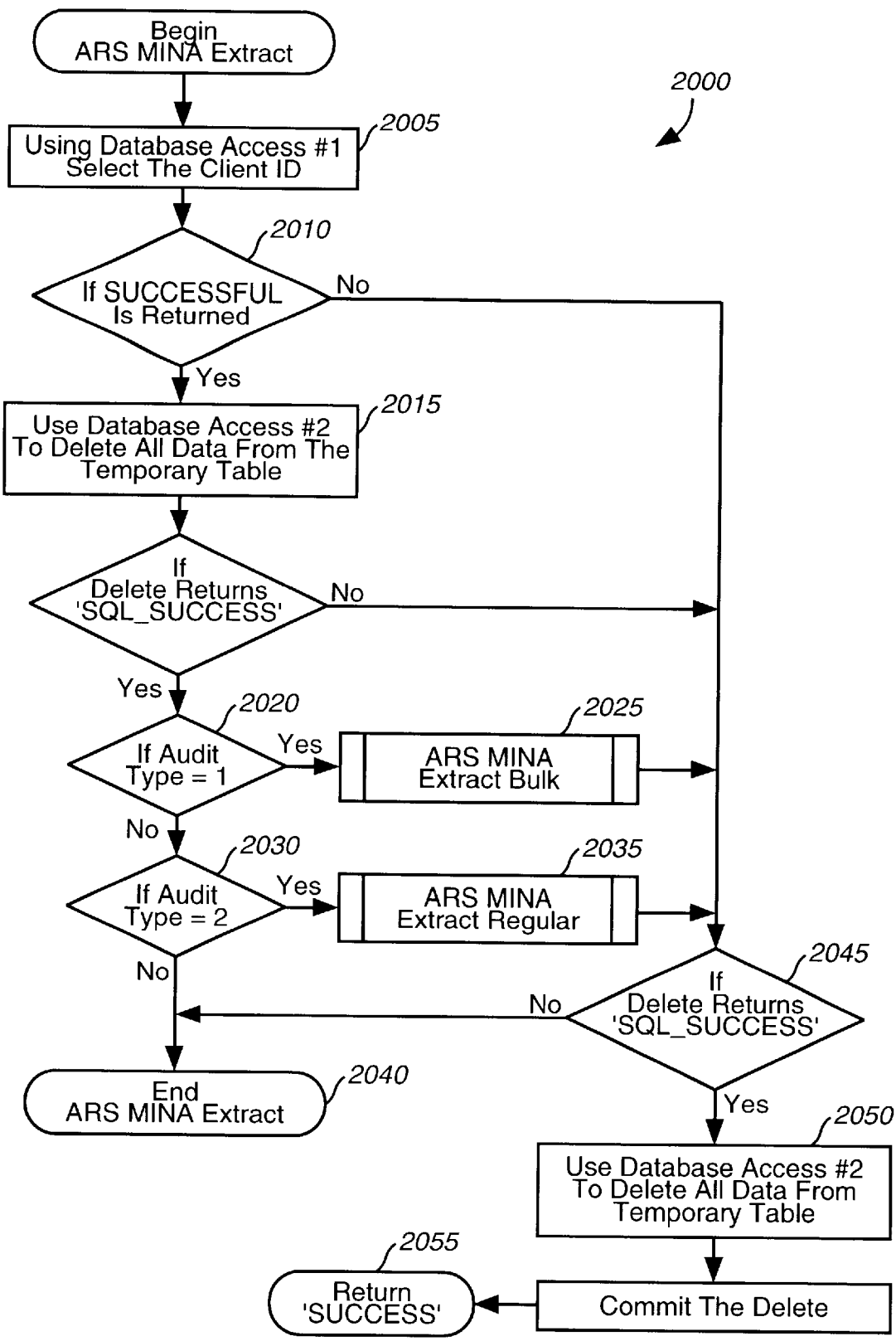

Looking back at block 1750 in FIG. 21 shows the next procedure called by the reconciliation program in FIG. 24. The procedure ARS MINA Extract 2000 will extract specific data form the IBAR for the audit file required by the SMS MINA. As can be seen, there are two types of files to choose from. Using database access #1, the client ID will be selected 2005. If a successful return message is received after this action, 2010 then database access #2 will be used to delete the data from the temporary table 2015. If the choice of the audit type preferred is 'Extract Bulk' 2020 then ARS MINA Extract Bulk will be called 2025. If ARS MINA Extract Regular is to be called 2035, 'Extract Regular' 2030 must be chosen from the menu choices. If an audit type is not chosen, then the procedure will end 2040 and return to the place from which it was called. When and if the execution of these two types of audits are completed successfully 2045, then database access #2 will be called again to clear the temporary table 2050. If there was an error when the audit was being executed, then procedure ARS MINA will terminate 2040. If it was successful, then there will be a return of 'successful' 2055 to the main program and then the procedure will end.

Figure 25:
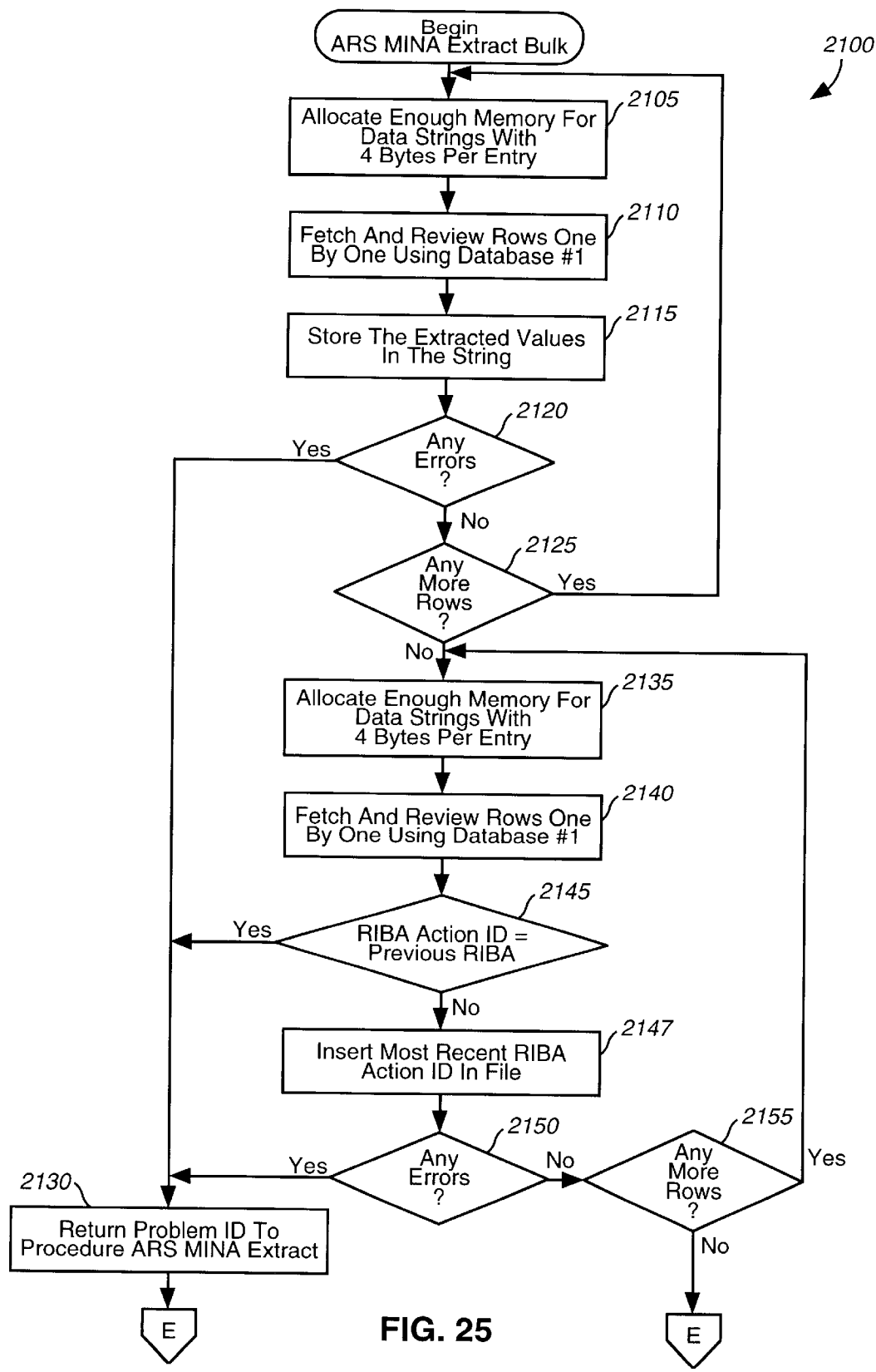
Figure 25:
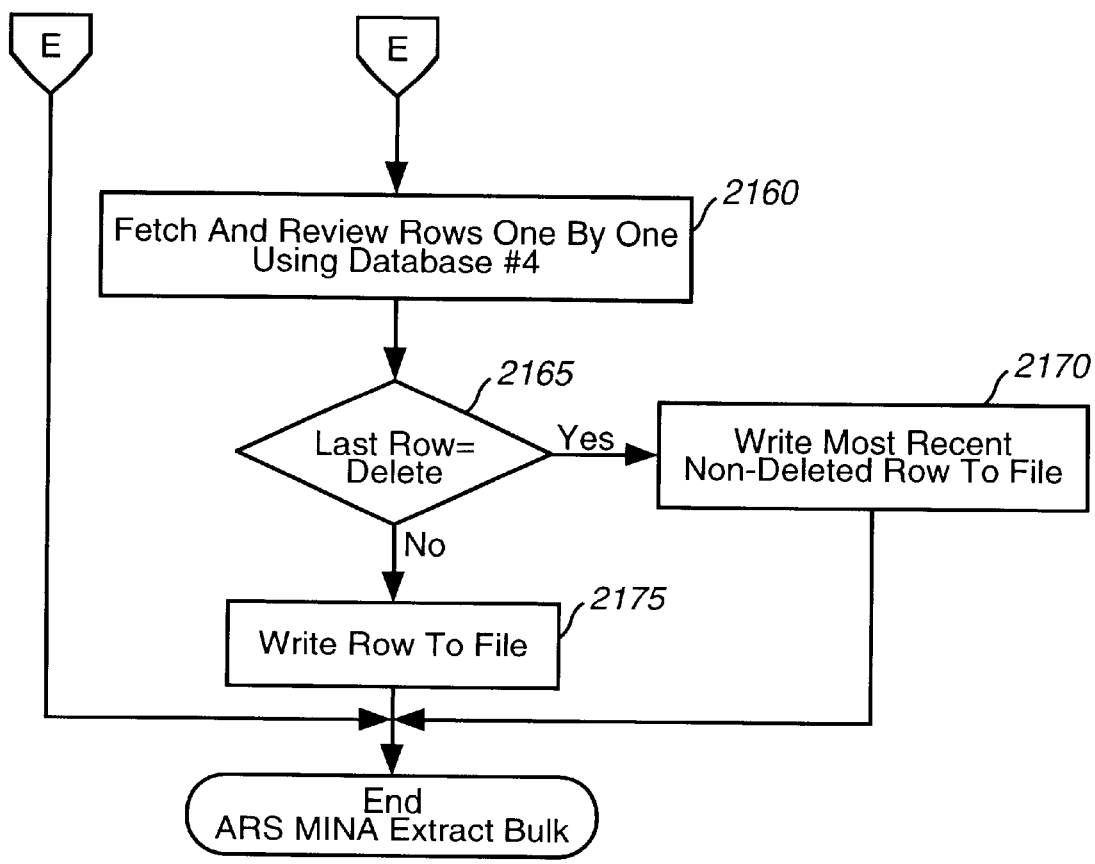

Next, looking at FIG. 25, a flow diagram of the procedure ARS MINA Extract Bulk is shown. This procedure will actually do the extraction and formatting of data for the bulk download portion. Next, allocate just enough memory for one data string 2105 that is four bytes long. Rows will be fetched one by one using the predefined database access #1, 2110. Values extracted will then be stored in the string 2115. After each and every fetch of each and every string the memory will be re-allocated. If there is an error. 2120 during the execution of these steps, a problem ID will be returned to the procedure ARS MINA Extract 2130. This extraction of data will continue until there are no longer any more rows of data left 2125. Once the backup file has been completed, a temporary file will be opened, via database #2, 2135. If the RIBA action ID of the retrieved row equals one of the RIBA action id's from earlier 2145, then insert the RIBA action ID along with the sequence number into the temporary file just opened via database access #3, 2147. If an error occurs, return the problem ID back to the ARS MINA Extract Procedure 2130. Then another temporary file is opened via database access #4. These rows are fetched and retrieved one by one as well 2160. If the most recent transaction for a telephone number is not a delete 2165 then write the most recent telephone number transaction to the file in the specified format 2175. However, if it is, then write the most recent to file, 2170.

Figure 26:
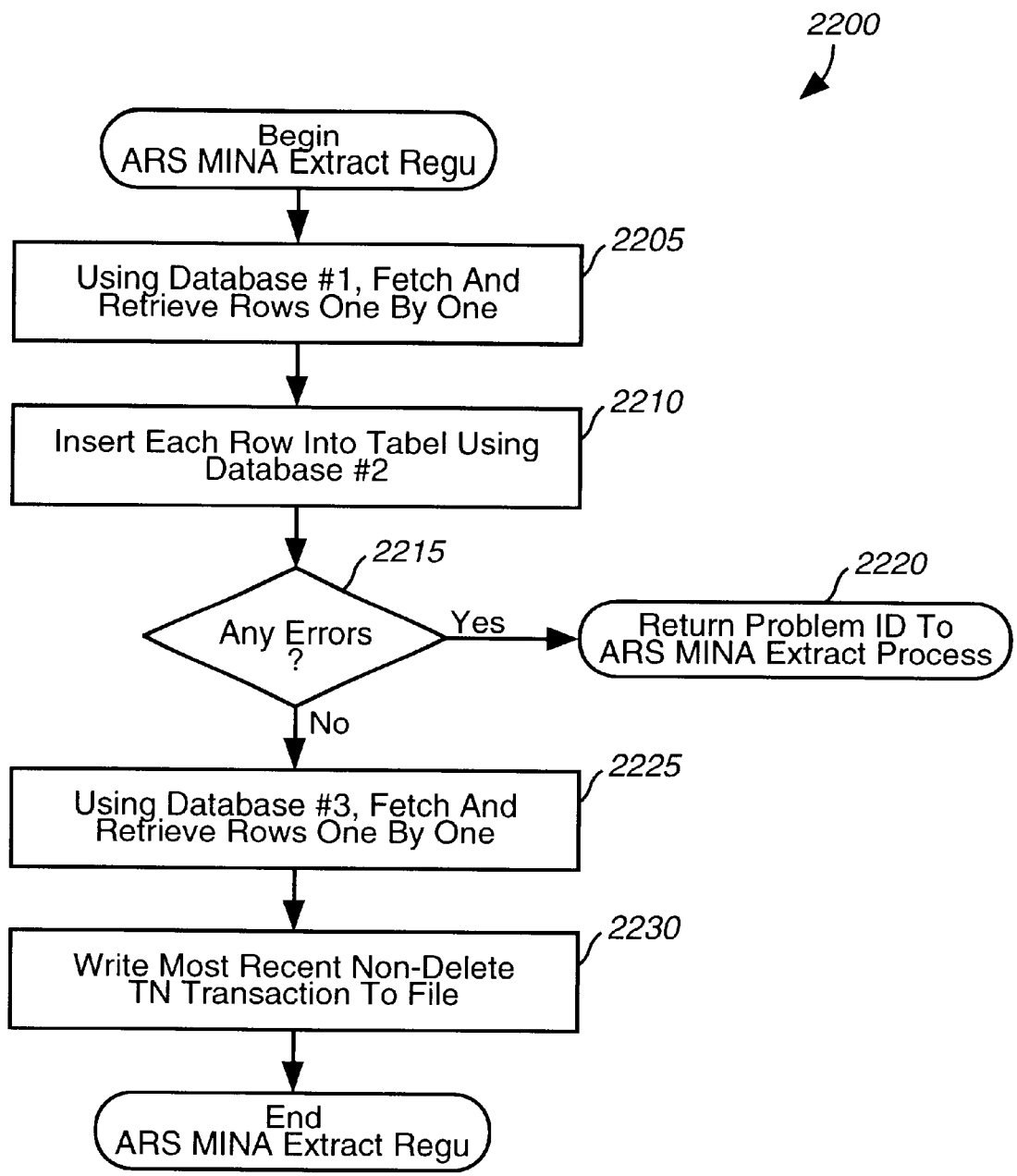

Looking next at FIG. 26, procedure ARS MINA Extract Regu 2200. This procedure will actually do the extraction and formatting of data for the regular download portion. Once called, the procedure will open an internal file containing temporary information, via database #1 2205. As before, the data contained in this file will be fetched and retrieved one by one then inserted a temporary audit file using database access #2 2210. If an error occurs during this process 2215, a problem ID will be returned to the procedure ARS MINA Extract 2220. Next, another temporary file will be opened to store the most recent non-deleted telephone number via database access #3, 2225. The most recent non-delete telephone number transaction is written to file 2230.

Figure 27:
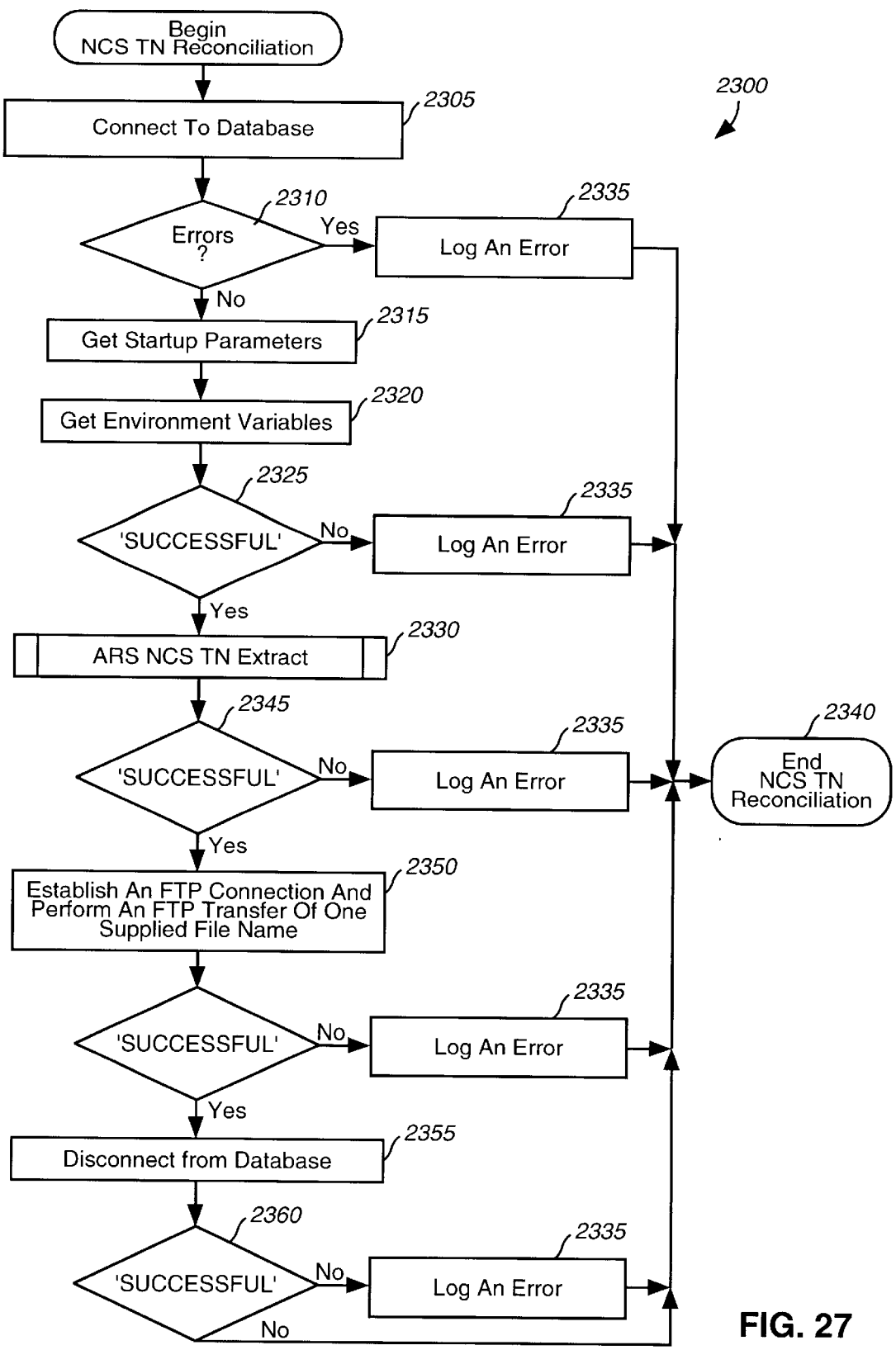

Looking back to FIG. 12, there is a choice to select a NCS-type audit 750. This particular type of audit can be done only on demand, unlike the ARIS-type audit. As depicted in FIG. 27 when executing, an internal procedure is called to connect to the database 2305. Once this has been accomplished 2310, the environmental variables are retrieved using another internal procedure 2315. Once the environmental variables have been retrieved, the startup parameters are retrieved 2320. If the return status is successful 2325, then the procedure ARS NCS TN Extract 2330 is called. If an error occurred during the reception of the startup parameters, then an error will be logged 2335 and the program will terminate 2340. When procedure 2330 has been successfully completed 2345, a call will be made to the internal procedure that transfers the data using FTP 2350. A disconnection 2355 is made after the transformation is completed successfully 2350. Once finished, the program will terminate 2340.

Figure 28:
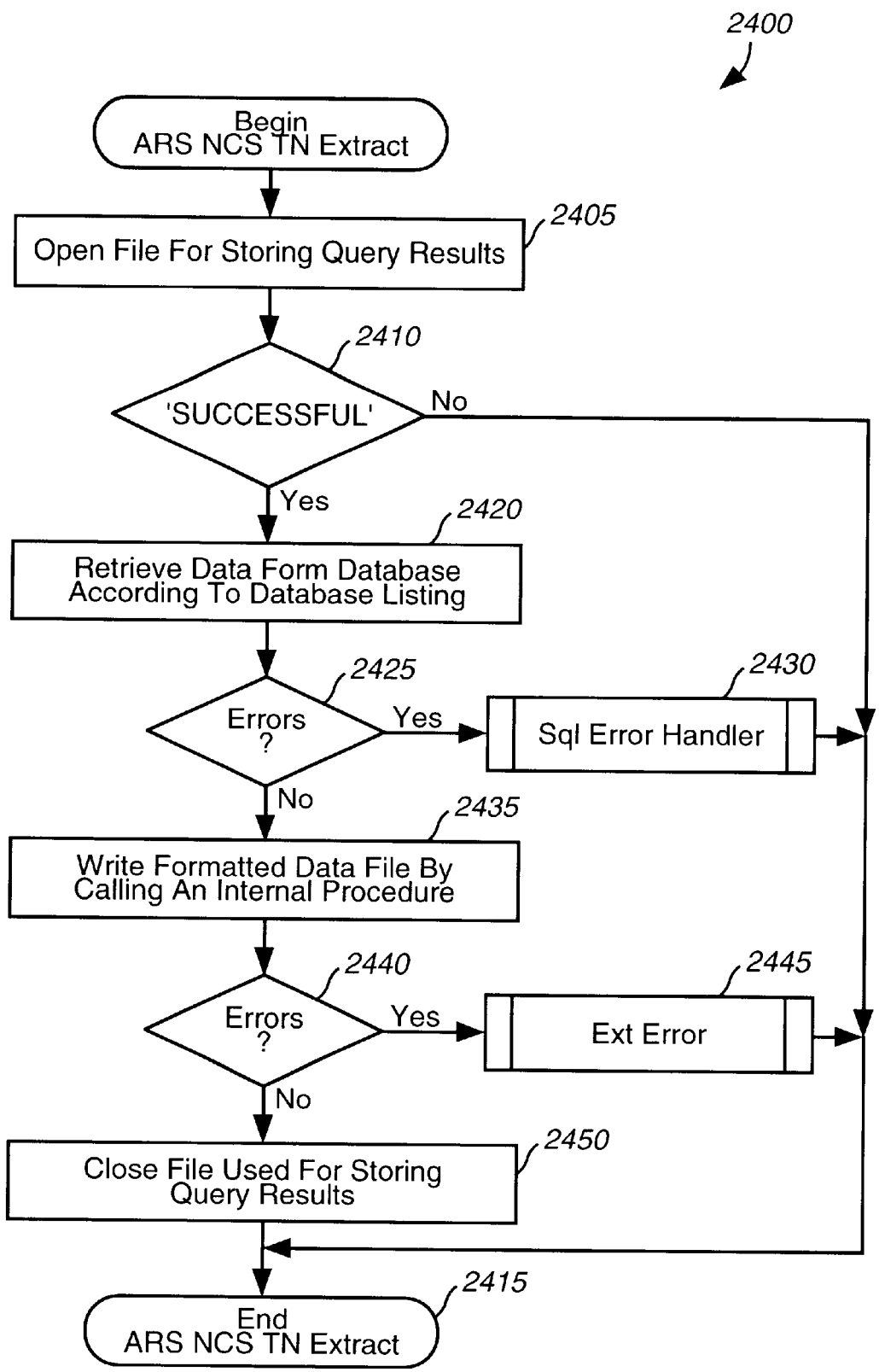

As seen in FIG. 27, there is a call to procedure ARS NCS TN Extract at block 2330. This procedure, 2400 shown in FIG. 28 is used to extract the transactions which indicate a notification for a ported telephone numbers. First procedure 2400 will start storing the query results 2405. If this unsuccessful 2415, the pager is terminated 2415, if not, the procedure will continue on to retrieving data from the database 2420. If an error occurs 2425, then the Sq1 Error Handler 2430 will be called. If there are no errors 2425, then the formatted data will be written to same file the query results were stored 2435. This is done by actually calling a procedure Wrt File. This procedure will just write to a certain file in a particular format. If an error occurs 2440 during this step, then Ext Error 2445 will be called. The file will then be closed 2450 once this has been completed successfully.

Figure 29:
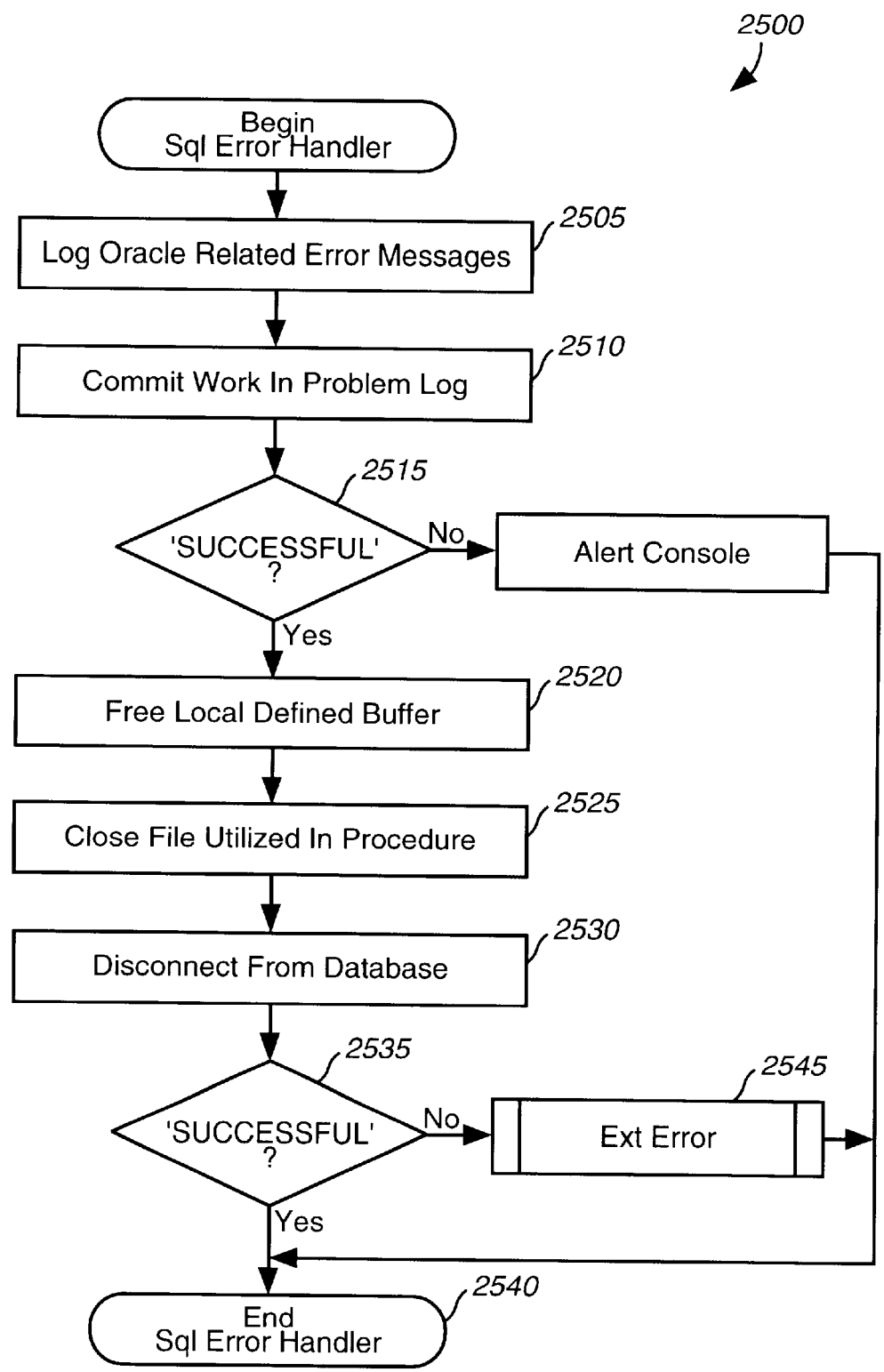

The next procedure of the NCS subsystem is the Sq1 Error Handler 2430 as depicted in FIG. 29. When called upon, procedure 2500 will log the oracle related error message 2515 by calling a utility function. Then the work in the problem log table 2510 will be committed by calling another internal procedure. If successful 2515, procedure 2500 will go on to free local defined buffers 2520. If step 2510 is not successful then the console will be alerted 2545. After freeing the local defined buffers 2520, the open telephone number file will be closed 2525. This procedure will then disconnect 2530 from the database through the calling of an internal procedure. If successful 2535, the procedure will terminate 2540, if not, then the procedure Ext Error 2545 will be called prior to termination 2540.

Figure 30:
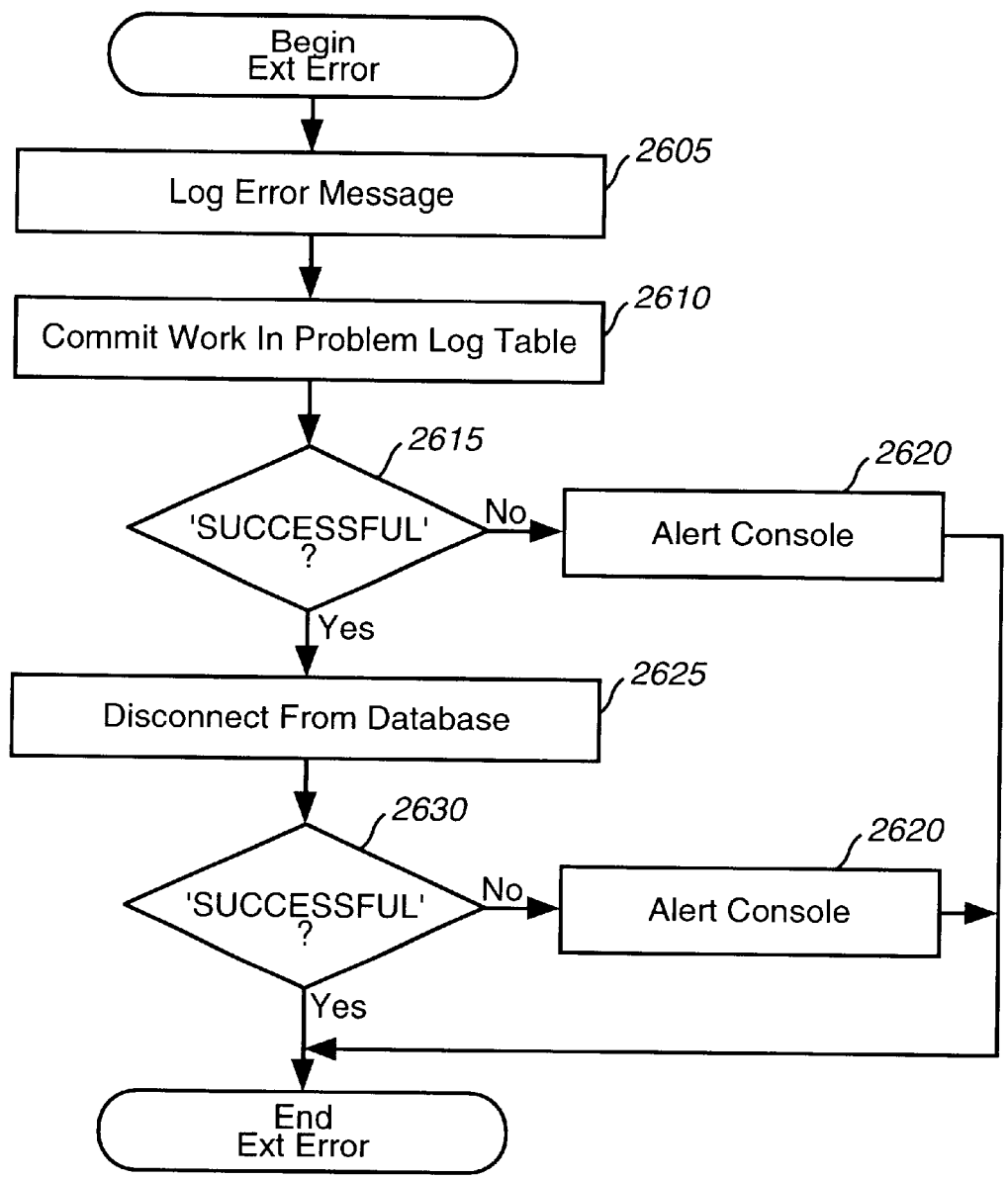

The other procedure called by previous procedures is the Ext Error procedure. Procedure 2620, FIG. 30 is used to log other error messages except oracle related ones into the problem log table as well as the problem log file. First the error message will be logged 2605 by calling the inter procedure error handler. Next, the work in the problem log will be committed 2610. If unsuccessful 2615, the console will be alerted 2620. Procedure 2600 will then disconnect from the database and terminate the procedure. If there is an error disconnecting 2630 from the database then the procedure will alert console 2620.

Figure 31:
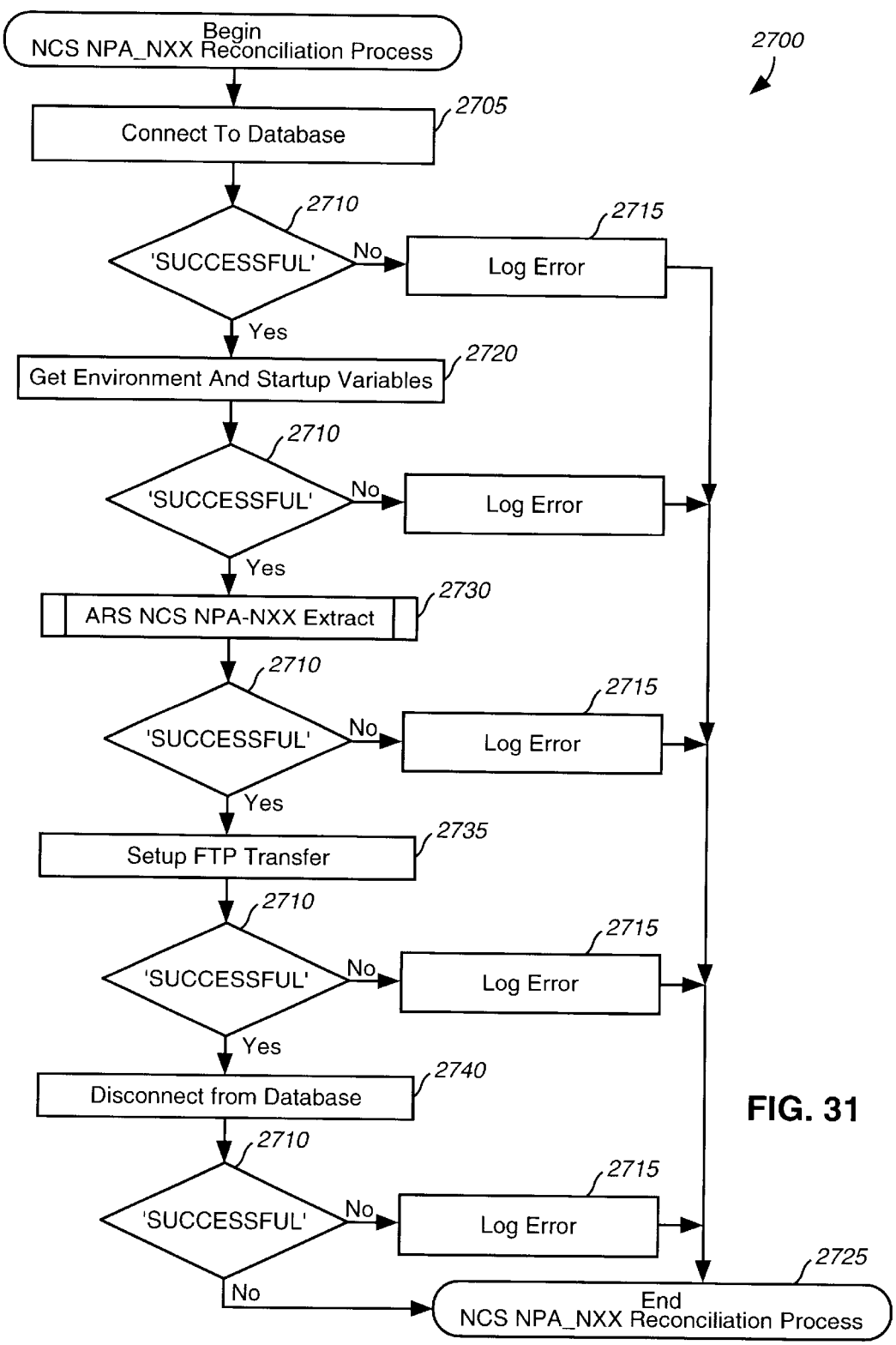

There is an additional type of audit that is done whenever the NCS audit is selected. Whenever an NCS audit is selected, two audits execute, the NCS TN and the NCS NPA NXX. Looking at FIG. 31, a flow diagram of the NCS NPA NXX Reconciliation procedure is shown. The procedure 2700 is responsible for processing prefix screenings. When procedure 2700 executes it will connect to the BAR database 2705. If unable to log on to the database 2710, an error is logged 2715 and then the process exits 2725. If successful 2710, this procedure will retrieve the environmental variables and startup parameters 2720 using internal procedures. If there is an error 2710 at anytime within this procedure, then the error will be logged 2715 and the program will exit 2725 procedure 2700, if the variables were successfully retrieved a status of 'successful' is returned to the main program. Next, block 2730 will call ARS NCS NPA NXX extract. When this procedure 2730 has been completed successfully 2710, the procedure will then call on internal procedure that will transfer the FTP 2735. As soon as the data has been sent to the FTP, procedure 2600 will disconnect from the database 2640 and exit 2625 from the procedure.

Figure 32:
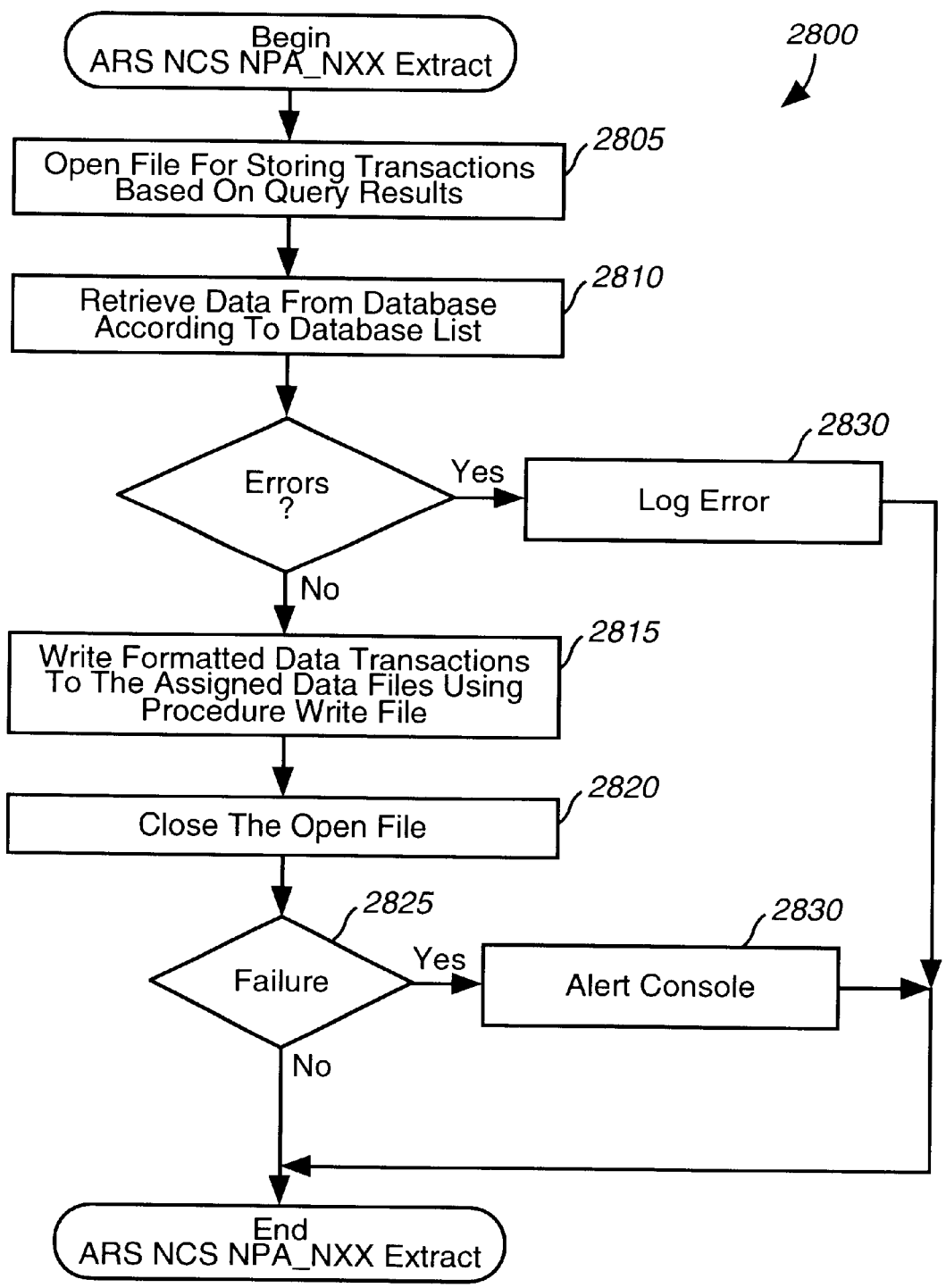

The next procedure called and shown in FIG. 32 is the ARS NCS NPA NXX Extract. The procedure 2800 will extract the transactions which indicate a notification for ported numbers and accounts. Looking at FIG. 32, it is shown that the first action is an opening of a file for storing the transactions based on the query results 2805. Data will be retrieved according to the list created from the previous action 2810. Formatted data transactions will be written to the same file using a procedure Wrt File 2815. Procedure write file is used only to write the data to the file with a specific format. The file storing the data will then be closed 2820 and saved for later analysis. As with most of the aforementioned procedures, whenever there is a error 2825 during the execution of any step or procedure, the error will be logged 2830 and then that procedure or step will terminate 2835.

As with the NCS TN procedures, there are the Sq1 Error Handler and an Ext Error procedures for handling errors during execution. While they are the same construction the difference between the two sets is the file they create corresponds with the type of data in question.

Looking at the overall FIG. 10, it is shown that the last alternative to the types of audits to be processed is the RTE7 440. The RTE7 may be done only on a scheduled basis. The first procedure associated with the RTE7 is the main program which executes it all, the RTE7 Reconciliation. This procedure starts off connecting to the database to get the environmental variables using an internal procedure. Next, it will retrieve the startup parameters. Next, the system date/time is retrieved. Opening of the audit file is executed. Next a series of procedures will be executed in order to create this audit file. First the ARS RTE7 Write Header is executed in creating a dummy header. Then the ARS RTE7 Extract procedure is executed in order to extract the proper data from the IBAR. After that, an internal procedure for transferring the file is used. After a successful run of the previous procedures, the present procedure will disconnect from the database, exiting the program. If there is ever some sort of error while executing any of the said procedures, the status 'failure' is returned to the main program while ARS RTE7 error handler executes.

Figure 33:
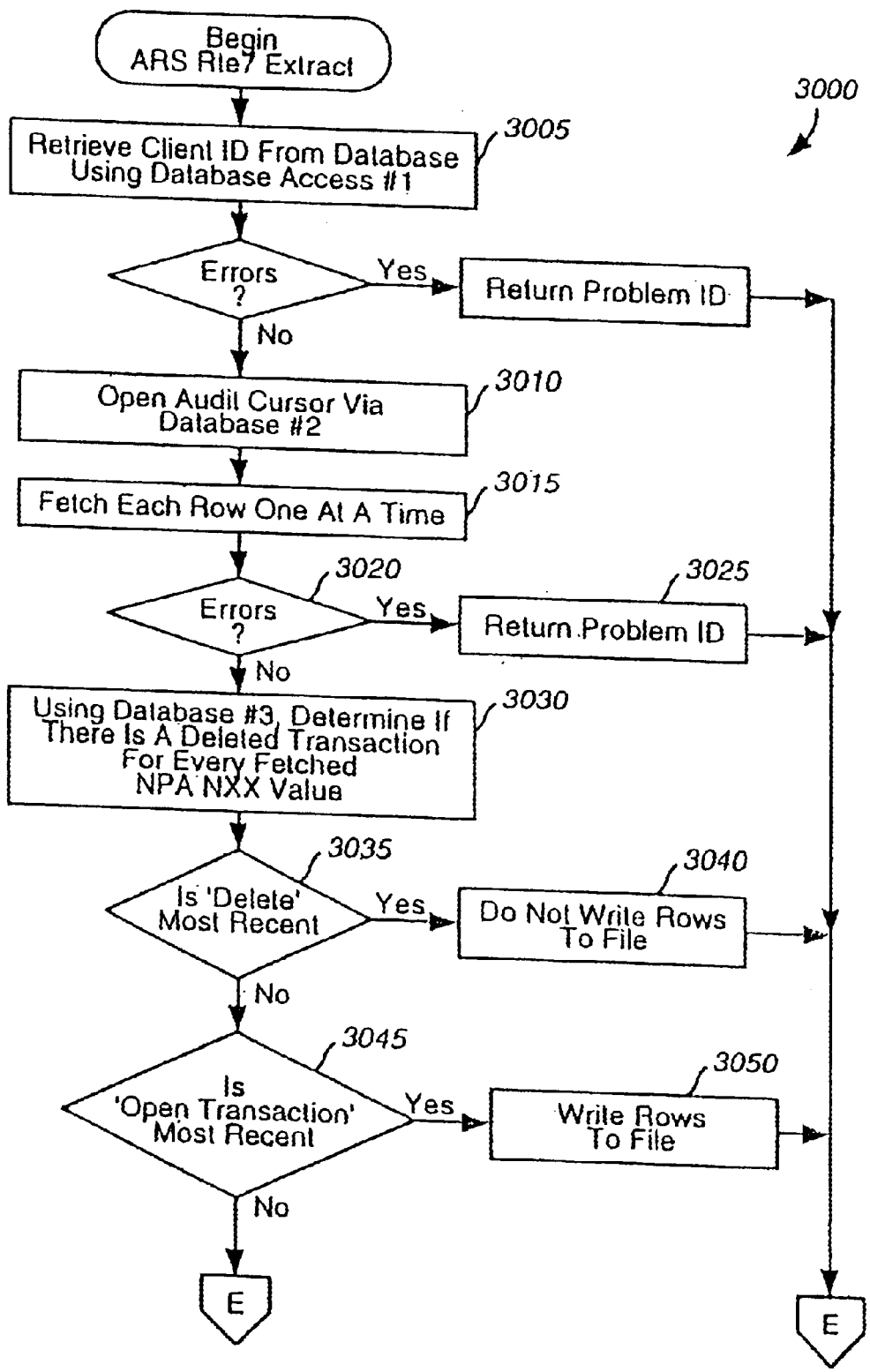
Figure 33:
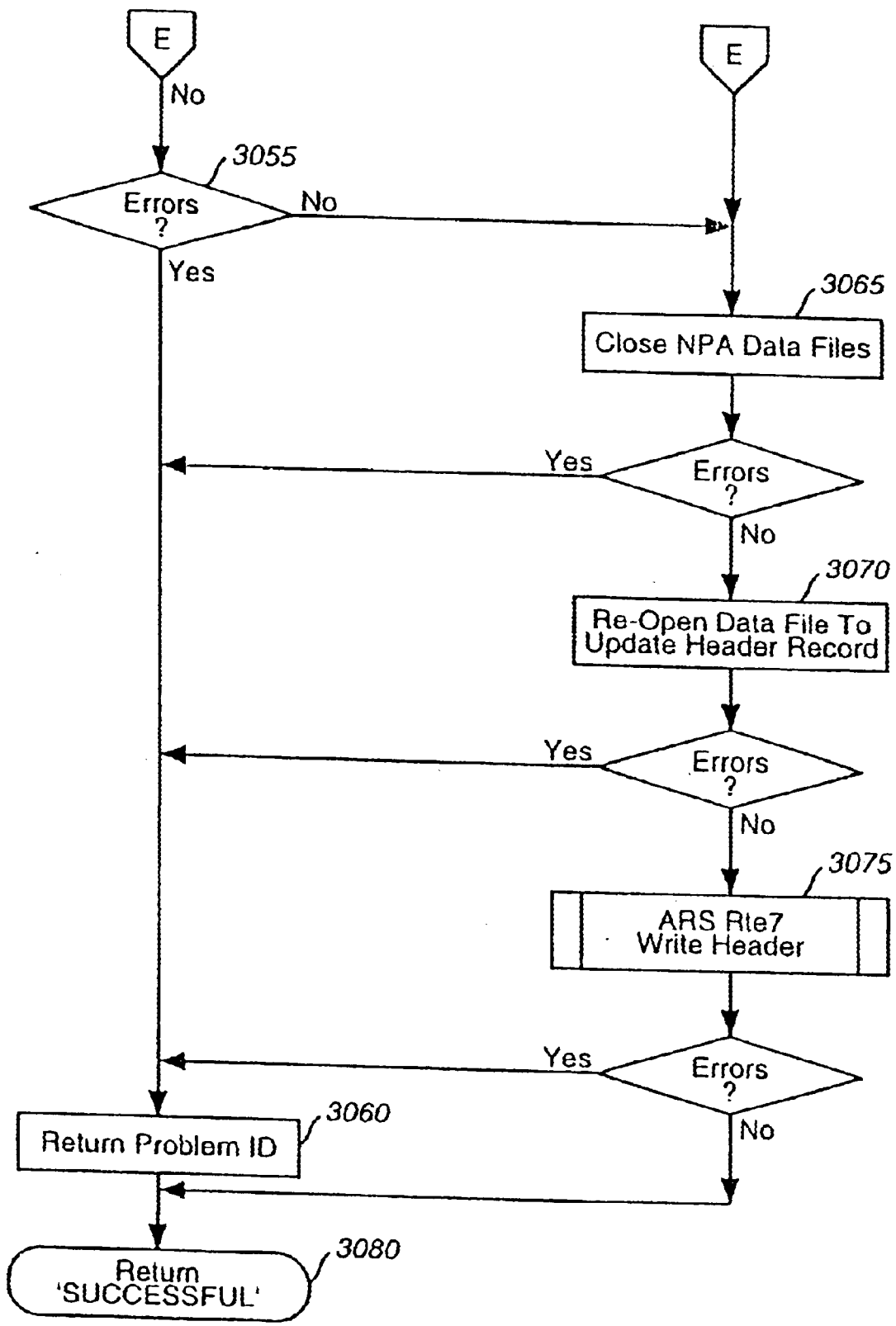
Figure 34:
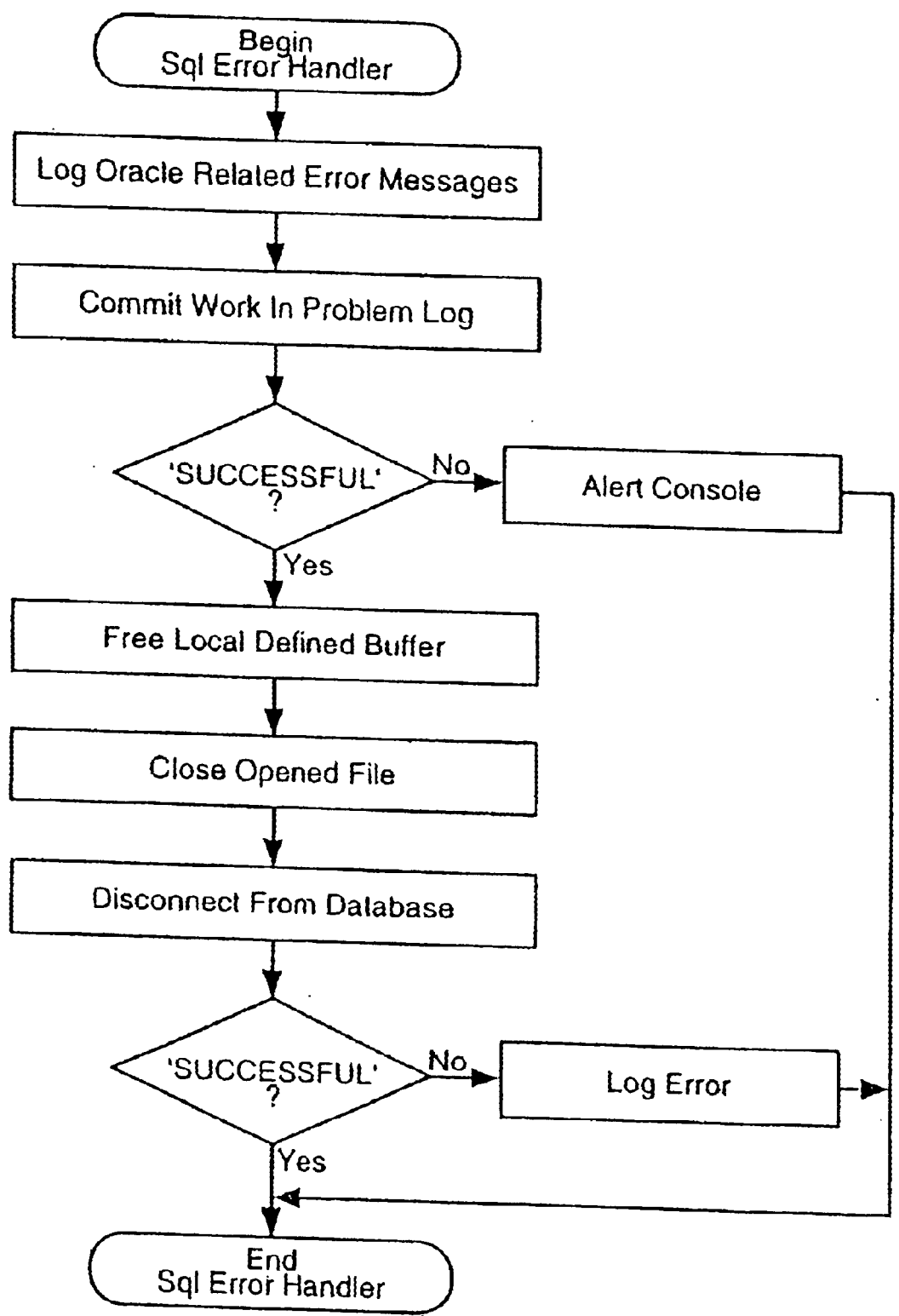
Figure 35:
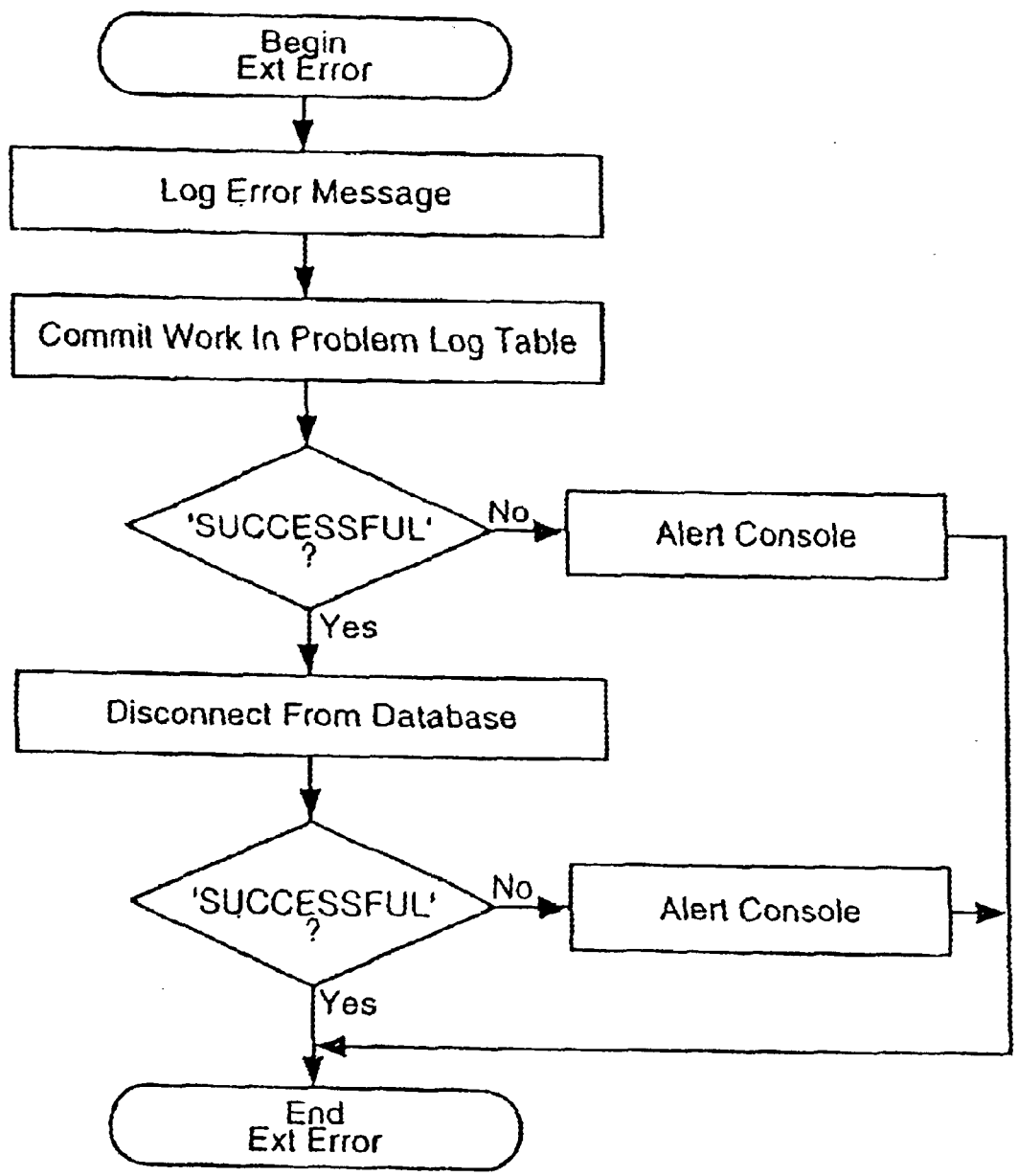

Looking next at FIG. 33, the procedure ARS RTE7 Extract 3000 is shown. Procedure 3000 is responsible for extracting all the customers and information currently available for portability at the time of reconciliation from the IBAR. Block 3005 represents the first step taken when procedure 3000 is executing—retrieving the client identification numbers from the database using database access #1. Then an audit cursor is opened via database access #2 3013 fetching each row one by one 3015. If an error occurs 3020, then the problem ID is returned to the main program 3025. Using database access #3 3030, a check will be made for the value of the variable representing a delete transaction. If the value of the delete transaction is more recent than the number sequence 3035, then the delete number will not be written to the file 3040. If there is no delete transaction or the open transaction is more recent 3045 than the number sequence, then write the rows to the file 3050 is performed. If an error occurs 3055, then return the problem ID 3060 to the main program. After this checkup, the procedure will close the file 3065 it is writing to, then re-open it 3070 again to update the header record. The procedure called next is ARS RTE7 Write Header 3075. This is responsible for writing the updated header record. If successful, then return a 'successful' message to the main program 3080.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. A method for facilitating an auditing and reconciliation process of telephone service providers' databases with a data repository, the databases and repository each storing telephone data records, the method comprising the steps of:
   (a) prompting a user to make a first selection from one of an on demand auditing time and a scheduled auditing time;
   (b) prompting a user to select from one of auditing a subset of data in a telephone service provider's database and auditing all of the data in the database;
   (c) prompting a user to select an instruction for executing one of a plurality of auditing subroutines, the auditing subroutines comprising data record processing applications that audit data in the service provider's database based upon data in a telephone data repository database;
   (d) executing, at the time selected in step (a), the auditing subroutine selected in step (c) on the data set selected in step (b); and
   (e) repeating steps (a) through (d) until a termination signal is received, wherein the termination signal is generated either by user input or as an integral part of the auditing and reconciliation process.

2. The method according to claim 1, further comprising the steps of:
   (f) receiving results from the auditing subroutine selected in step (c);
   (g) extracting information from the results responsive to the data processing application selected in step (c);
   (h) formatting the results and extracted information for facilitating electronic medium storage;
   (i) writing the formatted results and formatted extracted information into an electronic storage medium;
   (j) repeating steps (f) through (i) until a termination signal is received.

3. The method according to claim 2, further comprising the steps of:
   (k) formatting the results and extracted information for electronic transmission to the user;
   (l) electronically transmitting the formatted results and extracted information to the user;
   (m) repeating steps (k) through (l) until a termination signal is received.

4. The method according to claim 3, wherein step (k) further comprises formatting the results and extracted information to conform to one of file transfer protocol and common management information protocol.

5. The method according to claim 1, wherein the user is a telephone service provider.

6. The method according to claim 1, wherein the data records comprise telephone number porting information that defines how to route a telephone call from a first telephone service provider to a second telephone service provider.

7. The method according to claim 1, wherein the data records comprise a change in the telephone data repository.

8. The method according to claim 1, wherein the data records comprise telephone network data and subscription information.

9. The method according to claim 1, wherein the data records comprise at least one activated telephone number.

10. The method according to claim 1, wherein the data records comprise at least one deactivated telephone number.

11. The method according to claim 1, wherein the data records comprise at least one modified telephone number.

12. The method according to claim 1, wherein the data records comprise at least one local number portability request.

13. The method according to claim 1, wherein the auditing subroutine selected in step (c) includes a first data records processing application, the first data records processing application facilitating management of data records relating to long distance porting information for local telephone service providers.

14. The method according to claim 13, wherein the first data records processing application is one of a Network Control System and a Provisions Voice Network.

15. The method according to claim 1, wherein the auditing subroutine selected in step (c) includes a second data records processing application, the second data records processing application facilitating management of data records related to local number porting information for local telephone service providers.

16. The method according to claim 15, wherein the second data records processing application is Metro Intelligent Network Architecture.

17. The method according to claim 1, wherein the auditing subroutine selected in step (c) includes a third data records processing application, the third data records processing application facilitating management of data records related to local and long distance numbers for nonresidential telephone service providers.

18. The method according to claim 17, wherein the third data records processing application is Automatic Number Identifier Reference Information System.

19. A method for facilitating an auditing and reconciliation process of telephone service providers' databases with a data repository, the databases and repository each storing telephone data records, the method comprising the steps of:
   (a) prompting a user to make a first selection from one of an on demand auditing time and a scheduled auditing time;
   (b) prompting a user to select from one of auditing a subset of data in a telephone service provider's database and auditing all of the data in the database;
   (c) prompting a user to select an instruction for executing one of a plurality of auditing subroutines, the auditing subroutines comprising data record processing applications that audit data in the service provider's database based upon data in a telephone data repository database;
   (d) executing, at the time selected in step (a), the auditing subroutine selected in step (c) on the data set selected in step (b); and (e) receiving results from the auditing subroutine selected in step (c);

(f) extracting information from the results responsive to the data processing application selected in step (c);

(g) formatting the results and extracted information for facilitating electronic medium storage;

(h) writing the formatted results and formatted extracted information into an electronic storage medium;

(i) formatting the results for electronic transmission to the user;

(j) electronically transmitting the formatted results to the user;

(k) repeating steps (a) through (j) until a termination signal is received, wherein the termination signal is generated either by user input or as an integral part of the auditing and reconciliation process.

20. An interface system for facilitating auditing and reconciliating of a telephone service providers database and a telephone data repository, the interface system comprising:

a telephone data repository containing data records, the data records comprising telephone number portability information;

a telephone service provider database containing data records, the database and service provider in electrical communication with the repository;

a plurality of distinct data pipes for facilitating electrical communication of data records, a first end of the pipes in electrical communication with the repository; and a plurality of data records processing applications for facilitating the extraction of data records from the repository and communication of data records to the database, a second end of the pipes in electrical communication with the applications such that requests for data extraction are received from the telephone service provider in the database and in response to the request at least one of the applications facilitates retrieval of data records and communication of data records to the database.

21. An interface system for facilitating auditing and reconciliating of a telephone service providers database and a telephone data repository, the interface system comprising:

a telephone data repository means for containing data records comprising telephone number portability information;

a telephone service provider database means for containing data records, the database and service provider in communication with the repository;

a plurality of distinct data pipes means for facilitating communication of data records between the telephone data repository means and the telephone service provider database means, a first end of the pipes in electrical communication with the repository; and a plurality of data records processing means for facilitating the extraction of data records from the repository and communication of data records to the database, a second end of the pipe means in communication with the data records processing means such that requests for data extraction are received from the telephone service provider means in the repository means and in response to the request at least one of the data records processing means facilitates retrieval of data records from the repository means and communication of data records to the telephone service providers database means.

* * * * *